(12) United States Patent
Charrier et al.

(10) Patent No.: US 6,498,866 B2
(45) Date of Patent: Dec. 24, 2002

(54) METHODS AND DEVICES FOR PROCESSING DATA AND NOTABLY FOR COMPRESSING AND DECOMPRESSING IMAGES

(75) Inventors: Maryline Charrier, Rennes; Isabelle Amonou, Thorigne-Fouillard; Félix Henry, Rennes; Claude Dierieck, Cesson Sevigne, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/138,646

(22) Filed: Aug. 24, 1998

(65) Prior Publication Data

US 2002/0141652 A1 Oct. 3, 2002

(30) Foreign Application Priority Data

Aug. 29, 1997 (FR) ............................................ 97 10825
Aug. 29, 1997 (FR) ............................................ 97 10826
Aug. 29, 1997 (FR) ............................................ 97 10824

(51) Int. Cl.[7] ................................................. G06K 9/36
(52) U.S. Cl. .................................... 382/248; 348/395.1
(58) Field of Search ............................. 382/248, 249, 382/240, 233; 348/393, 395, 396, 403, 405, 393.1, 395.1, 403.1, 405.1

(56) References Cited

U.S. PATENT DOCUMENTS 5,065,447 A  11/1991  Barnsley et al. ............... 382/56
5,416,856 A   5/1995  Jacobs et al. ................. 382/232
5,768,437 A * 6/1998  Monro et al. ................. 382/249

FOREIGN PATENT DOCUMENTS

WO  91 00666 A  1/1991
WO  93 17519 A  9/1993

OTHER PUBLICATIONS

A.E. Jacquin, Fractal Image Coding: A Rview, Proceedings Of The IEEE, vol. 81, No. 10, Oct. 1993, pp. 1451–1465.

Guojun Lu, "Fractal Image Compression" Signal Proc., Image Comm., vol. 5, No. 4, Oct. 1, 1993, pp. 327–343.

* cited by examiner

Primary Examiner—Yon J. Couso
(74) Attorney, Agent, or Firm—Fitzpatrick, Cella, Harper & Scinto

(57) ABSTRACT

According to the invention, the method of primary processing of a first set of primary data (IM,f) representing physical quantities includes:

Figure 1:
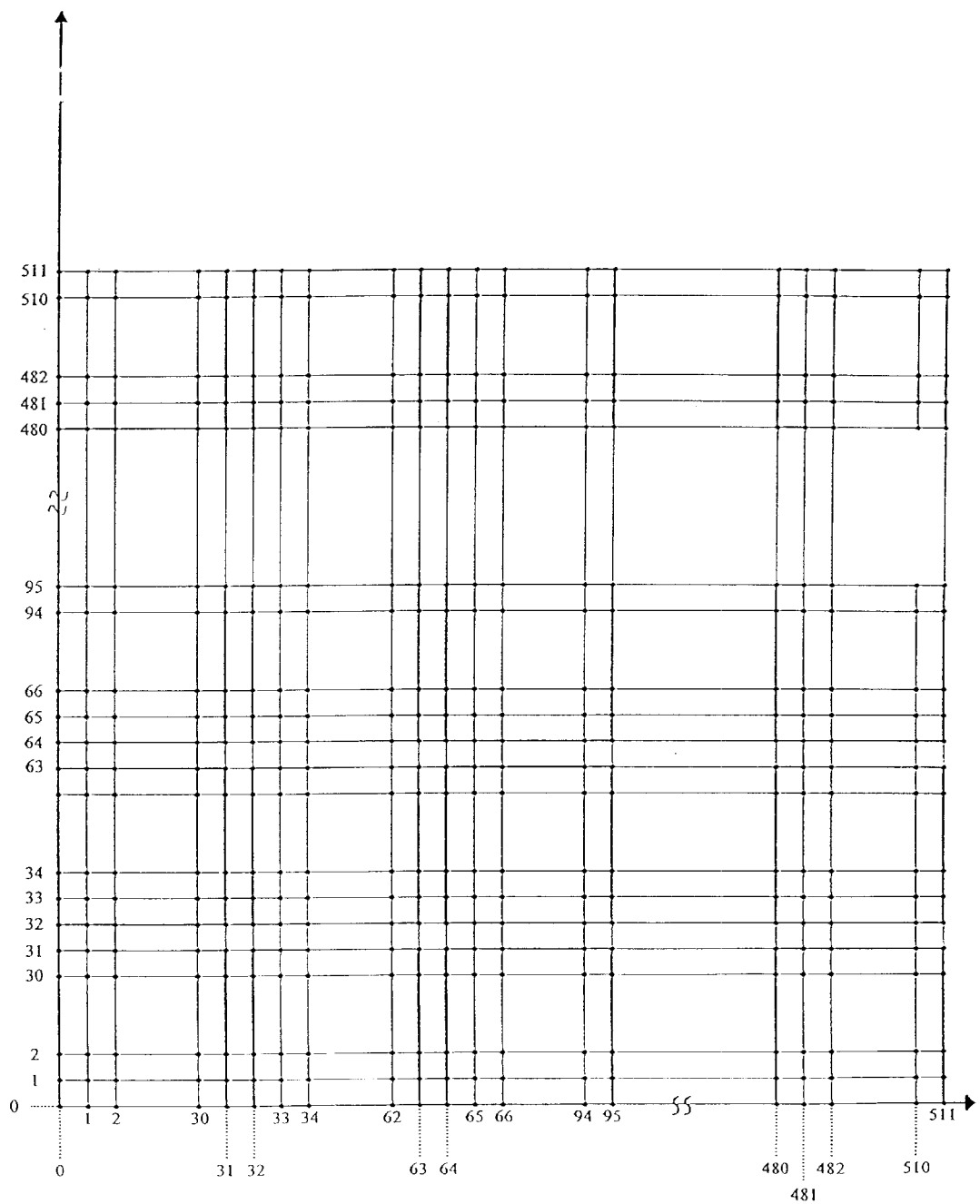

a set division step (200A to 202) during which the first set of data is divided into sub-sets of first data, and for each first sub-set of data:

a step (205 to 207) of "constructing" a global contractive mapping of the first type, for the said first sub-set of data, whose fixed point constitutes an approximation of all or part of this sub-set. The set of parameters ($a_i$, b) thus determined constitutes a primary representation of the said first set of data.

32 Claims, 30 Drawing Sheets

```
B0    B1    B2   B3    B4    B5   B6   B7    B8   B9    B10   B11
0     1     0    0     0     0    1    0     0    0     0     1
      |                            |                          |
      0 0 0 1                      0 1 0 0                    0 0 0 0
            |                        |
```

| HEADER |
| --- |
| 0D |
| 1 0D 0D 0D 1 D D D D |
| 0D |
| 0D |
| 0D |
| 0D |
| 1 0D 1 D D D D 0D 0D |
| 0D |
| 0D |
| 0D |
| 0D |
| 1 0D 0D 0D 0D |

```
HEADER 0D
1D 0D 0D 0D 1D D D D D
0D
0D
0D
0D
1D 0D 1D D D D D 0D 0D
0D
0D
0D
0D
1D 0D 0D 0D 0D
```

Fig. 21D

```
HEADER 0D
1  0D 0D 0D 0D
0D
0D
0D
0D
1  0D 0D 0D 0D
0D
0D
0D
0D
1  0D 0D 0D 0D
```

Fig. 21E

METHODS AND DEVICES FOR PROCESSING DATA AND NOTABLY FOR COMPRESSING AND DECOMPRESSING IMAGES

The present invention concerns, in general terms, a method and device for processing data, notably the representation, generation, restitution, regeneration or iterative processing of data.

More particularly, the present invention relates to the transmission (that is to say the representation at a distance) and/or the storage (that is to say the representation in a memory) of data, with or without compression thereof. These data can advantageously consist in the digital or analogue data of an image or sequence of images, and/or the digital or analogue data relating to sound (music, speech, etc), and/or the digital or analogue data relating to any mono or multidimensional signal.

Before disclosing the objectives and means of the invention, it is proposed below to give the following definitions:

"Set of data": set of any data representing physical quantities (usually voltage levels) which can themselves represent other physically perceptible or measurable quantities. In favoured applications, the sets of data concerned are images, sound or mono or multidimensional signals, etc. In the application relating to image processing, reference will sometimes be made to the "image" instead of the "set of data" relating to the image. That which will be disclosed below with regard to "images" or "sub-images" is respectively applicable to "sets of data" or "sub-sets of data" and vice versa.

"Representation of data": any "processing" of a set of data of a given type, resulting from the perfect or imperfect transformation of the said set of data into another type. For example: the data can consist in the 256 grey levels of the pixels of an image, their representation consisting of a series of binary words able to be stored or transmitted; conversely, the representation of the data consisting of the said binary words can consist in their transformation in order to regain data of the same type as the initial data.

"Primary representation": by convention, any processing resulting from the transformation of the data of a first type to data of a second type. In this case a "primary processing" of the data will be spoken of.

"Secondary representation": by convention, the transformation of data of the second type resulting from a primary processing. In this case a "secondary processing" will be spoken of.

"Restitution of data": the particular case of a secondary representation in which the data of the second type are transformed into data of the first type. This restitution can be perfect or imperfect.

A "metric space" is a set of elements with a functional distance which is symmetrical, positive and satisfies triangular inequality. This space is "complete" when it contains all the limit points of all the convergent series.

A "Lipschitz mapping": a mapping which transforms the points of a metric space in the same space and for which all the ratios of the distance of two elements transformed by the said mapping to the distance of the two said elements is limited.

A "contractive mapping" or "contraction": a Lipschitz mapping for which the smallest of the majorants (contraction factor) of the said set of ratios is less than unity. However, within the meaning of the present invention, all the convergent mappings, that is to say those having a fixed point (thus enabling successive approximations to be used) in a sub-set of the metric space are contractive.

A "similarity" is a Lipschitz mapping for which the ratio of the distance of two transformed elements to the distance of the said elements is a fixed quantity. A linear similarity is a "similitude".

A "contractive similarity" is a Lipschitz mapping for which the ratio of the distance of two transformed elements to the distance of the said elements is a fixed quantity strictly less than unity.

The "fixed point" of a contraction of a complete metric space in the same space (or of a sub-set of this space in itself) is the sole element which is left invariant by the said contractive mapping.

The "construction" of a contractive mapping on a set of data consists in forming a family of contractions able to transform the data and selecting the parameters of one of the said contractions in order to satisfy one or more predetermined conditions.

The "method of successive approximations" makes it possible to approach, iteratively, as close as wished, the fixed point of a contraction. Starting from an arbitrary element, the said contraction is applied thereto. The same contraction is then applied to the previously obtained transform. By reiterating this process, the fixed point of the contraction is approached successively and ineluctably.

"A better approximation" of an element in a metric space is a point in a sub-set of candidates, which are themselves points in the said space, which minimises the distance to the said element.

"A good approximation" of an element in a metric space is a point in a sub-set in the said space which is close, with a predetermined error, to a predetermined best approximation.

Various image representation methods, with compression, using the fractal technique, are known in the state of the art.

Through the document U.S. Pat. No. 5,065,447, a method and device are known for processing or storing an image with compression of the data relating to the initial image. In this method, the data relating to the initial image are divided, that is to say the image is divided into a plurality of elementary sub-images (referred to as "domain blocks"). This method next consists in generating an ordered dictionary of a set of reference sub-images (referred to as "range blocks") formed from portions of an image of predetermined size which has undergone a certain number of predetermined operations such as rotation and turning about various axes of symmetry. Next, for each elementary sub-image a comparison is made with all the reference sub-images of the dictionary and the reference sub-image which is the most similar to the elementary sub-image under consideration is selected from the dictionary. Finally, the method consists in processing or storing parametric information relating to the addresses of the reference sub-images selected from the dictionary, in order to represent each of the original elementary sub-images.

It is through this set of operations that the method described in this document makes it possible to obtain a first representation of the image with compression of the data.

In order to effect, from the said parametric information, the restitution of the initial image, the method and device described in this document perform the following operations: from an initial arbitrary image, steps similar to those above are carried out, that is to say the initial arbitrary image is partitioned and a dictionary is formed from the elementary sub-images thereof. However, the dictionary is formed only partially, performing for each sub-image only the predetermined operation corresponding to the relevant address of the dictionary for the position of the sub-image under consideration.

The data thus obtained are used for reiterating this process until the difference between two consecutively obtained images is less than a predetermined threshold. The image obtained lastly is then an approximation of the initial image.

This method, which is of interest on a theoretical level, has the major drawback that it is sometimes difficult to put into practice on an industrial level with the means known at the present time. This is because each image necessarily involves a lengthy analysis with the creation of a particularly large dictionary, the elementary sub-images of the image to be stored or transmitted all being compared with each of the reference sub-images present in the dictionary. The inventors, who carried out simulations, thus found that, for certain images of average size and resolution (512×512 pixels with 3×256 colour levels), the processing time for compression was around 1000 to 2000 seconds on a workstation, that is to say around half an hour. Such a processing time is obviously prohibitive for almost any industrial application.

Through the document WO-A-93/17519, another method and device for image processing with compression of the data relating to the initial image are known. In this method the data relating to the initial image are also partitioned, that is to say the image is divided into a plurality of elementary sub-images (referred to as "domains"). In this method a set of fractal transforms linking the sub-images to the set of initial data is next determined, that is to say a portion of the image similar to the elementary image under consideration is sought in the initial image, so as to minimise the error between the initial data and the approximate data item thus obtained. The coefficients of the set of fractal transformations thus produced constitute the first representation of the initial image.

In order to effect the restitution of the image, the method and device described in this document seek the fixed points of the elementary fractal transformations whose coefficients were received, without however explaining how this search is carried out. The initial image is thus restored by assembling the restored sub-images.

This method is also of interest on a theoretical level. However, the inventors found significant degradations of the quality of the restored image.

The inventors have sought to develop a data processing method of the same type as the methods of the state of the art analysed above, but having better performance both with regard to the quality of the restored data and with regard to the processing speed.

During their research, the inventors discovered that the reason why the methods described in U.S. Pat. No. 5,065,447 and WO-A-93/17519 have the above-mentioned defects relates to the fact that the two methods involve geometric transformations of portions of images consisting essentially of contractive similarities (construction of the dictionary in U.S. Pat. No. 5,065,447 and fractal transformation in WO-A-93/17519). They were in fact able to show that it is a question in both cases of using an idea broadly shared by persons skilled in the art interested in fractal compression at the time of filing of the present application, an idea according to which the images, whatever their origin, consist essentially of elements or parts having themselves significant degrees of resemblance.

However, the performance of WO-A-93/17519 is in fact very weak with regard to the quality of the image restored, since the inventors discovered that the capabilities for the restitution of contractive similitudes are very limited, contrary to the belief of the said persons skilled in the art of the date of filing of the present application.

Likewise the performance of U.S. Pat. No. 5,065,447 are very limited with regard to processing time. As the capabilities for the restitution of contractive similitudes are intrinsically limited, the author of U.S. Pat. No. 5,065,447 is led to set up a large dictionary which is constructed on the basis of numerous transformations of sub-images in the method according to U.S. Pat. No. 5,065,447: it is a case in fact of artificially multiplying the resemblance elements, which certainly makes it possible to substantially improve the quality of the restored image, but at the expense of the calculation time.

The inventors have therefore sought to produce a method and device for the processing of data, notably of images, making it possible to obtain better performance than the aforementioned state of the art both with regard to the quality of the data or of the restored image and with regard to calculation speed, and able to result in a significant compression of the data to be transmitted or stored.

In cases where the images to be compressed or restored are very large, the devices known at the present time, which use data of all parts of the image, must have available a large memory space, which makes them expensive and slow.

In general terms, according to a fist aspect, the present invention relates to a method for the primary processing of a first set of primary data representing physical quantities, characterised in that it includes:

a set division step during which the first set of data is divided into first sub-sets of data, and for each first sub-set of data:

a step of "constructing" a first type of global contractive mapping, for the said first sub-set of data, whose fixed point constitutes an approximation of all or part of this sub-set, using, to do this, at least one mapping belonging to the group of mappings consisting of multidimensional mappings and non-linear mappings, and determining parameters of the global contractive mapping so as to allow the use, on a second sub-set of data, of a method of successive approximations converging towards the fixed point of a second type of global contractive mapping;

the set of parameters thus determined constituting a primary representation of the said first set of data.

In general terms, according to a second aspect, the present invention relates to a device for the primary processing of a first set of primary data representing physical quantities, characterised in that it has:

a means of inputting primary data, a set division means adapted to divide the first set of data into first sub-sets of data, and a construction means adapted, for each first sub-set of data, to construct a first type of global contractive mapping, for the said first sub-set of data, whose fixed point constitutes an approximation of all or part of this sub-set, using, to do this, at least one mapping belonging to the group of mappings consisting of multidimensional mappings and non-linear mappings, and determining parameters of the global contractive mapping so as to allow the use, on a second sub-set of data, of a method of successive approximations converging towards the fixed point of a second type of global contractive mapping; and a means of outputting the set of parameters thus determined, parameters which constitute a primary representation of the said first set of data.

Owing to these provisions, the sub-sets of first data being processed successively, the memory space used, and, in particular, the fast memory space, is reduced. The method of the invention can therefore be implemented on all systems, independently of their memory capacity.

In addition, the sets of primary data of large size can thus be processed in pieces, each piece corresponding to a first sub-set of data. Likewise, the method of successive approximations can be implemented in pieces.

Finally, when it is desired to restore only part of the image constituting the set of primary data, for example in a case where it is desired to display part of an image, the invention makes it possible to consider only the parameters associated with the first sub-sets of primary data which contain the said image part.

In addition, in accordance with the invention, in order to process, and notably to represent, a set of initial data representing physical quantities, notably with compression of the said initial data, it suffices to construct, by appropriate means, a global contractive mapping, acting on the said data.

Another important characteristic of the invention lies in the fact that, in order to construct the said global contractive mapping, it is necessary to use at least one mapping belonging to the group of mappings consisting of multidimensional mappings and non-linear mappings. In doing this, any recourse to mathematical transformations belonging to the class of contractive similarities is excluded, which makes it possible to avoid the drawbacks mentioned above.

However, in order to construct the said global contractive mapping acting on the data, a person skilled in the art has a very wide range of mathematical tools which he can use. He can consequently choose from amongst these tools those which are the most favourable to performance, for example in conjunction with the type of data to be represented or the particular mapping concerned. Such a possibility does not exist in the state of the art analysed above and proves very advantageous. Thus, for example, in the case of a local processing of the image, by partitioning the latter into elementary sub-images, a person skilled in the art can choose, for the local processing, mappings which are not necessarily contractive, which gives him an important choice in the possibilities of local processing of the image and thus leaves him great freedom. In particular, he can choose, at the local level, Lipschitz mappings which will enable him to facilitate the use of the contractive nature of the global mapping.

In addition, the use of a method of successive approximations leaves a person skilled in the art the freedom to choose the final distance between the said fixed point and the data thus restored or generated.

By avoiding the formation of a dictionary and the lengthy analysis described in the document U.S. Pat. No. 5,065,447, and owing to the characteristics of the present invention, the processing of an image is notably accelerated compared with the aforementioned US document. By implementing their preferred embodiment, the inventors found that, for an image of 512×512 pixels with 3×256 colour levels, the processing time was approximately less than 100 seconds on a workstation; they also have every reason to believe that the improvements made to the method and device briefly defined above will make it possible to obtain performance with regard to speed.

It should also be noted that, since the constructed elementary mappings belong to the group of mappings consisting of multidimensional mappings and non-linear mappings, the mappings belonging to the class of similitudes are avoided, with the advantages observed above.

According to a third aspect, the present invention relates to a method for the secondary processing of several sub-sets of parameters, characterised in that it includes:

for each sub-set of parameters, an "iterative calculation" step during which, using the said sub-set of parameters, there is implemented, on a second sub-set of data, a method of successive approximations converging towards the fixed point of a second type of global contractive mapping, using, to do this, at least one mapping belonging to the group of mappings consisting of multidimensional mappings and non-linear mappings, and an assembly step during which the fixed points resulting from the iterative calculation made on each sub-set of parameters are combined, in order to constitute a secondary representation of the sets of parameters.

According to a fourth aspect, the present invention relates to a device for the secondary processing of several sub-sets of parameters, characterised in that it has:

calculation means adapted, for each sub-set of parameters, to effect an iterative calculation using the said sub-set of parameters and on a second sub-set of data, in order to implement a method of successive approximations converging towards the fixed point of a second type of global contractive mapping, using, to do this, at least one mapping belonging to the group of mappings consisting of multidimensional mappings and non-linear mappings, and an assembly means adapted to combine the fixed points resulting from the iterative calculation made on each sub-set of parameters, in order to constitute a secondary representation of the sets of parameters.

These aspects of the invention have the same advantages as those set out above. They are therefore not repeated here.

In addition, the method of successive approximations used for the secondary processing is implemented in a particularly simple fashion using the parameters obtained at the end of the primary processing, because these parameters are independent of the dimensions of the elementary sub-set with which they are associated. The inventors found, in the field of image processing with compression, good performance both with regard to the quality of the restored image and with regard to the processing speed mentioned above.

The present invention also aims to remedy an other problem where the compressed images subsequently give rise to decompressions which are liable to have different resolutions or different image dimensions, the devices of the prior art require the use of all the compressed data, which impairs their speed and efficiency.

According to a fifth aspect, the present invention relates to a method for the primary processing of a set of data representing physical quantities, a primary processing method taking into account a minimum dimension and including an "initial partitioning" step during which the said set of data is partitioned into initial elementary sub-sets, a primary processing method characterised in that it includes:

a) for each elementary sub-set which does not have the said minimum dimension, at least one iteration of a sequence of steps including:

a step of estimating suitability of division, during which a suitability of division of the said elementary sub-set is estimated, and when the suitability estimation does not meet predetermined quality criteria, a step of "post-partitioning" of the said sub-set into intermediate elementary sub-sets, b) a "construction" step in which, for each of the elementary sub-sets, whether it results from the initial partitioning or from a post-partitioning and whether or not it has itself been the subject of a post-partitioning, an elementary mapping is constructed in the elementary sub-set under consideration, determining the parameters of the elementary mapping so as:

to make contractive a first type of global mapping, for the said set of data, a global mapping belonging to the group of mappings consisting of multidimensional mappings and non-linear mappings, the restrictions of the global mapping to the elementary sub-sets consisting of the said elementary mappings, the fixed point of the global mapping constituting an approximation of all or part of this set, to allow the use of a method of successive approximations converging towards the fixed point of the said global contractive mapping; all the parameters thus determined, as well as, when at least one post-partitioning step has taken place, an item of partitioning information, representing each said post-partitioning, constituting conjointly a primary representation of the said set of data.

According to a sixth aspect, the present invention relates to a device for the primary processing of a set of data representing physical quantities, taking into account a minimum dimension, characterised in that it has:

an initial partitioning means adapted to partition the said set of data into initial elementary sub-sets, calculation means adapted, for each elementary sub-set which does not have the said minimum dimension, to effect at least one iteration of a sequence of steps including:

a step of estimating suitability of division during which a suitability of division of the said elementary sub-set is estimated, and when the suitability estimation does not meet predetermined quality criteria, a step of "post-partitioning" of the said sub-set into intermediate elementary sub-sets, a "construction" means adapted, for each of the elementary sub-sets, whether it results from the initial partitioning or from a post-partitioning and whether or not it has itself been the subject of a post-partitioning, to construct an elementary mapping in the elementary sub-set under consideration, determining the parameters of the elementary mapping so as:

to make contractive a first type of global mapping, for the said set of data, a global mapping belonging to the group of mappings consisting of multidimensional mappings and non-linear mappings, the restrictions of the global mapping to the elementary sub-sets consisting of the said elementary mappings, the fixed point of the global mapping constituting an approximation of all or part of this set, to allow the use of a method of successive approximations converging towards the fixed point of the said global contractive mapping;

an output means adapted to transmit the set of parameters thus determined, as well as, when at least one post-partitioning step has taken place, an item of partitioning information, representing each said post-partitioning in order to constitute conjointly a primary representation of the said set of data.

By virtue of these provisions, since the primary representation includes all the parameters related to all the elementary sub-sets, whether or not they have given rise to a post-partitioning, it will be possible to sort the parameters which it is wished to process as a function of the dimension of the elementary sub-set to which they are related.

If it is wished to restore the set of primary data with, for the restitution, a smaller size than that of the set of primary data, it will be possible not to take account of the parameters relating to the smallest elementary sub-sets.

On the other hand, if it is wished to restore the set of primary data with, for the restitution, a larger size than that of the set of primary data, it will be possible to take account of all the parameters constituting the primary representation.

Likewise, depending on the fineness of the details which it is wished to restore (fineness related to the resolution), it will be possible to take into account more or fewer parameters, as a function of the size of the elementary sub-sets with which they are associated.

According to a seventh aspect, the present invention relates to a method for the secondary processing of a set of parameters associated with at least one item of partitioning information, resulting from a primary processing of a first set of data, a secondary processing method characterised in that it includes:

a step of determining a minimum dimension of elementary sub-sets, a step of determining elementary sub-sets constituting a partitioning of a second set of data, a step taking into account on the one hand the said minimum dimension and on the other hand the presence of partitioning information corresponding to the said sub-sets, a step of selecting, from the set of parameters, parameters associated with the said determined elementary-sets, and an "iterative calculation" step during which, using the selected parameters and the determined elementary sub-sets, use is made, on the second set of data, of a method of successive approximations converging towards the fixed point of a global contractive mapping of the second type, the restrictions of the global mapping to the elementary sub-sets consisting of the said elementary mappings, using, to do this, at least one mapping belonging to the group of mappings consisting of multidimensional mappings and non-linear mappings.

According to a eighth aspect, the present invention relates to a device for the secondary processing of a set of parameters associated with at least one item of partitioning information, resulting from a primary processing of a first set of data, characterised in that it has:

a means of determining a minimum dimension of elementary sub-sets, a means of determining elementary sub-sets constituting a partitioning of a second set of data, a means taking into account on the one hand the said minimum dimension and on the other hand the presence of partitioning information corresponding to the said sub-sets, a means of selecting, from the set of parameters, parameters associated with the said determined elementary-sets, and calculation means adapted to effect iterative calculations, using the selected parameters and the determined elementary sub-sets, in order to implement, on the second set of data, a method of successive approximations converging towards the fixed point of a global contractive mapping of the second type, the restrictions of the global mapping to the elementary sub-sets consisting of the said elementary mappings, using, to do this, at least one mapping belonging to the group of mappings consisting of multidimensional mappings and non-linear mappings.

These aspects of the invention have the same advantages as those set out above. They are therefore not repeated here.

The present invention also aims to remedy an other technical problem: where several images must be decompressed and displayed simultaneously, the known devices of the prior art require the opening of as many files as there are images to be decompressed, which makes the decompression operation slow.

According to a ninth aspect, the present invention relates to a method for the primary processing of at least two sets of primary data representing physical quantities, referred to as "first sets of data", characterised in that it includes, for each first set of data:

a step of "constructing" a first type of global contractive mapping, for the said first set of data, whose fixed point constitutes an approximation of all or part of this set, using, to do this, at least one mapping belonging to the group of mappings consisting of multidimensional mappings and non-linear mappings, and determining parameters of the global contractive mapping so as to allow the use, on a second set of data, of a method of successive approximations converging towards the fixed point of a second type of global contractive mapping;

a step of organising a computer file including data representing each set of parameters resulting from a construction step applied to each first set of data, the parameters thus organised in a file constituting a primary representation of the said first sets of data.

According to a tenth aspect, the present invention relates to a device for the primary processing for at least two sets of primary data representing physical quantities, referred to as "first sets of data", characterised in that it has:

a means of inputting primary data, a construction means adapted, for each first set of data, to construct a first type of global contractive mapping, for the said first set of data, whose fixed point constitutes an approximation of all or part of this sub-set, using, to do this, at least one mapping belonging to the group of mappings consisting of multidimensional mappings and non-linear mappings, and determining parameters of the global contractive mapping so as to allow the use, on a second set of data, of a method of successive approximations converging towards the fixed point of a second type of global contractive mapping; and an organisation means adapted to organise a computer file including data representing each set of parameters resulting from a construction step applied to each first set of data, the parameters thus organised in a file constituting a primary representation of the said first sets of data.

Owing to these provisions, since a file is organised with parameters relating to several sets of data, when it is desired to gain access simultaneously to parameters relating to different sets of data, for example in order to display on a screen data dependent on these parameters, the opening of several computer files is avoided. The method according to the invention therefore affords a significant gain in time.

For example, when the parameters constitute compressed data relating to images, a rapid display of several decompressed images is possible.

According to an eleventh aspect, the present invention relates to a method for the secondary processing of a set of parameters resulting from a primary processing of a first set of data, a secondary processing method characterised in that it includes:

a step of reading from a file, during which at least part of the set of parameters is read from a file common to several sets of parameters, and an "iterative calculation" step during which, using the said set of parameters, a method of successive approximations converging towards the fixed point of a global contractive mapping of the second type is implemented on a second set of data using, in order to do this, at least one mapping belonging to the group of mappings consisting of multidimensional mappings and non-linear mappings, this fixed point constituting a secondary representation of the said first set of data.

According to a twelfth aspect, the present invention relates to a device for the secondary processing of a set of parameters resulting from a primary processing of a first set of data, characterised in that it has:

a means of reading from a file, adapted to read at least part of the set of parameters from a file common to several sets of parameters, and calculation means adapted to effect iterative calculations, using the said set of parameters, in order to implement, on a second set of data, a method of successive approximations converging towards the fixed point of a global contractive mapping, using, to do this, at least one mapping belonging to the group of mappings consisting of multidimensional mappings and non-linear mappings, this fixed point constituting a secondary representation of the said first set of data.

These aspects of the invention have the same advantages as those set out above. They are therefore not restated here.

The invention also relates to a printer, a photocopier, a camera and a facsimile device including a processing device as succinctly disclosed above.

The invention also relates to a memory which stores:

parameters and partitioning information resulting from a primary processing as succinctly disclosed above, and instructions for software making it possible to implement a secondary processing method as succinctly disclosed above.

The advantages of these devices and memory being identical to those disclosed above, they are not repeated here.

Figure 2:
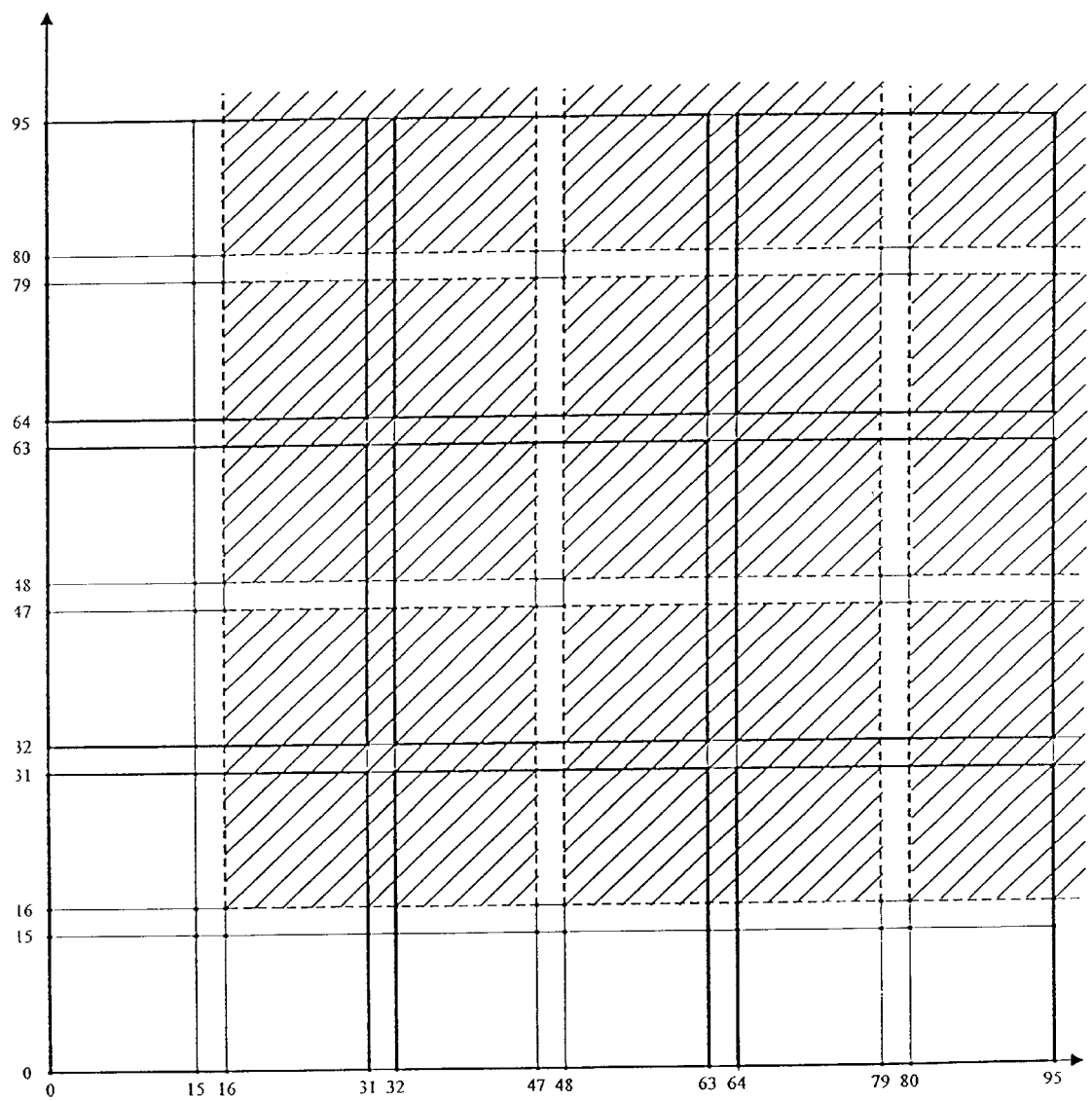
Figure 3:
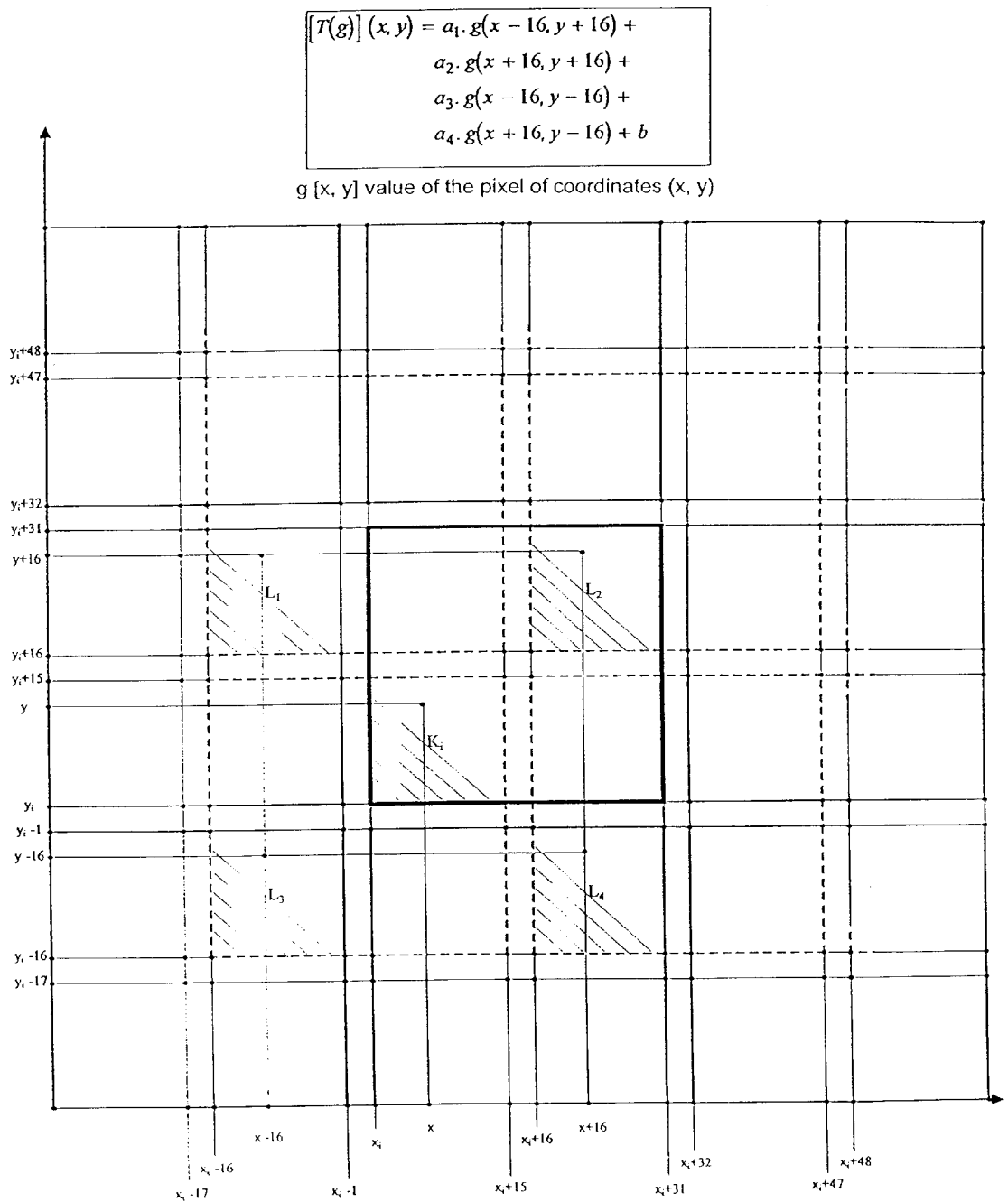
Figure 3A:
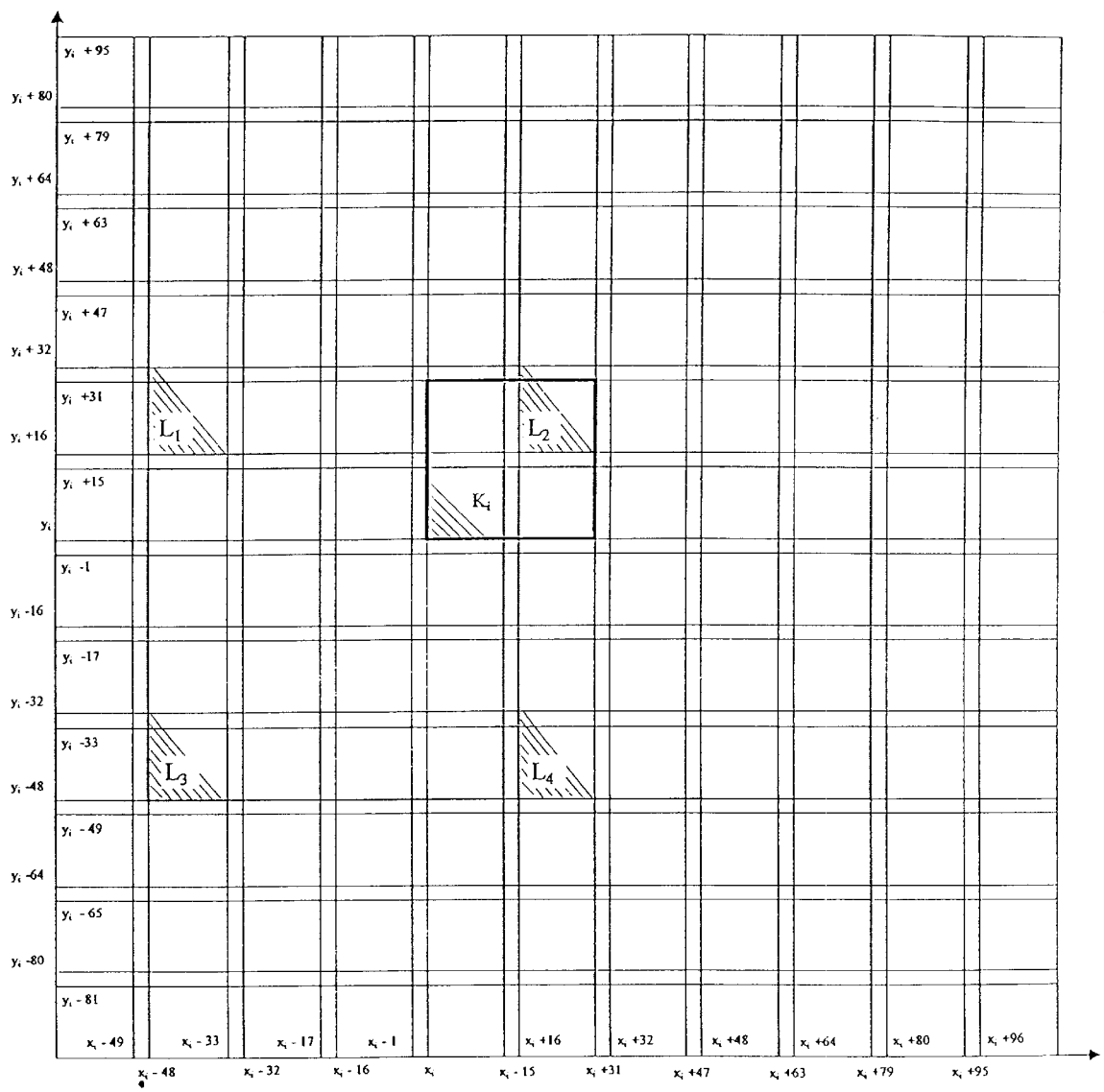
Figure 4:
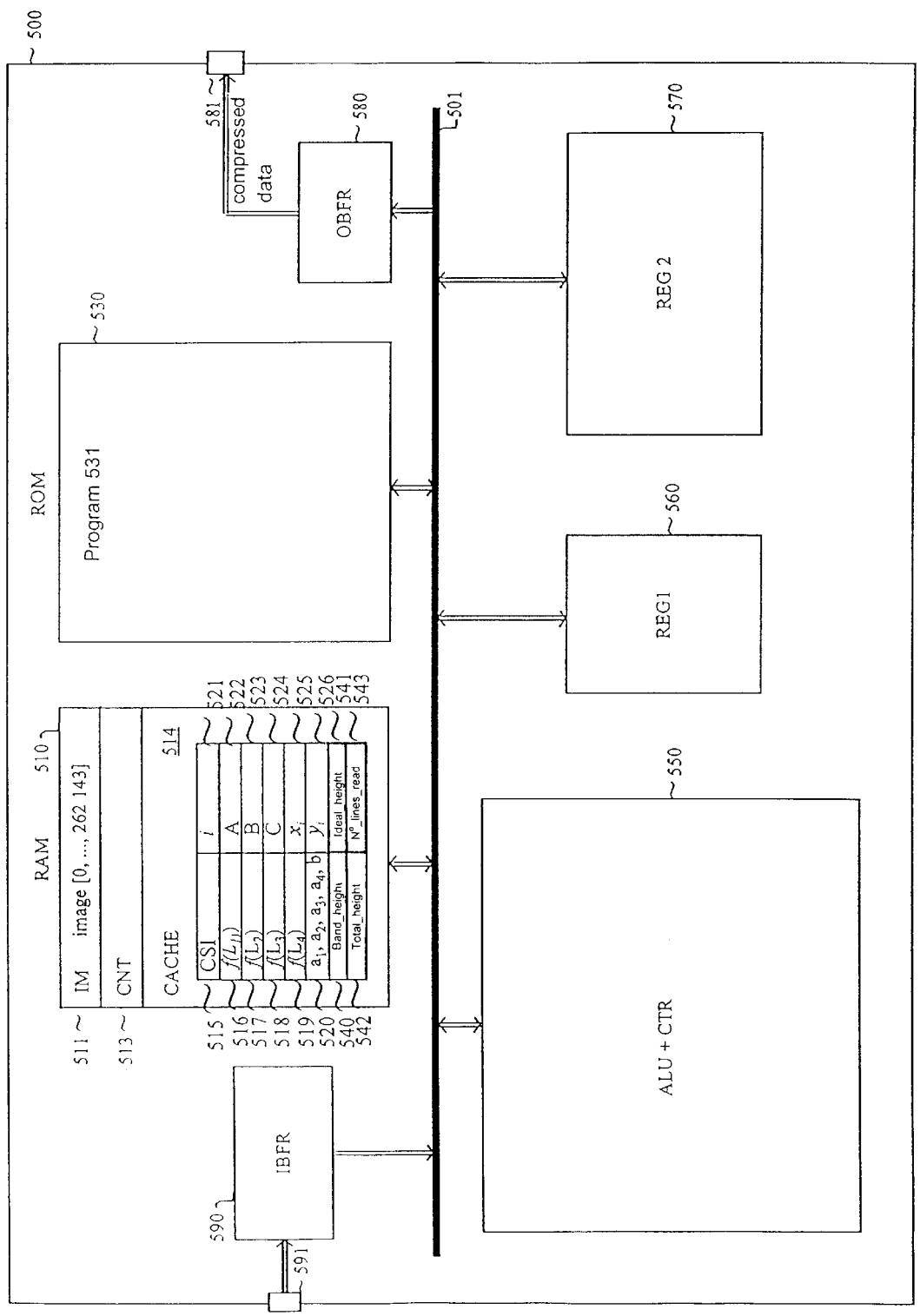
Figure 5:
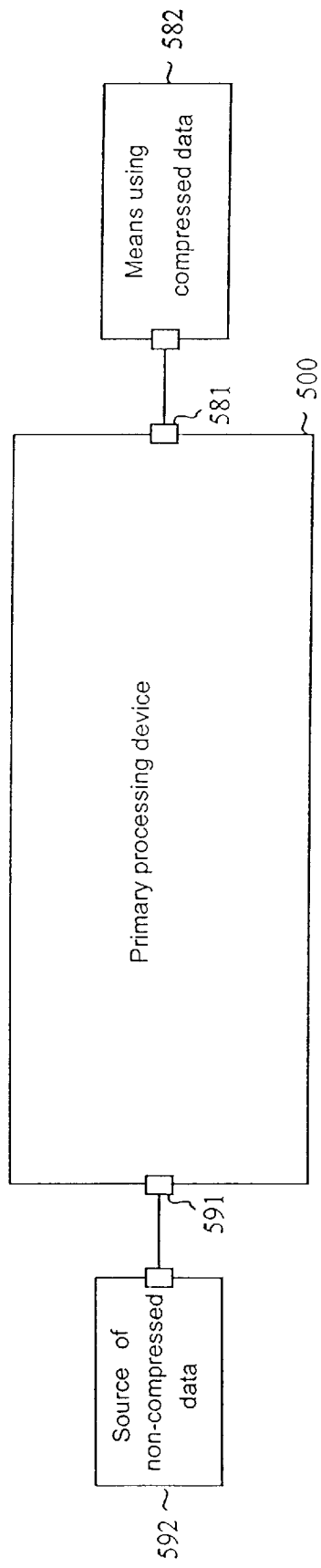
Figure 6:
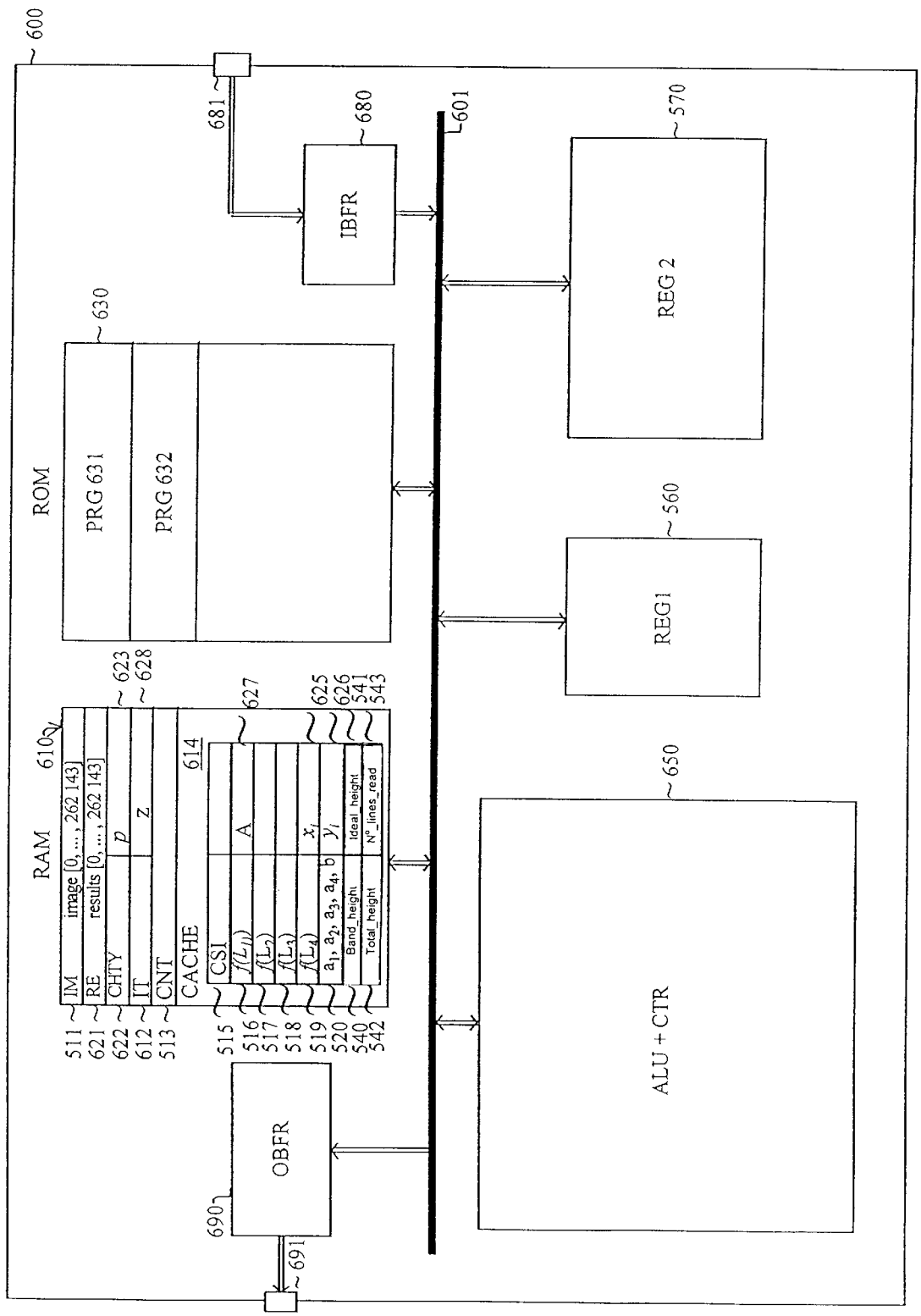
Figure 7:
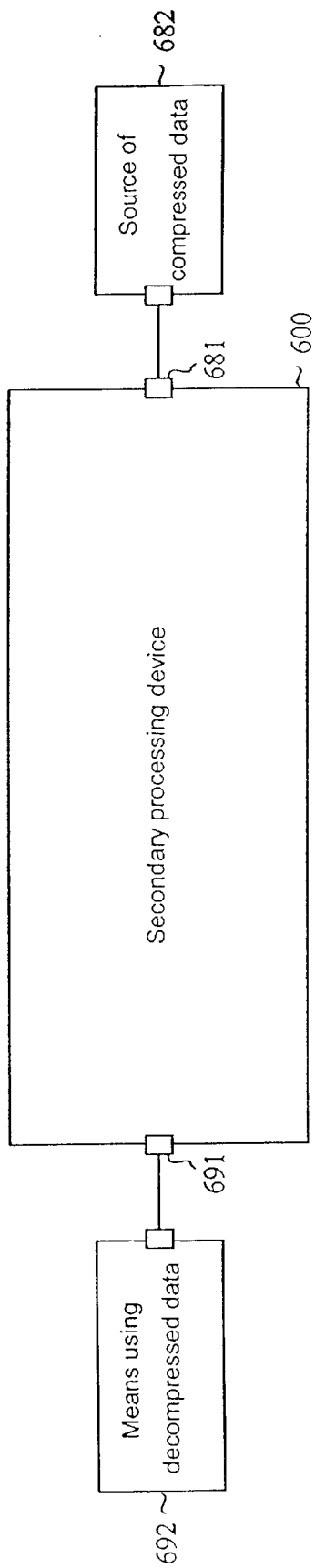
Figure 8:
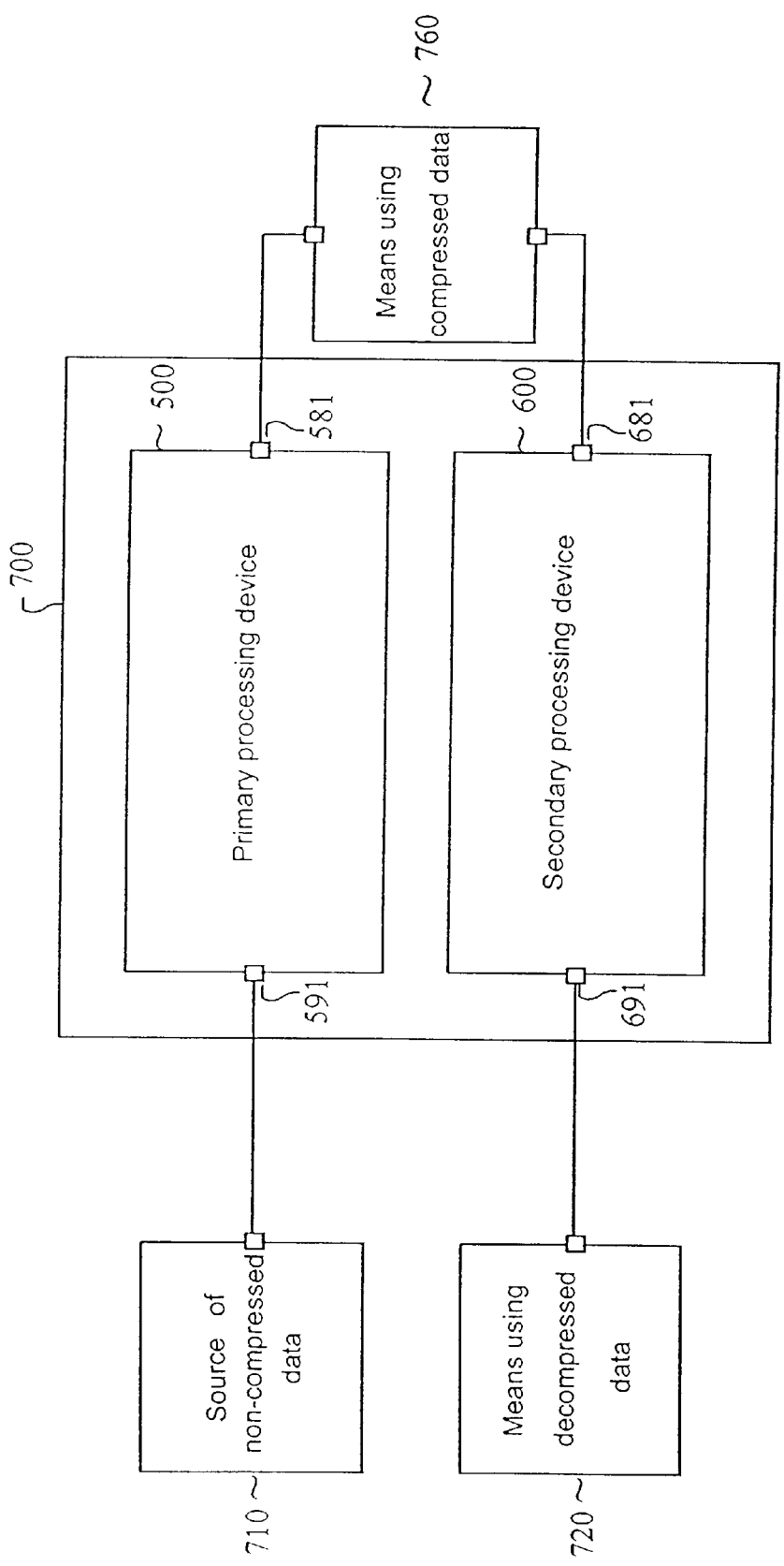
Figure 9:
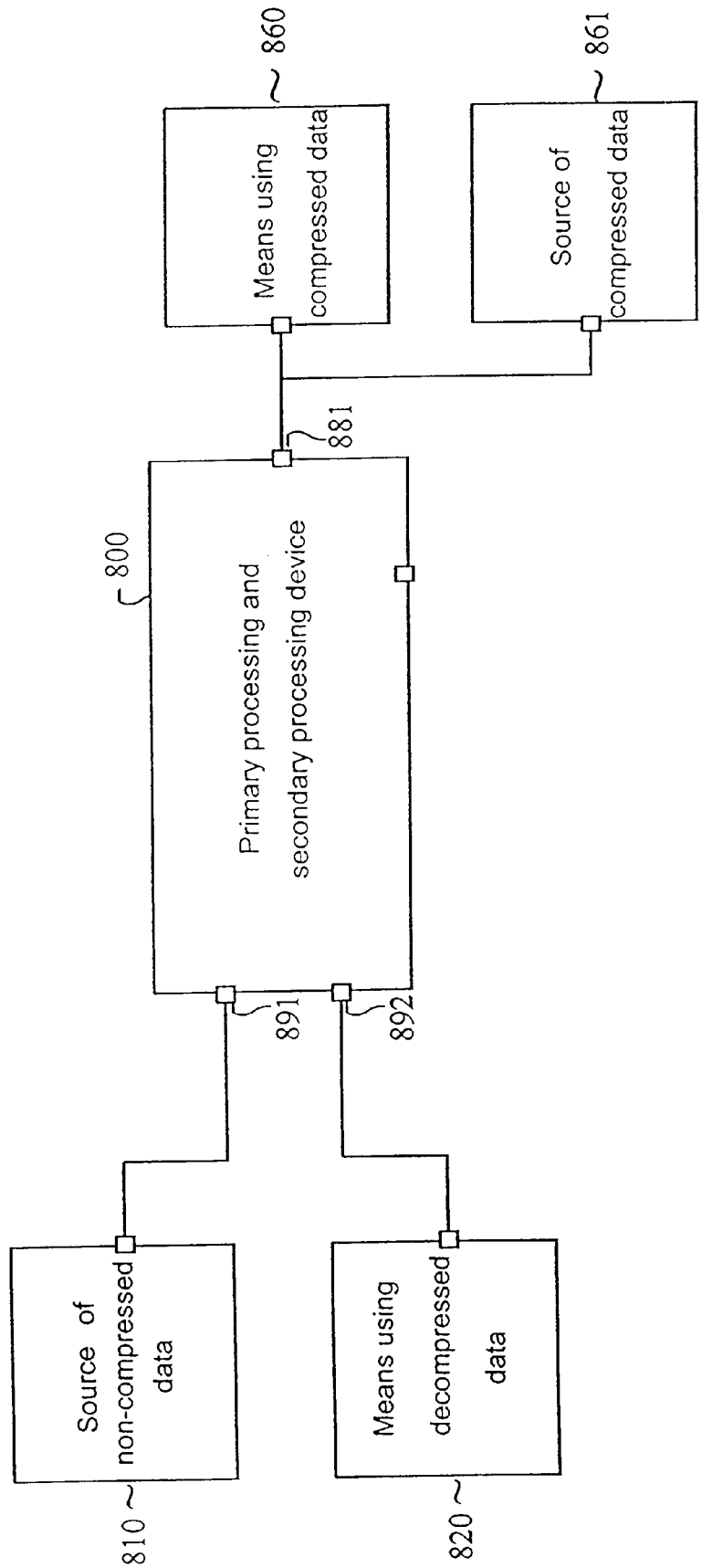
Figure 9A:
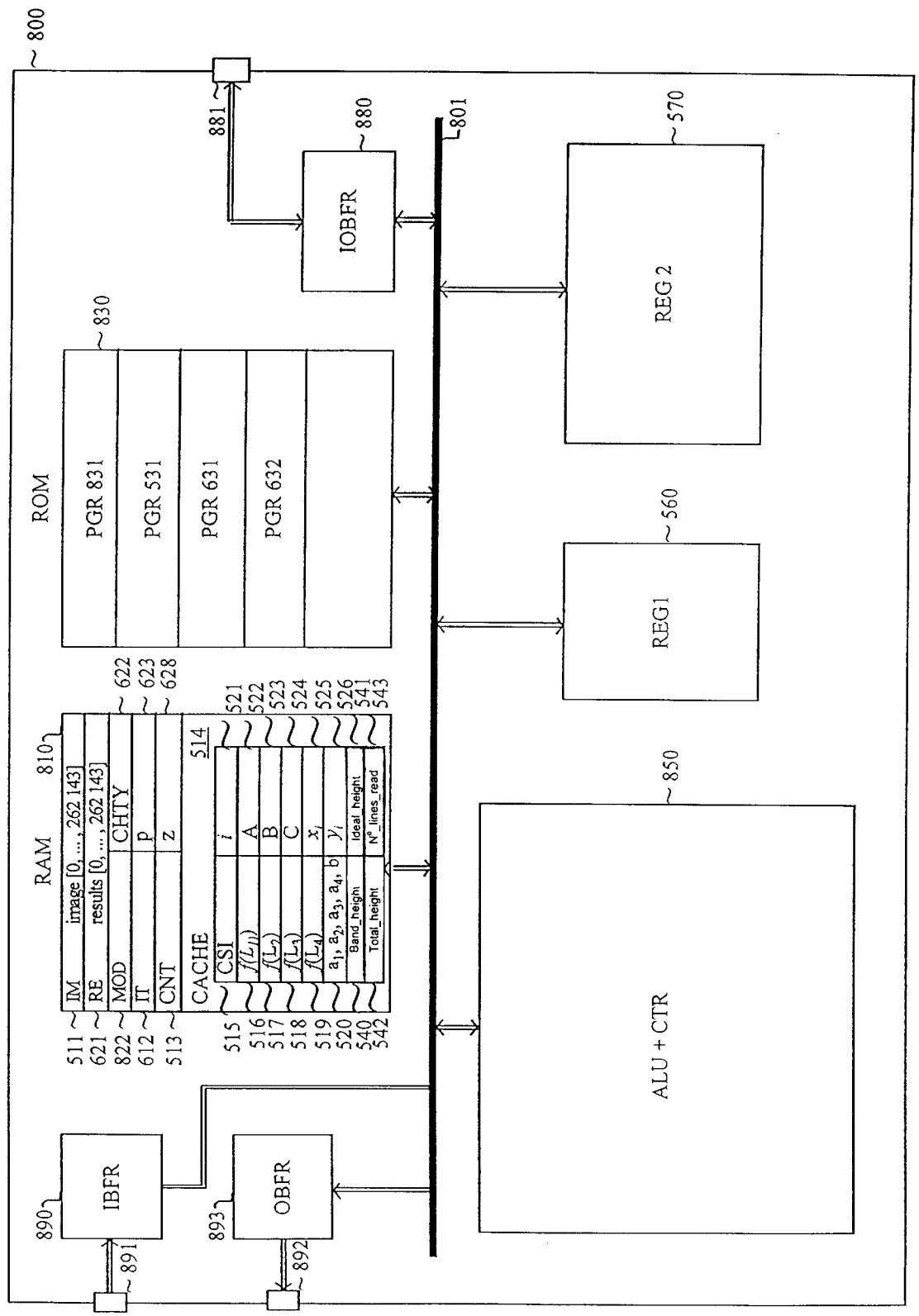
Figure 10:
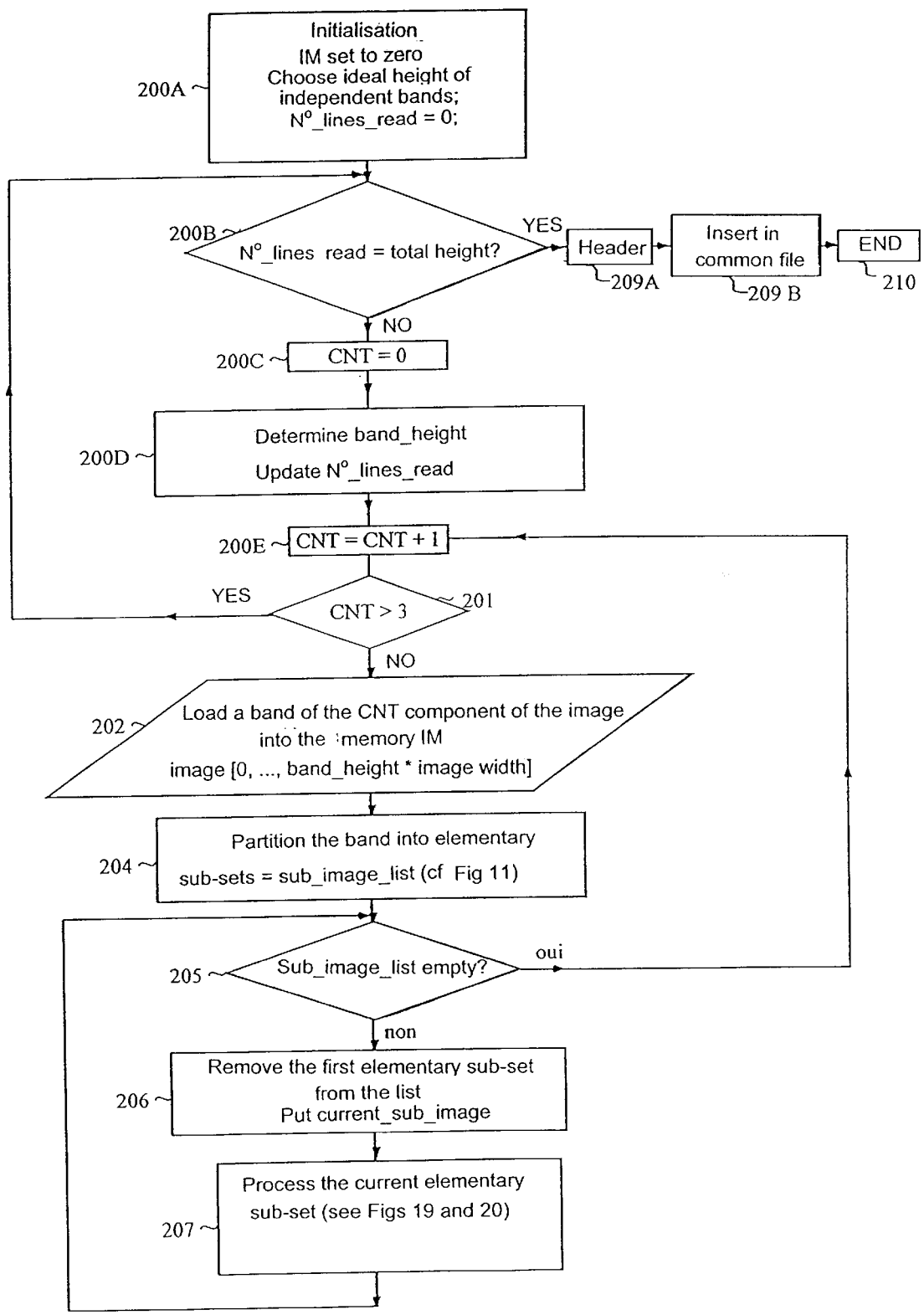
Figure 14:
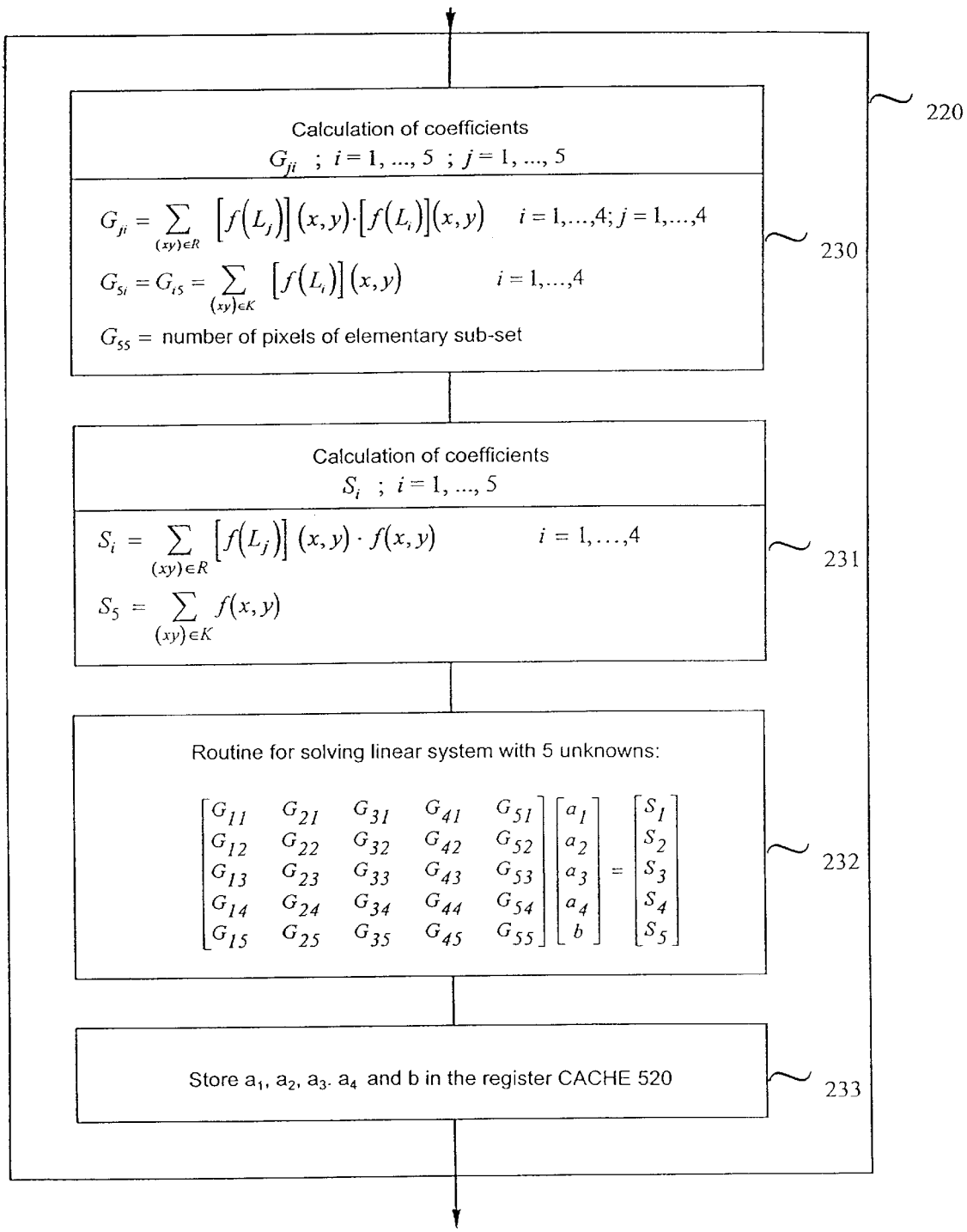
Figure 15:
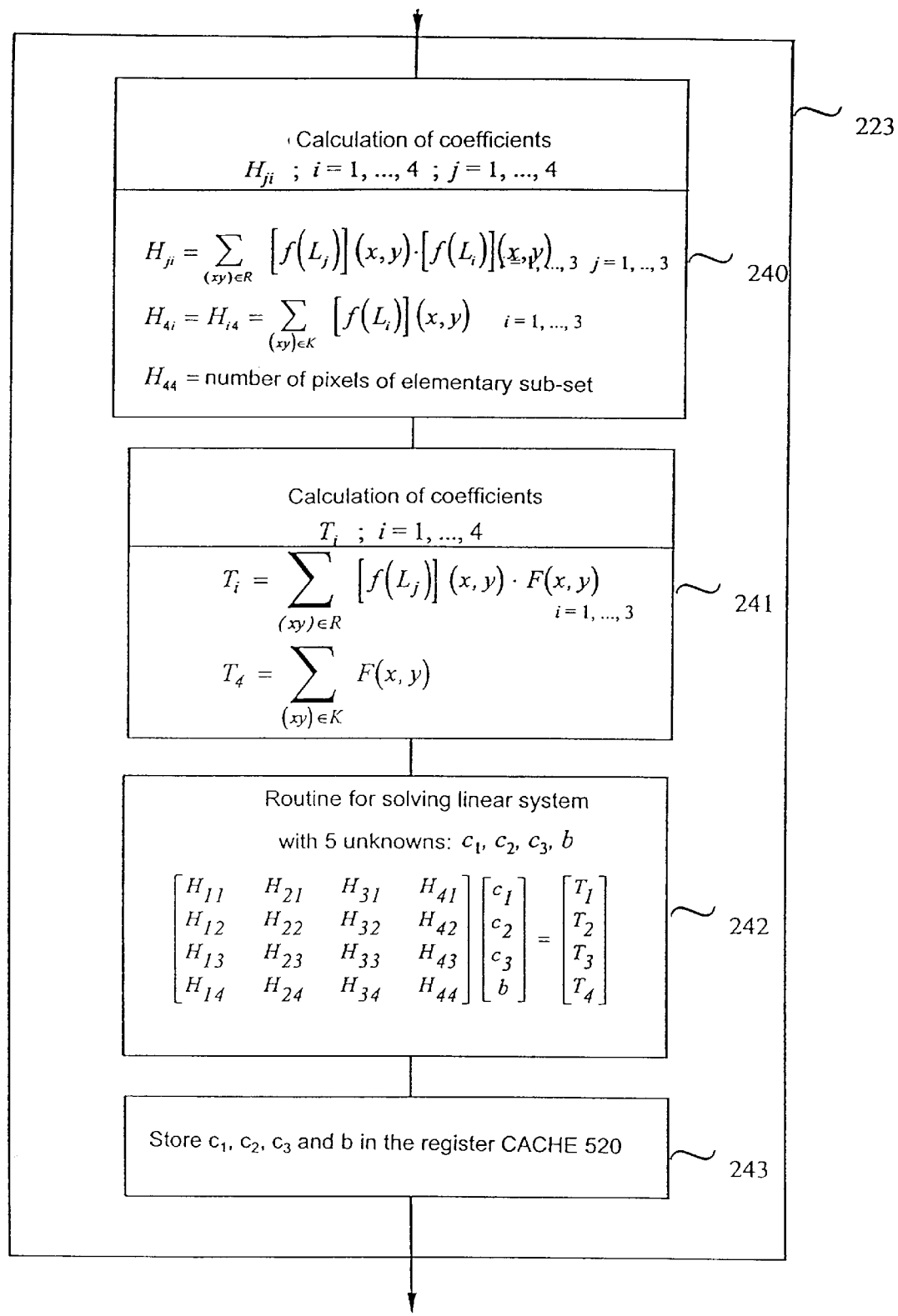
Figure 16:
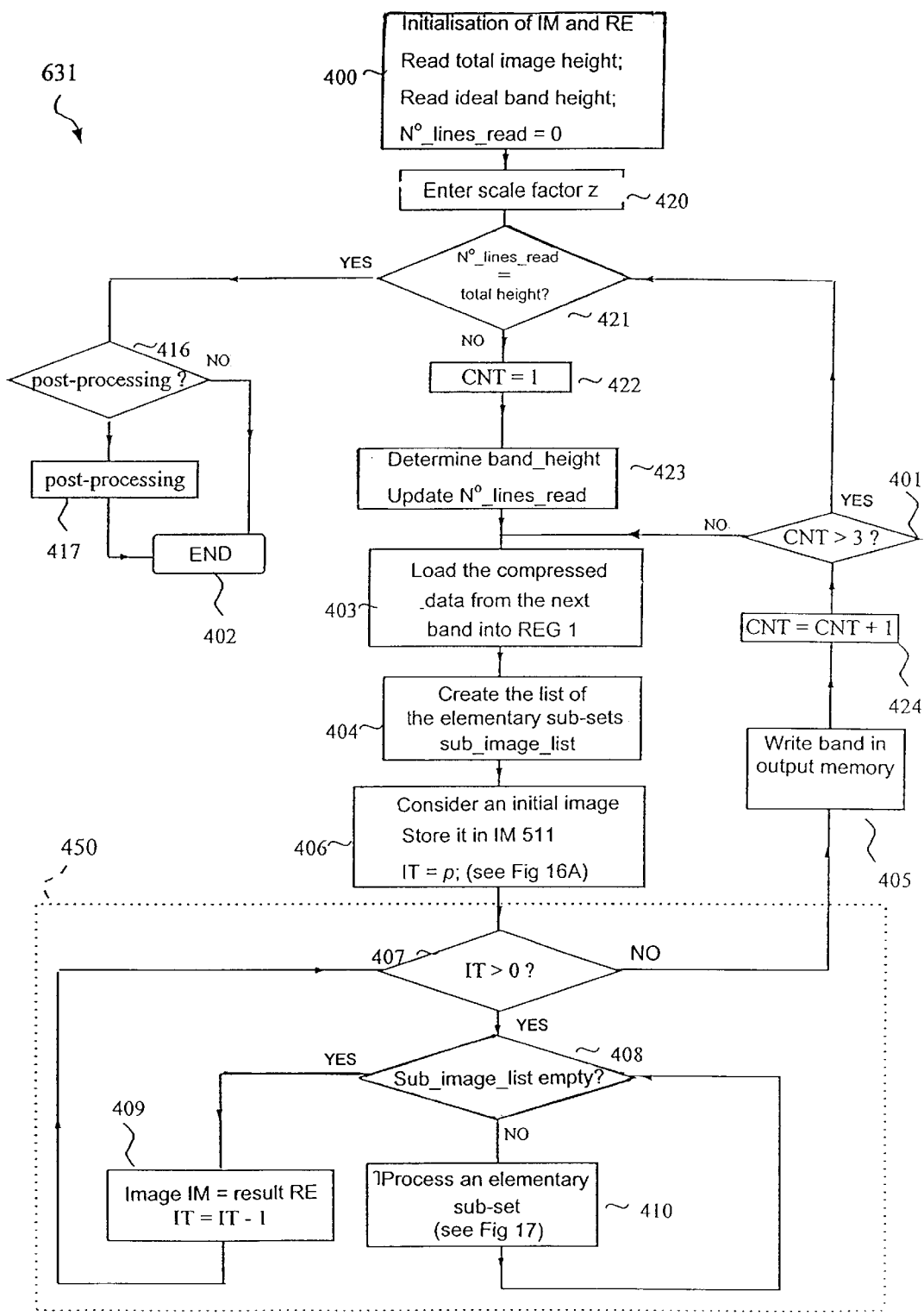
Figure 16A:
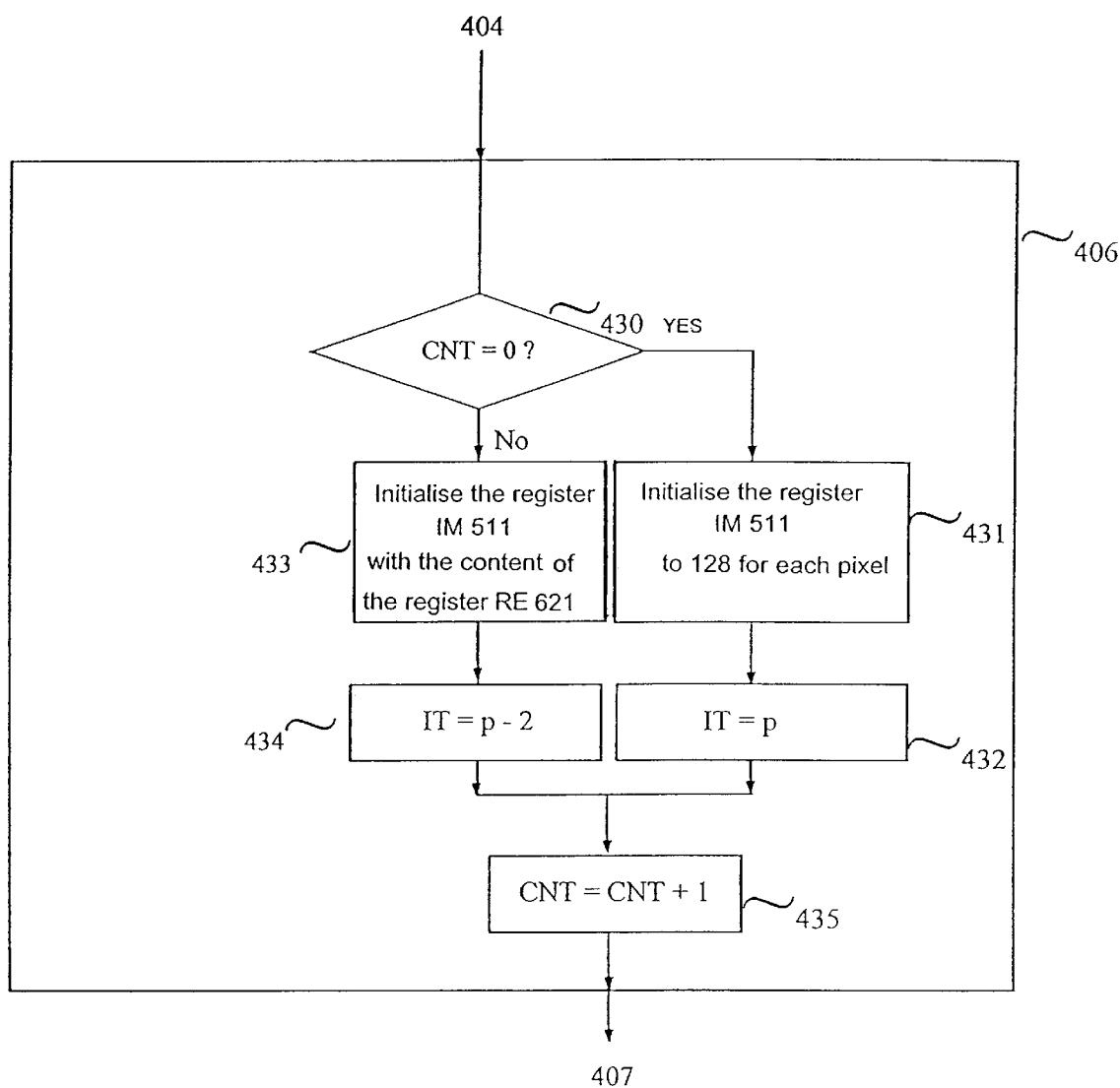
Figure 17:
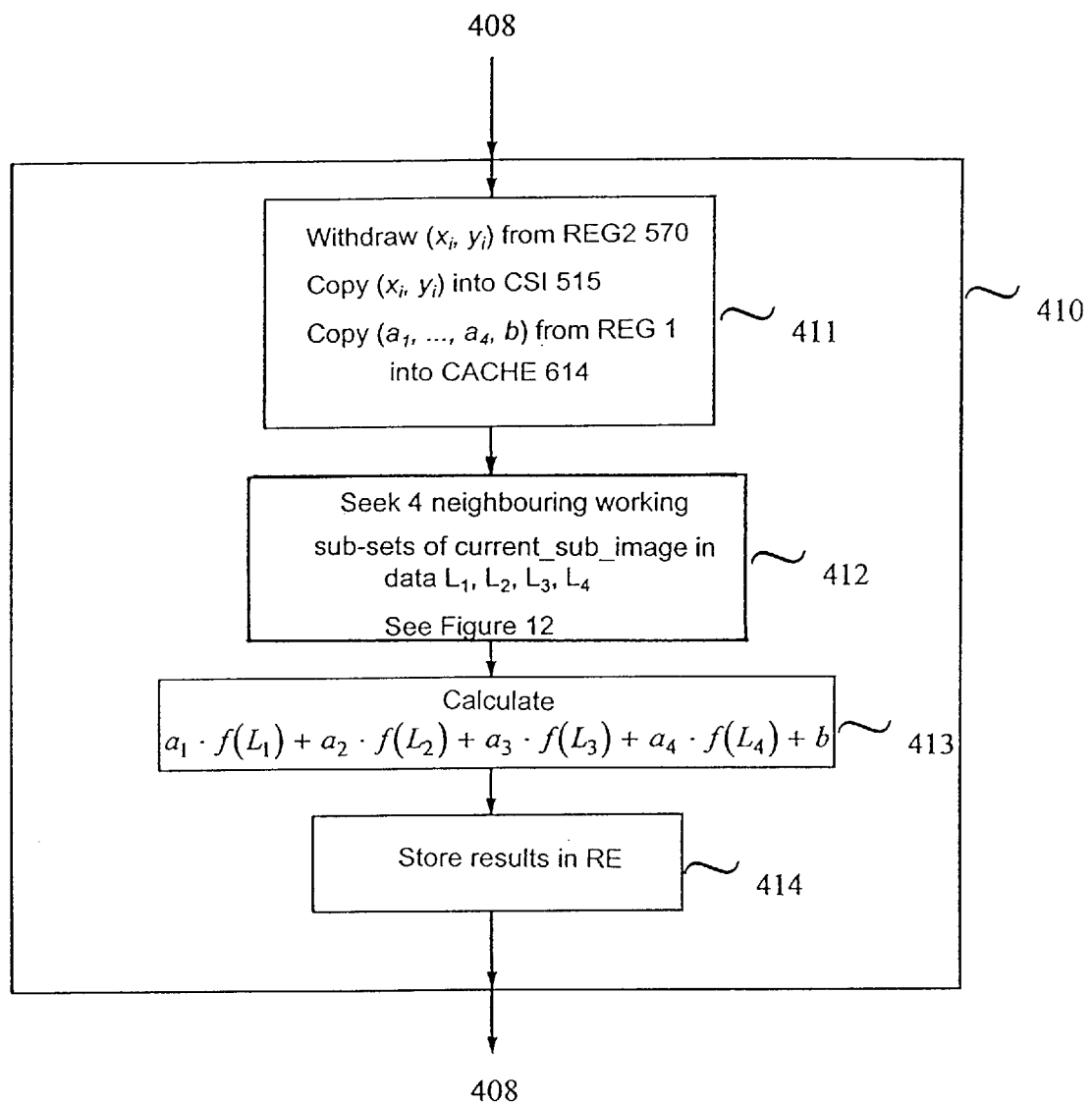
Figure 17A:
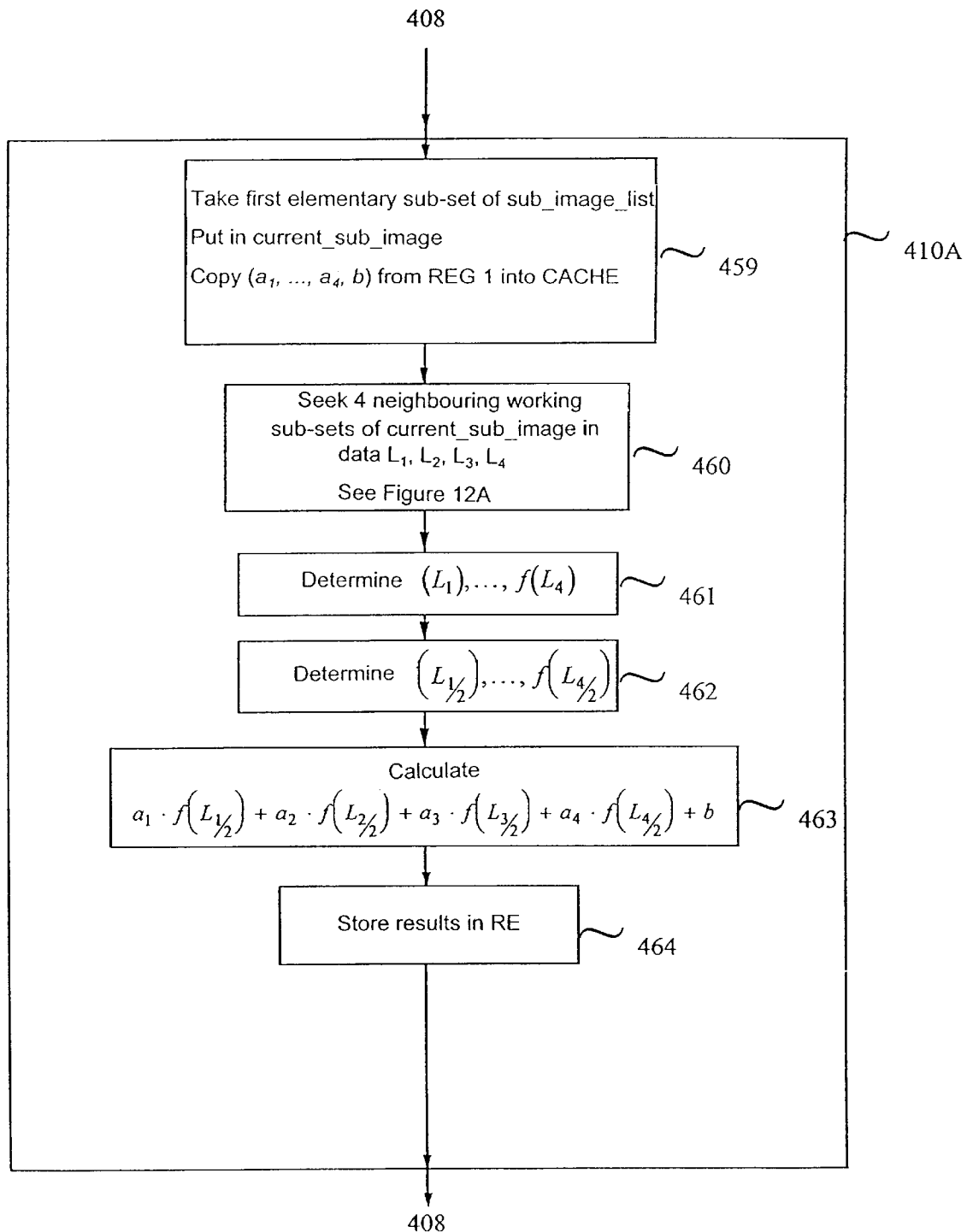
Figure 17B:
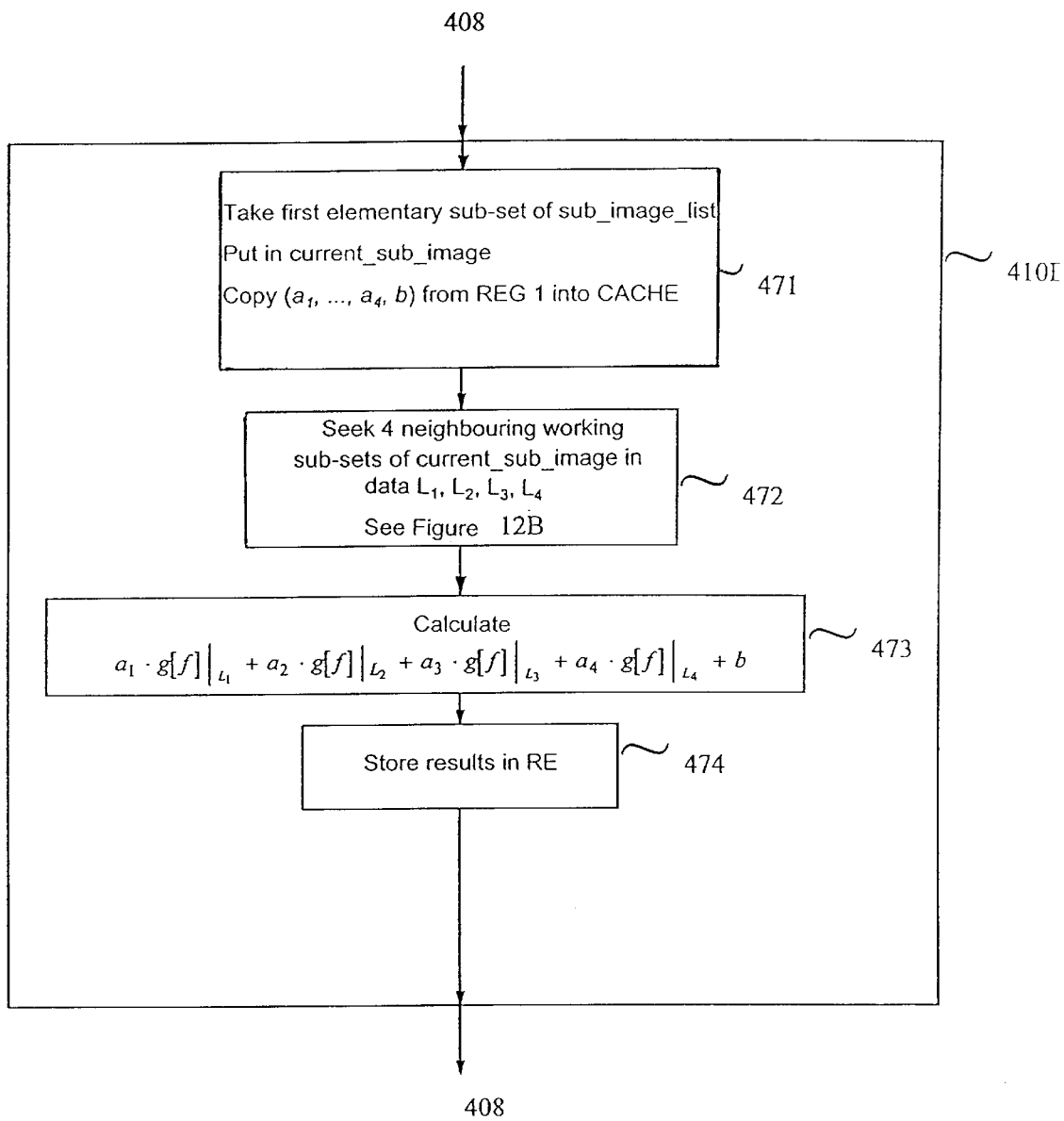
Figure 18:
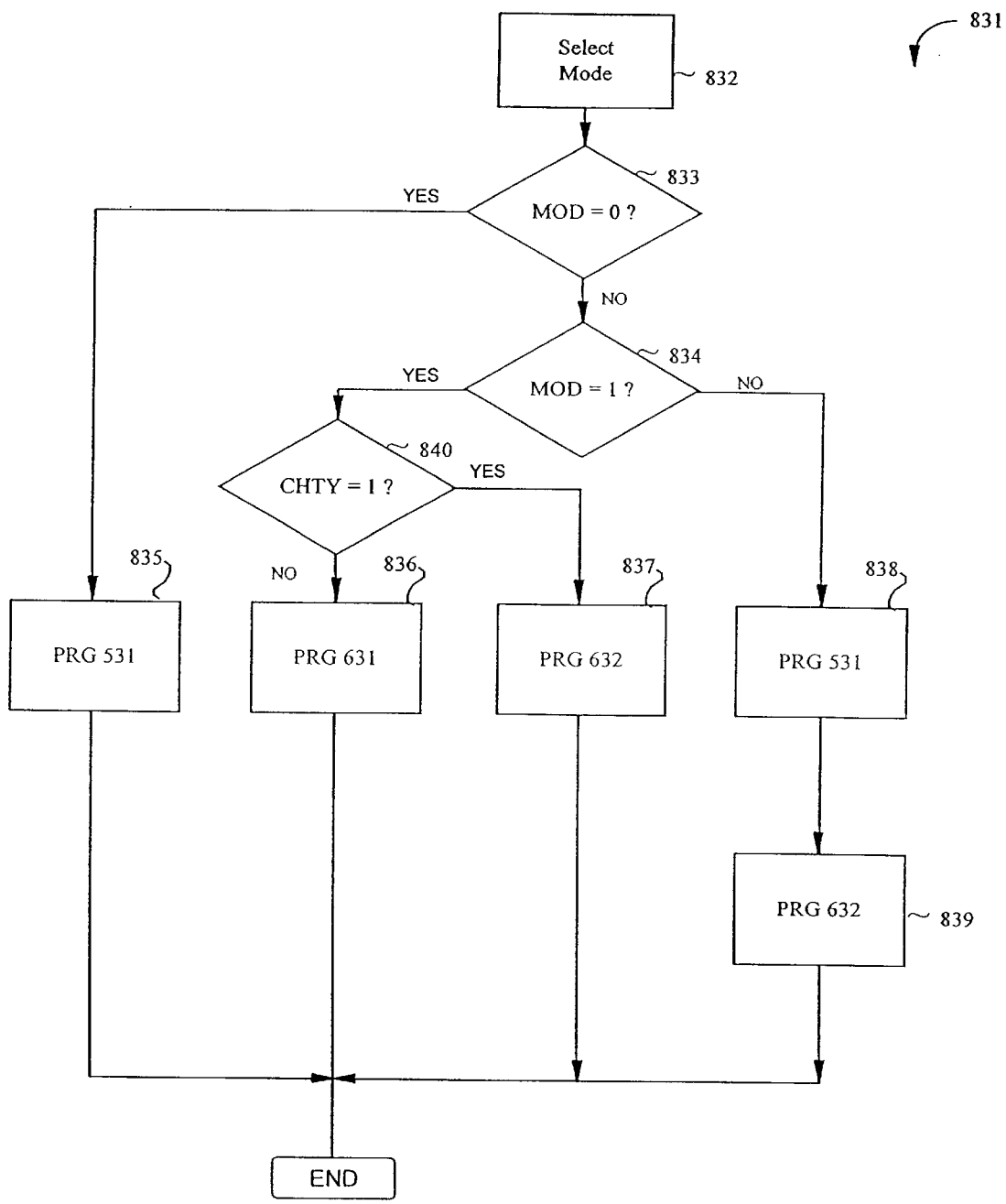
Figure 19:
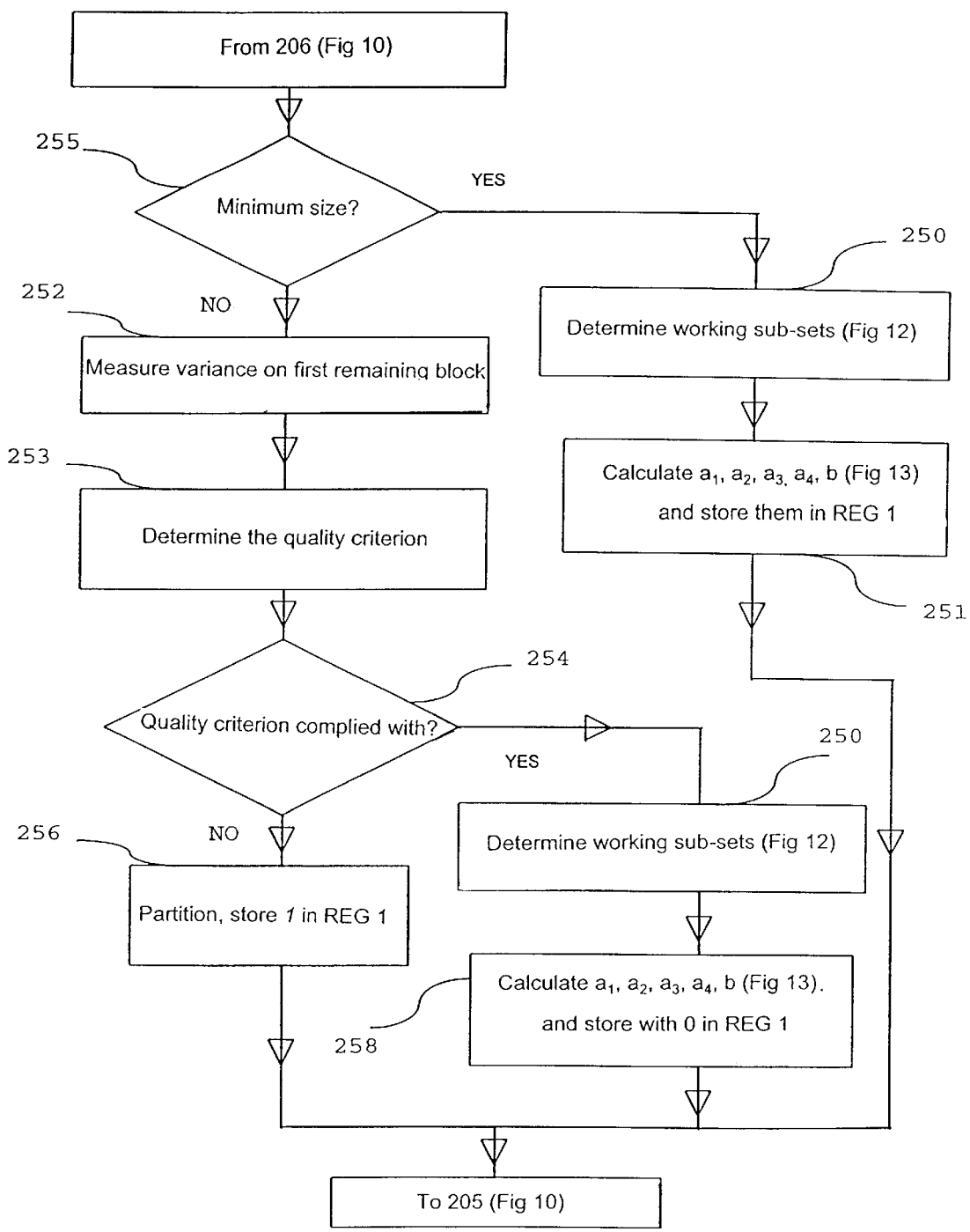
Figure 20:
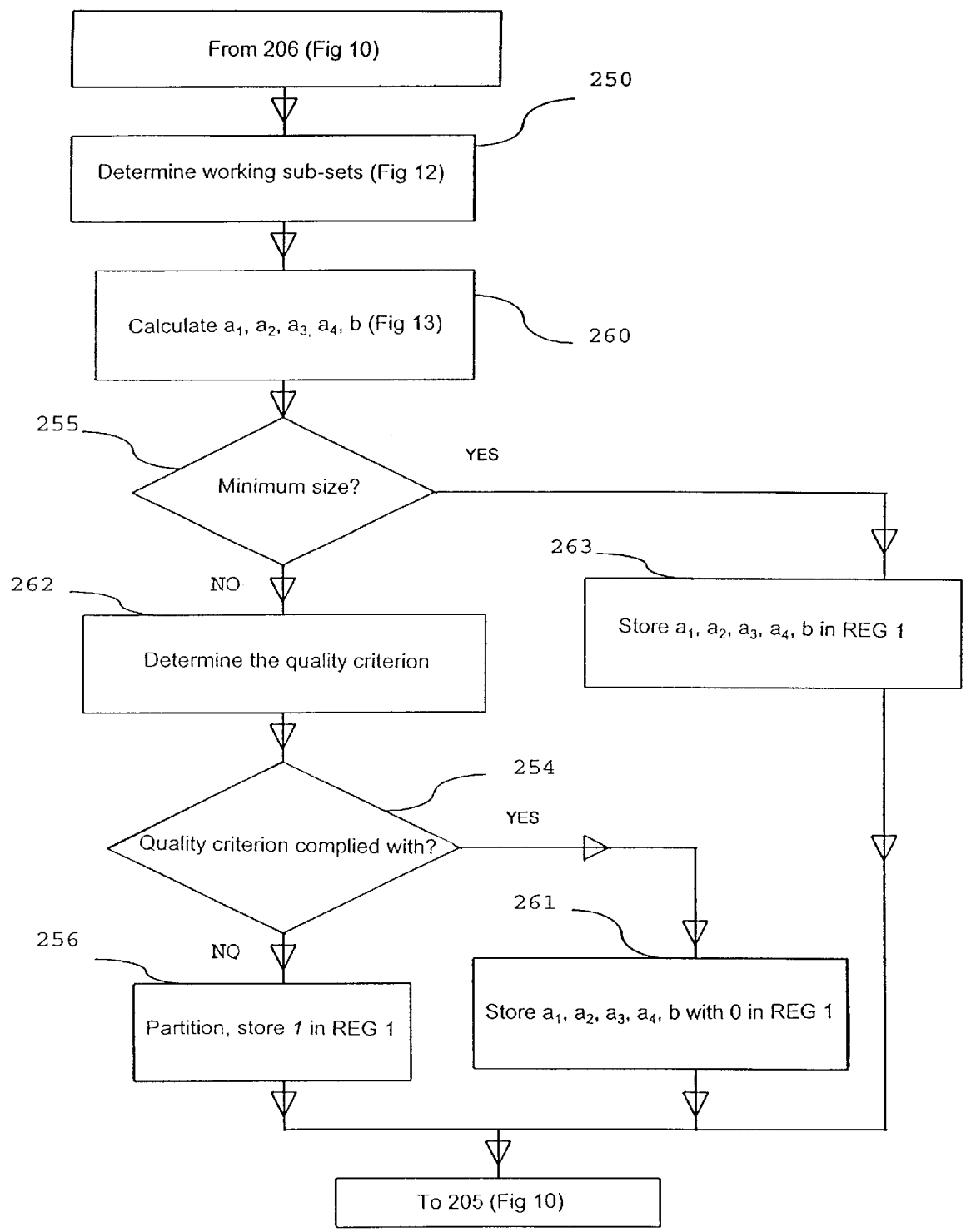
Figures 21A, 21B, 21C:
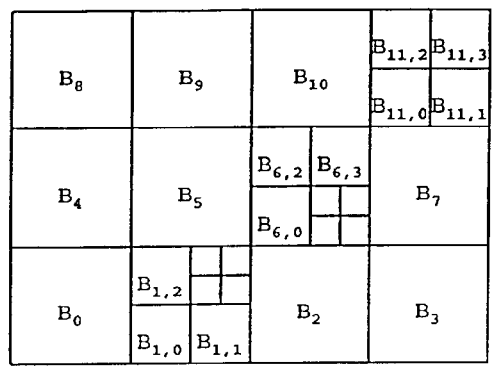
Figure 22:
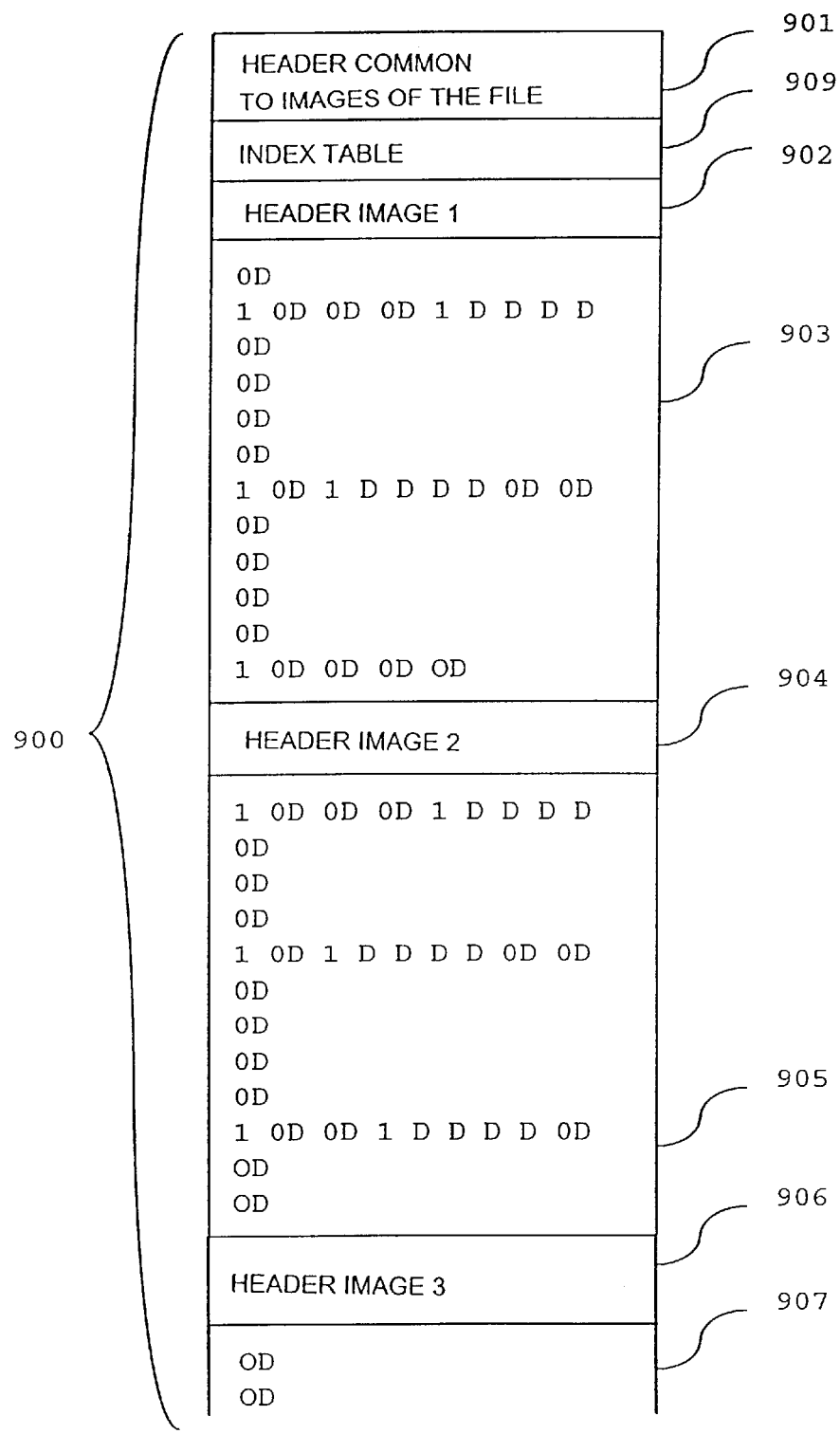

The characteristics, advantages and other objects of the invention will moreover emerge during the description of the accompanying drawings in which:

FIG. 1 illustrates schematically a partitioning of an image of 512×512 pixels into elementary sub-sets, consisting of squares of 32×32 pixels, FIG. 2 illustrates schematically a division of an image of 512×512 pixels into a tiling, consisting of squares of 32×32 pixels, offset horizontally and vertically by 16 pixels, FIG. 3 illustrates diagrammatically the arrangement of an elementary sub-set $K_i$ and of its four working sub-sets $L_1$, $L_2$, $L_3$ and $L_4$, which, in a first embodiment of the invention, are of a size identical to that of the elementary sub-set $K_i$ and offset in both directions, compared with the said elementary sub-set, in a predetermined fashion, FIG. 3A is similar to FIG. 3 and illustrates schematically a second, preferred, embodiment of the invention, in which the arrangement of an elementary sub-set $K_i$ and of its four working sub-sets $L_1$, $L_2$, $L_3$ and $L_4$, each dimension of which is double that of the associated elementary sub-set $K_i$, and which is offset in both directions, compared with the said elementary sub-set, in a predetermined fashion, FIG. 4 is a simplified block diagram of a particular embodiment of the device for the primary processing of a set of data, FIG. 5 is an outline diagram of a device using the device of FIG. 4, FIG. 6 is a simplified block diagram of a particular embodiment of the device for the secondary processing of a set of data, FIG. 7 is an outline diagram of a device using the device of FIG. 6, FIG. 8 is an outline diagram of a primary processing and secondary processing device, FIG. 9 is an outline diagram of another primary processing and secondary processing device, FIG. 9A is a simplified block diagram of a particular embodiment of the processing device of FIG. 9, FIG. 10 is a simplified flow diagram for the compression of a colour image of 512×512 pixels implemented in the device of FIGS. 4, 9 and 9A, FIGS. 11, 12, 12A, 12B, 13, 14 and 15 are flow diagrams illustrating certain operations of the flow diagram of FIG. 10, FIG. 16 is a simplified flow diagram for the decompression of a colour image implemented in the device of FIGS. 6, 9 and 9A, FIG. 16A is a flow diagram illustrating an operation of the flow diagram of FIG. 16, FIGS. 17, 17A and 17B are flow diagrams illustrating an operation of the flow diagram of FIG. 16, FIG. 18 is a flow diagram of a configuration program used in the device of FIG. 9A, FIGS. 19 and 20 are flow diagrams illustrating certain operations of the flow diagram of FIG. 10 and of a first of its variants, FIG. 21A is a depiction of a succession of partitionings of elementary sub-sets, FIG. 21B is a depiction of a structure of partitioning information and of parameters representing this succession of partitionings, FIG. 21C is a depiction of the organisation of the parameters and partitioning information resulting from the primary processing of a single image, FIG. 21D is a depiction of a second variant of the organisation of the parameters and partitioning information resulting from the primary processing of a single image, FIG. 21E is a depiction of parameters and partitioning information resulting from the primary processing and actually used during a secondary processing, according to the second variant illustrated in FIG. 21D, and FIG. 22 is a depiction of an organisation of the parameters and partitioning information resulting from primary processings of several images.

The present description is divided into five parts:

the first part relates to the general description of the method.

This part is divided in three sections:

the first section relates to the general theory at the basis of the invention. There are disclosed therein the mathematical concepts which, in general terms, underlie the invention as it can be understood in its most general terms;

the second section discloses, notably in relation to FIGS. 1 to 3, certain particular characteristics of the first implementation of the method permitting the primary processing of the data of an image of 512×512 pixels resulting in the compression of the latter. This section explains particularly the structure of the multidimensional mapping chosen in this particular embodiment and the means for calculating the coefficients of this mapping;

the third section discloses the particular characteristics of the first implementation of the method for the secondary representation of the data of the image, and notably the restitution of the data thereof using the compressed data obtained at the end of a primary processing. This section discloses more particularly the method of successive approximations used here to do this.

the second part relates to the description of a first embodiment of a processing device and is divided into six sections:

the first section deals with the description of device for the primary processing of a set of data, the second section deals with a device for the secondary processing of a set of parameters resulting from the primary processing of initial data. Such a device makes it possible, for example, to restore the image compressed by the primary processing device, the third section deals with the description of a device incorporating both a primary processing device and a secondary processing device, the fourth section deals with the description of a particular flow diagram for the compression of a colour image of 512×512 pixels implemented in the logic means included in the primary processing device, the fifth section deals with the description of two embodiments of a decompression flow diagram implemented in the logic means included in the secondary processing device, and the sixth section deals with the description of the flow diagram of the configuration program of the device incorporating a primary processing device and a secondary processing device.

the third part deals with the description of the preferred embodiment, using working sub-sets having a size different from that of the corresponding elementary sub-set. In this part, a description is given only of the modifications which are made to the embodiment described in the second part;

in the fourth part a description is given of a third variant which uses a global contractive mapping composed of non-linear mappings. In this fourth part only the elements modified compared with those of the embodiment described in the second part are disclosed; and in the fifth part, a description is given of the second variant embodiment using a quality criterion measured by means of the global contractive mapping.

1. General Description of the Method

A description will now be given, with the help of FIGS. 1 to 3, of the method as implemented in the first embodiment of the present invention. This description will be given in relation to the aforementioned figures and a certain number of mathematical concepts belonging in general terms to analysis theory and more particularly to the theories of topology and functional analysis.

In this particular embodiment, it is proposed to compress the data relating to an image, in order to end up with a "primary representation" thereof, and then to restore the initial data, that is to say to effect a "secondary representation" of the compressed data in order to obtain a set of data of the same type as the initial data with a predetermined maximum separation between the data thus restored and the initial data.

To give a clearer picture, a colour image of 512×512 pixels with three components, one luminance and two chrominance components, each having 256 levels, is considered here. In general, such a colour image is captured in the form of three components relating to the three primary colours, red, green and blue, and then converted, using conversion matrices well known to persons skilled in the art, into luminance and chrominance components.

This digital image requires 512×512×24 bits to be stored, that is to say, without data compression, 6 Mbit. In order to measure the separation between the initial image and the restored image, the square root of the mean square deviation is considered, averaged over all the pixels and all the components (conventionally denoted RMSD). The efficacy of a compression algorithm is expressed by the link between the compression ratio obtained for a given deviation (RMSD).

The particular embodiment described here makes it possible to obtain the following efficacy:

TABLE 1

General theory at the basis of the invention

| Number of iterations on decompression | RMSD | bits/pixel |
|---|---|---|
| 5 – 7 | 7 – 15 | 0.75 |
| 5 – 8 | 5 – 10 | 1.50 |
| 6 – 8 | 4 – 8 | 2.25 |
| 7 – 9 | 3 – 7 | 3.00 |
| 7 – 10 | 2 – 5 | 4.50 |

The representation of a set of data, themselves representing physical quantities, such as the data relating to the image described above, particularly when it is wished to compress these data on the occasion of the said representation, can be analysed as an approximation of the set of data.

The invention is based on the fact that the inventors have shown that fixed point theory can be used to effect such an approximation.

It is considered that the approximation of a set of initial data is an operation consisting in seeking, in a family of candidates for representation, the candidate or candidates which minimise(s) a predetermined criterion. Usually the criterion is expressed by a distance between two elements of a metric space, which can be expressed by the following equation:

$$d:(g,h) \in E \times E \to d(g,h) \in R^+ \quad (1)$$

where:
d is the distance function,
E is a metric space,
$R^+$ is the set of positive or zero reals,
g, h are elements of the metric space E, that is to say the space which contains all the mappings of a given definition field $\Omega \subset Rq$ in a field of mapping $R^d$.

The data to be processed are mappings of $\Omega \subset Rq$ in $R^d$:

$$g:(x, y) \in \Omega \subset Rq \to g(x, y) \in R^d$$

where $Rq$ and $R^d$ are spaces which are products of $R$ with a given number (n or d) of dimensions. The set of data to be processed is a given metric space E.

It is to be noted that, for example in the context of a 512×512 colour image with 3×256 levels of each of the three components, the data of the initial image are formed by a look-up table which, with each pixel position (x,y) in the definition field [0,511]×[0,511], associates three positive values of levels of the luminance components, Y, red chrominance component, Cr, and blue chrominance component, Cb, between 0 and 255. It will be observed that these data of the initial image in reality constitute a mapping $f \in E$ of a field of the space $R^2$ in a field of the space $R^3$:

$$g:(x,y) \in [0,511] \times [0,511] \subset R^2 \to [0,255]^3 \subset R^3$$

The problem of the approximation of a set of data to be processed $f \in E$, consists therefore of seeking, in a family of candidates for the representation $G \subset E$, the candidate or candidates $g^*$ in G which minimise(s) the distance (1). This is expressed by the following equation:

$$?g^* \in G: d(f,g.) = \inf\{d(f,g)|g \in G\}.$$

The said candidates belong to the set:

$$P_G(f) = \{g^* \in G | d(f,g^*) = \inf\{d(f,g)|g \in G\}\}, \quad (2)$$

where:
$P_G$ is the metric projection operator,
inf {...} is the largest of the minorants of the set under consideration {...}.

Hereinafter, it is assumed that the metric space is complete, which guarantees the existence of a unique fixed point for each contraction of the metric space in itself.

The inventors have shown that candidates for the representation can be defined as being fixed points relating to contractions, a family of contractions being conjointly determined. Under these conditions, seeking the best approximation amounts to determining the fixed point relating to the contraction minimising the said predetermined error criterion in this family of contractions.

These conditions can be expressed thus:

$$?\alpha^* \in \sigma(X): d(f,a^*) \leq d(f,a), \forall a \in \sigma(X) \quad (3)$$

where $\sigma(X)$ is the extension of a sub-set of contractions X, $(X \subset CON(E))$ the link existing between a contraction and its fixed point. This mathematical link can be expressed as follows:

$$\sigma: T \in CON(E) \to t \in E \quad (4)$$

where t is the fixed point of the contraction T (T(t)=t), CON(E) of the set of contractions of E.

The problem of approximation can, under these circumstances, be reformulated as follows: the aim is to seek the contraction whose fixed point is the best approximation of the initial data.

It will be observed that, in doing this, the inventors have shifted the problem to be resolved since it is now no longer a case of seeking a candidate constituting in itself a best approximation but a contraction whose fixed point constitutes the best approximation.

This can be expressed by the inequality:

$$?T^* \in X: d(f,\sigma(T^*)) \leq d(f,\sigma(T)) \forall T \in X \quad (5)$$

where X is a sub-set of contractions of E ($X \subset CON(E)$).

The inventors have thus shown that, in accordance with the general method discovered by them, the essential step for ending up with a representation of data to be processed, notably in the context of a compression of the data, consists in:

constituting a family of contractions able to transform the data, and selecting the parameters of one of the said contractions in order to satisfy one or more predetermined conditions, in this case minimising the distance between the initial data and the fixed point constituting the best approximation of the said initial data.

We have a case, there, in accordance with the invention, of a step of "constructing" the global contractive mapping.

Next, in accordance with the invention, the parameters thus determined must make it possible, for restoring the initial set of data, to use a method of successive approximations converging towards the fixed point of the said global contractive transform representing the said set of initial data, which, for the reasons disclosed above, makes it possible to restore, with the best approximation, the said set of data to be processed.

It is to be observed that, for implementing the general method according to the invention, and notably in the step of constructing the global contractive mapping, a person skilled in the art has, in order to constitute the family of contractions able to transform the data, a wide range of choices of mathematical mappings in the group of mappings consisting of multidimensional mappings and non-linear mappings. In the embodiment described below, the global contraction will be constructed in pieces, and for each piece a specific multidimensional linear mapping will be used. He could use other mappings, for example non-linear mappings. The general method, a particular embodiment of which will be described in detail below, thus affords a great number of possibilities of processing the data, with a view to representing them.

A description will now be given of the means used in the particular embodiment for constructing the global contractive mapping.

The inventors showed that, in order to seek a contraction whose fixed point constitutes the best approximation of the initial data, it was necessary first of all to seek a candidate constituting in itself a good approximation, which constitutes a practical approach for resolving such a problem.

The inventors have shown that the said practical approach can consist in finding the contraction which minimises the distance between the initial data and transforms, taking into account an estimated contraction factor.

This reformulation of the problem to be resolved can be expressed by the following principal optimisation problem:

$$? \hat{T} \in X : d\left(f, \frac{\hat{T}(f)}{1 - con(\hat{T})}\right) = \min\left\{d\left(f, \frac{T(f)}{1 - con(T)}\right) \middle| T \in X\right\} \quad (6)$$

where con (T) is the contraction factor of the contractive mapping T.

As, in reality, it is sometimes difficult to find the said contraction factor of the global mapping, the inventors have found that, in such cases, it can be sufficient to resolve a simplified optimisation problem following which it is necessary to find a global contraction which minimises the distance between the initial data and their transform. It will be observed here that the factor 1/1-con(T) is no longer taken into account.

This simplified optimisation problem is expressed as follows:

$$? \hat{T} \in X : d(f, \hat{T}(f)) = \min\{d(f, T(f)) | T \in X\}. \quad (7)$$

First Mode of Primary Processing of the Data of the Image

According to an important characteristic of one of the aspects of the invention as implemented here, the global contraction is constructed in pieces. To do this, a step of "partitioning" of the set of data relating to the image is performed, during which the said set is partitioned into m "elementary sub-sets".

In the particular embodiment which concerns image processing, in general terms, the initial image is partitioned into m elementary sub-images, these also referred to as "elementary sub-sets" for reasons of clarity of the description.

It will be recalled here that, in general terms, a "partitioning" of the metric space $\Omega$, amounts to defining the set $\tau = \{K_i | K_i \subset \Omega, i=1, \ldots, m\}$ where $K_1, \ldots, K_m$ are sub-sets defined in the said metric space $\Omega$, needing to comply with the following four conditions:

1) the sub-sets $K_i$ must be closed, which is expressed by $K_i = adh\ K_i$, i=1, ..., m.

2) none of the sub-sets $K_i$ can have an empty interior, which is expressed by: int $K_i = \emptyset$, i=1, ..., m.

3) their combining must produce the closure of the metric space $\Omega$ under consideration, which is expressed by:

$$adh\Omega = \bigcup_{i=1}^{m} K_i$$

4) the interiors of each sub-set $K_i$ must be separate in pairs, which is expressed by:

int $K_i \cap$ int $K_j = \emptyset\ i, j=1, \ldots, m, i \neq j$.

It will also be noted here that the partitioning of an initial data item of a given type (g∈E) amounts, in general terms, to defining a restriction $g|K_i$ for each sub-set $K_i$ of the partitioning $\tau$.

This characteristic advantageously facilitates the work of constructing the global contraction, by making this work amount to that of finding elementary mathematical transformations, each with the object of permitting the restitution of the elementary sub-set $K_i$. This is because, by definition, the sub-sets of data include fewer data than the initial set, and consequently it is substantially easier to find mathematical transformations making it possible to restore these data, it being stated once again that the set of mathematical transformations must, with regard to the entire image, constitute a global contractive mapping.

Consequently, the global contractive mapping T is thus constructed in pieces, each piece being, in accordance with this aspect of the invention, a Lipschitz mapping.

It will also be observed here that these elementary Lipschitz mappings are not necessarily contractive, and that at this level also, owing to the invention, a person skilled in the art has at his disposal a wide range of mathematical mappings enabling him to process the data relating to the sub-sets.

It will be noted however that, in certain cases, it will not be necessary to carry out this partitioning, for example when the image gives rise to a simple geometric structure.

According to the aspect of the invention described here, for each of the m elementary sub-sets ($K_1, \ldots, K_m$), n working sub-sets are considered (n=4 in this embodiment).

For each of the m elementary sub-sets produced during the partitioning, the elementary Lipschitz mapping under consideration is constructed from these n working sub-sets.

So as to be able to consider the n working sub-sets related to each of the m elementary sub-sets, a "division" of the set of initial data will be performed.

This division $L=\{L_j|L_j \subset \Omega, j=1,\ldots,l\}$, of the set of data, which is defined in the metric space $\Omega$, must comply with the following three conditions:

1) the sub-sets $L_j$ must be closed, which is expressed by:

$$L_j = \text{adh } L_j, j=1, \ldots, l$$

2) None of the sub-sets $L_j$ can have an empty interior, which is expressed: int $L_j \neq \emptyset$, j=1, ... l.

3) Their combining is included in the metric space Q, which is expressed by:

$$\bigcup_{j=1}^{l} L_j \subset \Omega$$

It is observed at this stage that the division thus performed encompasses on the one hand the partitionings as defined above, but also encompasses on the other hand what will be termed a "tiling" for which the sub-sets $L_j$ are liable to overlap, which is expressed by the equation:

$$\text{int } L_i \cap \text{int } L_j \neq \emptyset, \, i,j=1,\ldots,l, i \neq j.$$

In the first embodiment, the image of 512×512 pixels is, according to an initial partitioning, partitioned into 256 square elementary sub-sets of 32×32 pixels (see FIG. 1).

In accordance with a custom in the field of image processing, the data are organised as follows:

the reference point of coordinates (0,0) consists in the point at the bottom left of the image;
the columns (x axis) are numbered from left to right;
the rows (y axis) are numbered from bottom to top.

FIG. 1 illustrates diagrammatically on the y axis the rank of certain rows of the image and on the x axis the rank of certain columns. For reasons of clarity, the scale used on the x axis and on the y axis is not uniform. On the bottom left hand part of FIG. 1 the first 9 squares of 32×32 pixels are illustrated, so as to show the rows and columns constituting the boundary thereof. The squares of 32×32 pixels constitute an example of partitioning of the field $\Omega=[0,511]\times[0,511]$ where the image under consideration is defined.

In the first embodiment, the division of the image of 512×512 pixels into working sub-sets is illustrated in FIG. 2. It is similar to the partitioning in FIG. 1, except that the working sub-sets of 32×32 pixels are offset by 16 pixels in both directions, and in each direction of movement, compared with the elementary sub-sets. In this figure, which illustrates the bottom left hand corner of the image of 512×512 pixels, the elementary sub-sets resulting from the partitioning are illustrated in bold lines whilst the working sub-sets resulting from the division are illustrated in broken lines and are hatched.

In FIG. 2, the working sub-sets touching the edges of the image have not been depicted. Many solutions exist for supplying, to each elementary sub-set which is not associated with working sub-sets wholly within the initial image, substitute working sub-sets.

It is to be noted here that, throughout the remainder of the description, the choice of such a solution is applied to the working sub-sets for the primary processing, for the secondary processing and for the complex processing: the points of the working sub-sets defined above which do not belong to the image, that is to say those where at least one of the coordinates is negative, notionally have a mean value associated with them, for example 127 for the luminance component and any chrominance components.

FIG. 3 illustrates how, in this first embodiment, each working sub-set $L_j$ is linked with a given elementary sub-set $K_i$. The elementary sub-set $K_i$ with the coordinates $(x_i,y_i)$ is illustrated in bold lines, whilst the corresponding working sub-sets are illustrated in broken lines, the other sub-sets being outlined in fine lines. It is to be observed that, in this first embodiment, with each of the sub-sets $K_i$ there are linked four working sub-sets $L_j$ (numbered $L_1, \ldots, L_4$) offset by 16 pixels in both directions. We have a case in reality of the four sub-sets resulting from the division which overlap the elementary sub-set under consideration (resulting from the partitioning). The following expressions show the coordinates of a sub-set $K_i$ and of the working sub-sets $L_1, \ldots, L_4$.

$K_i$: $[x_i, x_i+31] \times [y_i, y_i+31]$ $L_1$: $[x_i-16, x_i+15] \times [y_i+16, y_i+47]$ $L_2$: $[x_i+16, x_i+47] \times [y_i+16, y_i+47]$ $L_3$: $[x_i-16, x_i+15] \times [y_i-16, y_i+15]$ $L_4$: $[x_i+16, x_i+47] \times [y_i-16, y_i+15]$ It will be noted that, in this first embodiment, the sub-sets resulting from the division have the same dimensions as those resulting from the partitioning; in addition, in this first embodiment, the division of the image into working sub-sets does not constitute a tiling but a simple partitioning because of the fact that the working sub-sets have a size identical to the sub-sets and that the offset, between a working sub-set and the corresponding elementary sub-set, is equal to half a side of the square sub-sets under consideration.

The points of the working sub-sets defined above which do not belong to the image, that is to say those where at least one of the coordinates is negative or greater than or equal to 512, notionally have a mean value associated with them, for example equal to 127, for each component.

Below, a description will be given in particular with the help of FIG. 3A, of a second, preferred, embodiment in which, in accordance with another aspect of the invention, the working sub-sets have a size different from that of the elementary sub-set to which they correspond, the division of the image thus resulting in a tiling.

The global mapping used in the particular embodiment described with the help of FIGS. 2 and 3 will now be defined.

It should be stated first of all that the global contractive mapping consists in taking the element g of the metric space E in order to transform it into an element T(g) of the same metric space E, which is expressed by $$T: g \in E \rightarrow T(g) \in E \quad (8)$$

The fact that g belongs to the space E (g∈E) can also be expressed as follows:

$$g:(x,y) \in \Omega \subset \mathbb{R}^q \rightarrow g(x,y) \in \mathbb{R}^d \quad (9)$$

It is to be observed in fact that equation (9) merely explains the type of special data under consideration: to each pair of values (x,y) taken in the field of definition (in this case the plane image $\Omega \subset R^2$) there corresponds a value in the field of application $R^d$, that is to say three values amongst 256 levels of three components, Y, Cr et Cb. It is also to be observed that, it being a case of image processing, the definition field is $R^2$, whilst the mapping field is $R^3$ since the colour image has three components, one luminance and two chrominance.

In the particular embodiment of FIGS. 2 and 3 described below and in accordance with another aspect of the invention, each "piece" of the global contractive mapping, that is to say a Lipschitz elementary mapping, is a multi-linear mapping of the type:

$$T(g)|_{Ki} : (x, y) \in Ki \rightarrow [T(g)](x, y) = \sum_{j=1}^{n} a_j \cdot g \bigg|_{L_j} (x, y) + b \quad (10)$$

where:

T(g)\Ki the restriction of T(g) to the elementary sub-set $K_i$
n>1 the dimension of the multilinear mapping
$a_1, \ldots a_n$ the multiplying coefficients
b the translation factor
$L_1, \ldots L_n$ the working sub-sets, their position predetermined with respect to $K_i$ and linked to this sub-set.

Thus, in the example of FIG. 3, the values g (x,y) of the pixels of coordinates (x,y), are transformed as follows:

$$[T(g)](x,y) = \alpha_1 \cdot g(x-16, y+16) + \alpha_2 \cdot g(x+16, y+16) + \alpha_3 \cdot g(x-16, y-16) + \alpha_4 \cdot g(x+16, y-16) + b \quad (10a)$$

where:

g (x,y) is the value of the pixel (x,y) in the image g
(x,y) is a pixel of the elementary sub-set $K_i$
g(x−16, y+16) is the value of the corresponding pixel in the working sub-set $L_1$
g(x+16, y+16) is the value of the corresponding pixel in the working sub-set $L_2$
g(x−16, y−16) is the value of the corresponding pixel in the working sub-set $L_3$
g(x+16, y−16) is the value of the corresponding pixel in the working sub-set $L_4$
$a_1, \ldots, a_4$ the multiplying coefficients
b the translation factor.

It can be seen that equations (10) and (10a) above are of a linear and multidimensional, that is to say multilinear, nature, the coefficients $a_j$ for $j=1, \ldots, n$ and b being respectively the multiplying coefficients and the translation factor. The coefficients $(a_1, \ldots, a_n, b)$ are here the "parameters", within the meaning of the invention, of the elementary mapping relating to the sub-set $K_i$. The set of coefficients $(a_1, \ldots, a_n, b)_{Ki}$ relating to the m elementary sub-sets $(K_1, \ldots, K_m)$ constitutes, in this embodiment, "the set of parameters" of the global contractive mapping, within the meaning of the invention.

It should be stated that, in the particular embodiment, n=4, which means that only four working sub-sets $L_j$, $j=1, \ldots, n$ as defined in relation to FIG. 3 are related to each elementary sub-set $K_i$.

Thus, with each pair of values (x,y) of a given elementary sub-set $K_i$, there is associated a value calculated using the multilinear equation (10) (see the example of FIG. 3 and equation 10a). This is done for all the m elementary sub-sets $(K_1, \ldots, K_m)$.

It will now be explained how the coefficients of the multilinear mapping $a_j$, $j=1, \ldots, n$ and b are determined for each of the elementary working sub-sets $K_i$.

In order to resolve the simplified optimisation problem (7) it is necessary, in general terms, for each elementary sub-set $K_i$, to minimise the distance between the restriction to the elementary sub-set $K_i$ and its transform by the global contractive mapping. In other words, it is necessary to minimise the distances:

$$d(f|_{Ki}, T(f)|_{Ki}), i=1, \ldots m \quad (11)$$

In the particular embodiment, use is made of a method of minimising the least squares in the presence of constraints, where the quantity to be minimised is the distance defined in equation (11) and is expressed in the form:

$$[d(f|_{Ki}, T(f)|_{Ki})]^2 = \sum_{(x,y) \in Ki} (f(x, y) - [T(f)](x, y))^2 \quad (12)$$

$$|a_i| < \beta, i = 1, \ldots, n \quad (13)$$

where $\beta < 1/n$.

By minimising expression (12) under constraints (13), each restriction of T(f) to $K_i$ and at the same time the coefficients $a_j$ and b of equation (10) are determined.

The coefficients $a_j$, b associated with each of the sub-sets $K_i$ constitute the primary representation of the set of initial data.

The problem of minimisation according to equations (10) and (12) under the constraints (13), in order to determine the coefficients $(a_1, \ldots, a_n, b)$ for each $K_i$: $i=1, \ldots m$, will be detailed below.

For each elementary sub-set, the objective function $\phi_{Ki}$: $R^{n+1} \rightarrow R$ defined as follows will be considered:

$$\phi_{K_i}(a_i, \ldots, a_n, b) = \sum_{(x,y) \in K_i} \left( f(x, y) - \left[ \sum_{j=1}^{n} a_j \cdot f \bigg|_{L_i} (x, y) + b \right] \right)^2. \quad (14)$$

The problem of minimisation under constraints therefore amounts to seeking the (n+1) values $(a_1^*, \ldots, a_n^*, b^*) \in C \subset R^n$ which satisfy:

$$\phi_{K_i}(a_1^*, \ldots, a_n^*, b^*) = \min\{\phi_{K_i}(a_1, \ldots, a_n, b) | (a_1, \ldots, a_n, b) \in C\}, \quad (15)$$

where $$C = \{(a_1, \ldots, a_n, b) | R^{n+1} | -\beta > a_i < \beta; i=1, \ldots, n\}.$$

Let it be stated first of all that the resolution of a problem of minimisation without constraints is well known to persons skilled in the art. It is a question in this case of minimising in general an objective function of the type:

$$\Psi(c_1, \ldots, c_m) = \sum_{(x,y) \in K} \left( F(x, y) - \left[ \sum_{j=1}^{m-1} c_j \cdot g_j(x, y) + c_m \right] \right)^2, \quad (16)$$

where m is the number of parameters of the objective function and when $(c_1, \ldots, c_m)$ covers the entire space $R^m$. The vector $(c_1^*, \ldots, c_m^*)$ sought satisfies:

$$\Psi(c_1^*, \ldots, c_m^*) = \min\{\Psi(c_1, \ldots, c_m) | (c_1, \ldots, c_m) \in R^m\}.$$

This vector $(c_1^*, \ldots, c_m^*)$ is characterised by the Euler equation:

$$\Psi'(c_1^*, \ldots, c_m^*) = 0, \quad (17)$$

where $\Psi'(c_1^*, \ldots, c_m^*)$ is the derivative of $\Psi$ (within the meaning of Frechet). It is a linear continuous mapping of $R^m$ to $R$.

The latter equation is here replaced by the partial derivatives of $\Psi$ at point $(c_1^*, \ldots, c_m^*)$, with respect to each variable. Therefore $(c_1^*, \ldots, c_m^*)$ is characterised by:

$$\begin{aligned} \partial_1 \Psi(c_1^*, \ldots, c_m^*) &= 0, \\ \partial_m \Psi(c_1^*, \ldots, c_m^*) &= 0. \end{aligned} \quad (18)$$

Taking account of the particular form of the functional (16), equations (18) are equivalent to:

$$\sum_{j=1}^{m} c_j^* \cdot G_{ji} = S_i; \ i = 1, \ldots, m, \quad (19)$$

where $G_{ji} = \sum_{(x,y) \in K} g_j(xy) \cdot g_i(xy), \begin{cases} j = 1, \ldots, m-1, \\ i = 1, \ldots m-1, \end{cases}$ $G_{mi} = G_{im} = \sum_{(x,y) \in K} g_i(xy), \ i = 1, \ldots, m-1$ $G_{mm}$ = number of points $(x, y)$ in $K_i$, $S_i = \sum_{(x,y) \in K} g_j(xy) \cdot F(xy), \ i = 1, \ldots, m-1,$ $S_m = \sum_{(x,y) \in K} F(xy).$ Equations (19) form a linear system of equations easy to solve by various methods well known in mathematics.

The solving of the problem of minimisation (15) of the functional (14) under the constraints (13) will comprise the following steps:

a) Solving of the problem of minimisation without constraints of the functional (14) on $R^{n+1}$ by the method described above by equations (16) to (19). The solution will be denoted $(\tilde{a}_1, \ldots, \tilde{a}_n, b) \in R^n$ b) If $(\tilde{a}_1, \ldots, \tilde{a}_n, b) \in C$, therefore if $-\beta < \tilde{a}_i < \beta$; $i=1, \ldots, n$ then the solution sought to the problem described by equations (15) and (16) is found and therefore $(a_1^*, \ldots, a_n^*, b) = (\tilde{a}_1, \ldots, \tilde{a}_n, b)$ c) If $(\tilde{a}_1, \ldots, \tilde{a}_n, b) \notin C$, certain constraints are violated. This will result in a disjoined partitioning of the set of indices $\{1, \ldots, n\} = NV \cup UV \cup LV$ where
NV is the set of indices $i \in \{1, \ldots, n\}$ for which $-\beta < \tilde{a}_i < \beta$
UV is the set of indices $j \in \{1, \ldots, n\}$ for which $\beta < \tilde{a}_j$
LV is the set of indices $k \in \{1, \ldots, n\}$ for which $\tilde{a}_k < -\beta$
Therefore expressed mathematically:

$$\{1, \ldots, n\} = NV \cup UV \cup LV \quad (20)$$

$$NV = \{i \in \{1, \ldots, n\} \mid -\beta < \tilde{a}_i < \beta\} \quad (21)$$

$$UV = \{j \in \{1, \ldots, n\} \mid \beta < \tilde{a}_j\} \quad (22)$$

$$LV = \{k \in \{1, \ldots, n\} \mid \tilde{a}_k < -\beta\} \quad (23)$$

In this case it is necessary to solve a problem of minimisation without constraints described by equations (16) to (19) where $$F(xy) = f(x, y) - \sum_{j \in UV} \beta \cdot g\bigg|_{L_j}(x, y) + \sum_{k \in LV} \beta \cdot g\bigg|_{L_k}(x, y), \quad (24)$$

-continued $$\Psi(c_1, \ldots, c_m) = \sum_{(x,y) \in K} \left( F(x, y) - \left[ \sum_{j=1}^{m-1} c_j \cdot g_j(x, y) + c_m \right] \right)^2, \quad (25)$$

where
m the number of indices in NV,
$g_j = g_{L_1}$ expresses the fact that the $j^{th}$ unviolated constant concerns the coefficient $a_i$.
The solution of the last problem (24) and (25) will be $(c_1^* \ldots c_m^*)$.
Finally the solution sought-for to the problem with constraints will be $$a_i^* = c_j^* : j = 1, \ldots, m-1 \text{ where } i \in NV, \quad (26)$$

$$a_k^* = \beta : k \in UV, \quad (27)$$

$$a_l^* = -\beta : l \in LV, \quad (28)$$

$$b^* = c_m. \quad (29)$$

if however (26) meets the constraints. Otherwise it will be necessary to reiterate the process.

A flow diagram for the partitioning of the image of 512×512 pixels, its division and the calculation, for each of the elementary sub-spaces $K_i$ of coefficients $a_j$ and b is described below, in relation to FIGS. 10 to 15.

It will be observed here that, when all the elementary sub-sets have the same dimensions, a compromise must be made. This is because, when these dimensions are too small, the compression ratio is limited since this is directly a function of the number of pixels which are represented by the five parameters associated with each elementary sub-set. On the other hand, when the dimensions of the elementary sub-sets are large, the quality of the image reconstructed after a secondary processing of these parameters may be too limited for a convenient use of the reconstructed image, since the smallest details may have been badly processed during the primary processing.

In an image, it is usual for some areas to have very little detail and to be practically uniform and for other areas of the image to have great complexity (a complexity which can be represented by the variance of the values of each component of the pixels of the area under consideration).

The invention proposes, as a complement to the implementation of the theory disclosed above, a method for using large elementary sub-sets in the most uniform areas of the image and smaller elementary sub-sets in the less uniform areas of the image. For this purpose, for each elementary sub-set in the course of processing, a complexity criterion, referred to as a "quality" criterion, is determined and a partitioning suitability estimation is effected. When this estimation does not meet the quality criterion, that is to say when the elementary sub-set under consideration is supposed to exhibit a certain degree of complexity, it is partitioned into smaller elementary sub-sets which are processed in their turn, until a minimum size has been reached. In the embodiments described and depicted, this partitioning consists in dividing the elementary sub-set into four equal elementary sub-sets, of a form which is homothetic to that of the initial elementary sub-set and offset with respect to each other in each direction.

First Mode of Secondary Processing of Compressed Data

A description will now be given of a first embodiment of the method of secondary representation of a set of data consisting of parameters resulting from a primary processing of data, in accordance with the first embodiment of the primary processing method described above.

In this first embodiment, the parameters resulting from the primary processing are the subject of the secondary processing, with a view to restoring the initial data with the error rate mentioned above.

In other embodiments, one of which is described below, the object of the secondary processing is to deliver data of a type other than that of the initial data.

In general terms, in the case of a restitution of the initial data, an "iterative calculation" step is carried out during which, using the said parameters ($a_1, \ldots, a_n, b$), a method of successive approximations converging towards the fixed point of the global contractive mapping (T) is implemented, this fixed point constituting a representation of the said set of initial data (f∈E).

In order to implement the method of successive approximations in the context of a restitution, the global contractive mapping (T*) as defined above (equations (8) and (10)) is applied in accordance with the first embodiment of the invention, to an arbitrarily chosen set of data ($x_0 \in E$). The same contraction (T*) is then applied to the transform thus obtained and this process is reiterated until the distance between two consecutive transforms is less than a given threshold. This is expressed by the following equation:

$$T^*(\ldots T^*(T^*(x_0))\ldots)=(T^*)^n(x_0) \quad (30)$$

By applying the global contractive mapping q times to the result of the previous transform, a good approximation of f is obtained, which is expressed by:

$$(T^*)^q(x_0) \approx f \quad (31)$$

the criterion for stopping the iterations being expressed as follows:

$$d((T^*)^l(x_0),(T^*)^{l+1}(x_0))<\epsilon \quad (32)$$

where $\epsilon$ is the tolerated difference for a pixel multiplied by the number of pixels in the image.

It will be noted that implementing the global contractive mapping (T) amounts to effecting the various partitionings and divisions of the arbitrary image and of the successive transforms thereof, so as to be able to use equation (10) for each of the elementary sub-sets of the partitionings under consideration.

Below, notably in connection with FIGS. 16 and 17, a description is given of a flow diagram for the restitution of an image represented in accordance with the first embodiment of the secondary processing method of the invention.

In the following description, the global contractive mapping defined in equations (8) and (10) is used in the data restitution process. This is because, as the purpose of the secondary processing described above is, in this embodiment, to obtain as faithful a restitution of the initial data as possible, it is the same global contractive mapping which is used during the restitution step.

On the other hand, in the fourth variant described below, with regard to FIGS. 9, 9A, 18 and 19, where it is wished to obtain, at the end of the secondary processing, data of a type different from that of the initial data, another global contractive mapping, and/or another definition set will be used.

In general terms, the global contractive mapping used during the primary processing is of the first type; the one used during the secondary processing is of the second type. In the case of restitution of the initial data, the global contractive mapping of the second type is identical to that of the first type. Where, during the secondary processing, the data of a type different from that of the initial data are obtained, the global contractive mapping of the second type will be different from that of the first type.

2. Description of a First Embodiment of a Processing Device

Device for the Primary Processing of a Set of Data

A description will now be given, with the help of FIG. 4, of a first embodiment of a device for processing a set of data representing physical quantities, and designed to afford a primary representation of the said set by implementing the method described above.

In this embodiment, which concerns a device for processing colour images, the data of the image in 512×512 pixels are admitted at the input, whilst at the output the device delivers the parameters $a_i$, i=1, . . . , 4 and b and partitioning information, relating to each of the sub-sets constituting a partitioning of the image.

It will be noted here that the present invention is certainly not limited to a particular image format but that it allows the processing of images of all sizes. However, in an embodiment described and depicted, the image which is processed and restored is an image of 512×512 pixels with 256 levels on each of the three components Y, luminance, Cr, red chrominance, and Cb, blue chrominance.

In the block diagram in FIG. 4, the coding device bears the general reference 500.

It has, connected to a data and address bus, designated under the reference 501:

a controller (ALU+CTR) 550 incorporating an arithmetic logic unit. This controller consists, in this embodiment, of a microprocessor of the type sold by INTEL under the reference i486, a random access memory RAM, bearing the reference 510. This memory includes a certain number of registers which will be described below and a rapidly addressable part (cache) 514, a program memory 530, of the ROM type, a first register 560 of a direct-access random access memory (REG 1), a second register 570 of a direct-access random access memory (REG 2), an input buffer (IBFR) 590, connected to an input connector 591 and an output buffer (OBFR) 580, connected to an output connector 581.

In the ROM 530 there is recorded a program for processing input data 591, with compression thereof in accordance with the method described above. The compression program, which, in FIG. 4, bears the reference 531, is described below in relation to FIGS. 10 to 15, 19, 20, 21A, 21B, 21C, 21D and 22.

The set of means 510, 530, 531, 550, 560 and 570 constitutes here an embodiment of "first logic transformation means" within the meaning of the invention.

In this embodiment, the random access memory RAM 510 contains, amongst other things, the following registers designed to implement the program 531:

a register 511 (IM), designed to store the image data, a counter 513 (CNT) used as explained below (FIG. 10), the part 514 (CACHE) of the random access memory. This part is a memory part which can be addressed very rapidly, in which there are stored, as is known, the data which are the most used at a given moment.

The part (CACHE) 514 of the memory 510 contains the following registers:

a register 515 CSI designed to store, at a given moment, the coordinates of the elementary sub-set $K_i$ in the course of processing, registers $f(L_1)$–$f(L_4)$ designated by reference numbers 516 to 519, in which there are stored the values $[f(L_i)](x,y)$ corresponding to each point (x,y) (level amongst 256 of the component in the course of processing) of the working sub-sets $L_1$–$L_4$ associated with the elementary sub-set $K_i$ under consideration, a register 520 designed to store the coefficients $a_1$, $a_2$, $a_3$, $a_4$ and b, relating to an elementary sub-set under consideration $K_i$, and a register 522 designed to store division factors A corresponding to the number of additional partitionings effected in order to obtain the elementary sub-set under consideration $K_i$, the registers 521 and 523 to 526, designed to store intermediate variables of a processing generating the references of elementary sub-sets forming an initial partitioning of an image to be compressed, registers 540 to 543 containing respectively variables "band_height", "ideal_height", "total_height" and "Nb_lines_read" used as described below, the register 560 (REG 1), designed to accumulate, for each elementary sub-set, the coefficients $a_1$, $a_2$, $a_3$, $a_4$ and b, as well as any partitioning information, relating to each working sub-set, the register 570 (REG 2), designed to store the list of addresses (list_sub_images) of all the elementary sub-sets $K_i$.

FIG. 5 depicts, connected respectively to the input and output means:

a source 592 of uncompressed data, and means 582 using compressed data.

The source 592 can include many means within the capability of persons skilled in the art. For example, it can consist in a reader for a hard disk or a diskette or compact disks (known by the initials CD-ROM). The data of the image to be compressed can therefore advantageously be recorded on corresponding media: hard disk, diskette or CD-ROM (compact disk). This recording can be made in any manner known to persons skilled in the art.

The source 592 can also consist in a video interface, able to deliver the data of the image to be compressed at the input 591.

The source 592 can also consist in data reception means connected to a transmission network, the source 592 being able to transform the data received into a suitable format so that they can be presented at the input of the primary processing device.

Likewise, the user means 582 can consist in means of storing the compressed image (hard disk, diskette, CD-ROM etc) or a simple interface intended to deliver the video signal in a known format to other user means, such as means intended for example to transmit this compressed image at a distance or to store it. These means 582 can also consist in a data transmission device connected to a telecommunication network.

Device for the Secondary Processing of a Set of Parameters Resulting from the Primary Processing of Initial Data In this embodiment, which concerns the processing of images, the secondary processing device is able, using the coefficients $a_1$, $a_2$, $a_3$, $a_4$ and b and partitioning information, relating to each of the elementary sub-sets, to restore the initial image, in colour.

It is also able to deliver the data relating to a grey-level image corresponding to an original colour image. It is also adapted to supply an image having a number of elementary points different from the number of elementary points of the image processed by the primary processing device, these images being said to have different definitions or resolutions. These data output from the secondary processing device are of a type other than the type of the data of the initial image which was the subject of the primary processing.

On the block diagram in FIG. 6, the restitution or iterative calculation device bears the general reference 600.

It includes, connected to a data and address bus, designated under the reference 601:

a controller (ALU+CTR) 650 incorporating an arithmetic logic unit. This controller consists, in this embodiment, of a microprocessor of the type sold by INTEL under the reference i486.

a random access memory RAM, bearing the reference 610, which contains a certain number of registers which will be described below and a rapidly addressable part (referred to as a "cache memory") 614, a program memory 630, of the ROM type. In this memory, there are notably recorded:

a program 631 for decompressing the data of the image presented at the input 681 with a view to the reconstruction of an approximation of the initial image of identical or different resolution, and a program 632 for decompressing the image data with a view to the reconstruction of a grey-level image instead of a colour image.

The programs 631 and 632 implement the method described above and their flow diagrams are detailed below with the help of FIGS. 16 to 17.

a first direct-access register 560 (REG 1), and a second direct-access register 570 (REG 2), both identical to those described in relation to FIG. 4, an output buffer (OBFR) 690, connected to an output connector 691 and an input buffer (IBFR) 680, connected to an input connector 681.

The set of means 610, 630, 631, 650, 560 and 570 here constitutes an embodiment of "second logic means" within the meaning of the invention. The set of means 610, 630, 632, 650, 560 and 570 here constitutes another embodiment of "second logic means" within the meaning of the invention.

In this embodiment, the random access memory RAM 610 contains, amongst other things, the following registers intended to implement the programs 631 and 632:

a register 511 (IM), described in relation to FIG. 4, a scale factor z in a register "z" 628.

a register 621 (RE), designed to store the data of an image, a register (CHTY) 622, designed to differentiate the general secondary processing of a restitution, a register (IT) 612 designed to store the current value of the number of iterations performed in order to effect the secondary representation, a register (p) 623 designed to store the number of iterations in order to implement the method of successive approximations so as to effect the secondary processing of the image, a counter 513 (CNT) described in relation to FIG. 4. This counter is here used as explained below (FIG. 16), the part 614 (CACHE) of the random access memory 610. This part is a very rapidly addressable memory part, in which, as is known, there are stored the data most used at a given moment, the part (CACHE) 614 of the memory 610 contains registers 515 to 520, 540 to 543 and 625 to 627, respectively identical to the registers 515 to 520, 540 to 543, 525, 526 and 522 described in relation to FIG. 4, the register 560 (REG 1), designed to store, for each elementary sub-set, the coefficients $a_1$, $a_2$, $a_3$, $a_4$ and b and any partitioning information, all associated with the sub-set, and the register 570 (REG 2), designed to store the list of addresses of all the elementary sub-sets $K_i$.

FIG. 7 depicts, connected respectively to the input and output means:

a source 682 of compressed data, and means 692 using decompressed data.

The source 682 can consist in means of storing the compressed image (hard disk, diskette, CD-ROM etc) or a simple interface designed to deliver them. The means 682 can also consist in a data reception system connected to a telecommunication network.

The means 692 can consist for example in means of storing decompressed data or a simple interface delivering decompressed data at its output. It can also consist in a device for transmitting decompressed data over a telecommunication network.

Description of a Device Incorporating a Primary Processing Device and a Secondary Processing Device In the block diagram in FIG. 8, a device incorporating a primary processing device 500 and a secondary processing device 600 is depicted and bears the general reference 700.

This device is capable of processing image compressions and decompressions in parallel. It is consequently composed of devices described in relation to FIGS. 4 and 6. It is a question in this case of the primary processing device 500 and the secondary processing device 600. This type of equipment is referred to as "full-duplex".

In another embodiment (half-duplex), the device can execute only a primary processing or a secondary processing but never at the same time. It can also perform a "complex" processing including a primary processing and a secondary processing carried out one after the other. The block diagram of such a device is depicted in FIGS. 9 and 9A.

This device, which bears the reference 800, includes conjointly the resources of the devices 500 and 600 described above, avoiding duplication.

Thus:

the registers of the random access memories 510 and 610 described above are incorporated in one and the same random access memory unit 810, one and the same read-only memory unit 830 incorporates the programs 531, 631 and 632 mentioned above and a configuration program 831, one and the same microprocessor 850 incorporates the means 550 and 650.

The configuration program 831, which will be described below in relation to FIG. 18, enables the device 800 to perform:

a compression of the data of a colour image, a decompression of the data either with a view to restoring the initial colour image or with a view to restoring it with a different resolution, or with a view to delivering an image with corresponding grey levels, and a complex processing enabling a colour image to be transformed into a grey-level image.

Description of a Special Flow Diagram for Compressing a 512×512 Pixel Colour Image This flow diagram is illustrated in FIG. 10. FIGS. 11 to 15 are flow diagrams explaining certain operations of the compression flow diagram of FIG. 10.

Moreover, the flow diagrams of FIGS. 11 and 12 also detail operations in the decompression flow diagram of FIGS. 16 and 17 which will be described below. The references between parentheses refer back to the steps in FIG. 16.

It should be stated first of all that the data relating to the image represent a mapping as defined in equation (9) disclosed above.

In this case, to each pair of values (x,y) (column and row coordinates) taken from the field of definition (in this case to the 512×512 pixel plane image) there corresponds a value $f(x,y)$ in the mapping field $R^3$, that is to say a value from amongst 256 levels relating to each of the three components Y, Cr et Cb.

Three series of numbers each corresponding to the level of a component (that is to say 512×512=262,144 f(x,y) values per component) are organised, scanning the data of the image as follows:

the lines are scanned from left to right;

the lines are incremented from bottom to top.

These three series are here recorded in the source of uncompressed data 592. They can be read at the input port 591 under the control of the microprocessor 550.

At 200A, an initialisation of the registers (IM) 511, Nb__lines__read and the two registers (REG 1) 560 and (REG 2) 570 are initialised to the nil uniform value. During operation 200A, the "ideal" height of the independent bands is also determined, this height corresponding, for example, to a dimension:

smaller than the dimension of the available part of the cache memory and corresponding to a multiple of 32 lines of the image, with a minimum of 64 lines.

It will be observed, in particular, that the ideal height can thus be equal to the height of the image (that is to say here 512 lines).

The files relating to the components Y, Cr and Cb are accessible separately and are supplied in a predetermined order, namely:

first of all the data of the image under consideration and which relate to the luminance component (Y), then the data of the image which relate to the red chrominance component (CR) and finally the data of the image which relate to the blue chrominance component (Cb).

Test 200B consists in determining whether or not the variable Nb__lines__read is equal to the total height of the image. When the result of test 200B is negative, operation 200C is performed and consists in initialising to zero the value of the counter (CNT) 513, which serves to indicate a colour component of the image. Next, operation 200D determines the height band__height of the next band constituting a sub-set of the image to be processed. During this operation, the height of the part of the image remaining to be processed is compared with twice the ideal height. When the height of the part of the image remaining to be processed is greater than twice the ideal height, the height of the next band of the image is equal to the ideal height. When this is not the case, the height of the next band is equal to the height of the part of the image remaining to be processed. The value of the height of the next band to be processed thus determined is loaded into the register band height and Nb_lines_read and is incremented by the value band_height.

Operation 200E consists in incrementing the counter (CNT) 513. Next, during test 201, it is determined whether or not the counter (CNT) 513 is strictly greater than 3.

When the result of test 201 is negative, the program switches to step 202, during which:

microprocessor 550 reads, at the input port 591, the following component of the image band to be processed.

It will be recalled that each component, Y, Cr or Cb, is presented as a series of 262,144 f(x,y) values corresponding to the level of the component under consideration for each of the pixels of the image. Part of this series is therefore loaded into the register (IM) 511 during step 202.

It should be stated that, in this particular embodiment, each working sub-set has as many data items as the element sub-sets.

The program next switches to step 204 (explained in FIG. 11), during which the initial partitioning of the 512×512 pixel image into 256 elementary sub-sets $K_i$, i=(1, ..., 256) of 32×32 pixels will be carried out. This partitioning is carried out by determining the coordinates (x,y) of the bottom left-hand corners of each of the m sub-sets $K_i$ under consideration. Thus the sub-set $K_i$ illustrated in FIG. 3 has the coordinates $(x_i,y_i)$, which correspond to those of its bottom left-hand corner. Each of the addresses of the bottom left-hand corners of the blocks of 32×32 pixels corresponds to a particular address in the list recorded in the register (IM) 511 of the random access memory 510.

The list of these addresses is loaded into the register (REG 2).

Figure 11:
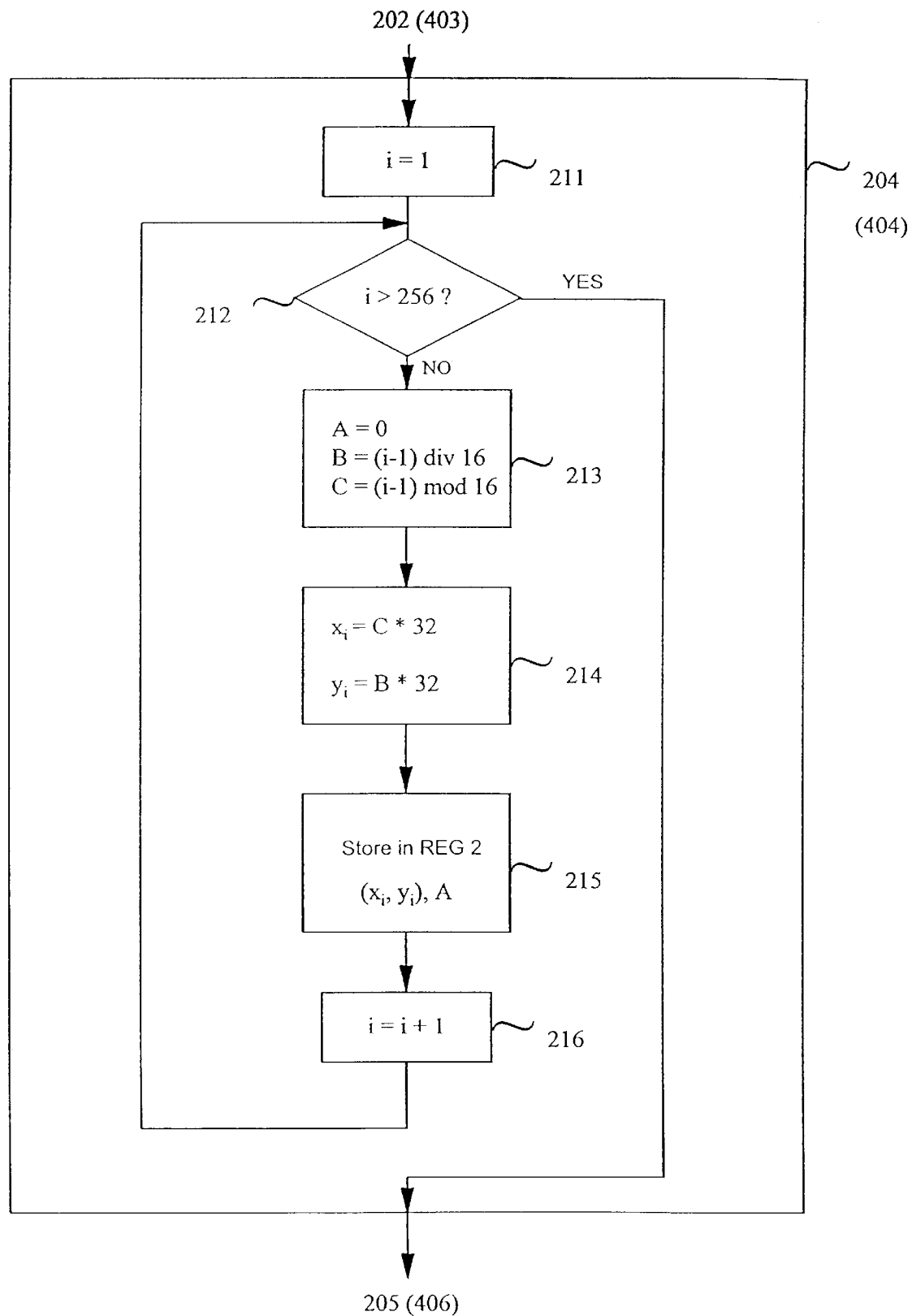

With reference to FIG. 11, after an initialisation of a counter consisting of the register i521 relating to the index of the sub-sets $K_i$ at step 211, the program switches to test 212, during which it is verified whether or not the list is complete. If not, the program switches to step 213, during which the division factor A, which counts down each post-partitioning which is performed on an elementary sub-set, is initialised to the value zero, and where a variable B is determined as the quotient of an integer division of (i−1) by 16. The remainder of the division (variable C) is stored in the register 524. The values $x_i=C*32$ and $y_i=B*32$ are calculated during the operation 214 and temporarily stored in the registers 525 and 526.

These coordinates, which are those of the bottom left-hand corner of the elementary sub-set $K_i$ under consideration, and the associated division factor A, are stored in the variables $(x_i, y_i)$ in register 570 (REG 2) during step 215. During step 216 the counter i is incremented and the program next executes test 212 once again.

When test 212 is positive, the program carries out test 205 (FIG. 10), during which it is verified whether or not the list recorded in register (REG 2) is empty. If not, this means that there are still elementary sub-sets $K_i$ to be processed, and the program switches to step 205.

During test 205, it is verified whether or not the list recorded in register (REG 2) is empty. When the result of test 205 is negative, this means that there are still elementary sub-sets $K_i$ to be processed, and the program switches to step 206.

At step 206, the first elementary sub-set is eliminated from the list recorded in register (REG 2). This sub-set is recorded in a register CSI 515 of the cache memory of the RAM 510.

The program then switches to step 207 detailed in FIG. 19 or, according to the first variant, in FIG. 20. During this step, a test 255 determines whether or not the elementary sub-set under consideration has the minimum dimensions, that is to say, in the embodiment described and depicted, 2 times 2 pixels.

When the result of test 255 is positive, operation 250 consists in determining the four working sub-sets $L_i$ associated with the working sub-set under consideration. This operation 250 is detailed in FIG. 12. During operation 250, from the address recorded in the register CSI and from the division factor A, the four adjacent working sub-sets $L_1, L_2, L_3, L_4$ are sought (see FIG. 3 for the working sub-sets associated with the initial partitioning). To this end, the rule stated above is applied:

each working sub-set has the same dimensions as the elementary sub-set with which it is connected, that is to say in each direction: 32 divided by 2 raised to the power A; and each working sub-set is shifted by a half dimension in each direction, with respect to the associated elementary sub-set.

The purpose of operation 250 is therefore to determine the values f(x,y) of the component under consideration associated with each of the pixels of the working sub-sets $L_1, L_2, L_3$ and $L_4$ related geometrically and in a predetermined fashion to the elementary sub-set under consideration $K_i$. The set of values f(x,y) related to the pixels of the sub-set $L_1$ (respectively $L_2, L_3$ and $L_4$) will hereinafter be denoted $f(L_1)$ (respectively $f(L_2) f(L_3)$ and $f(L_4)$).

Figure 12:
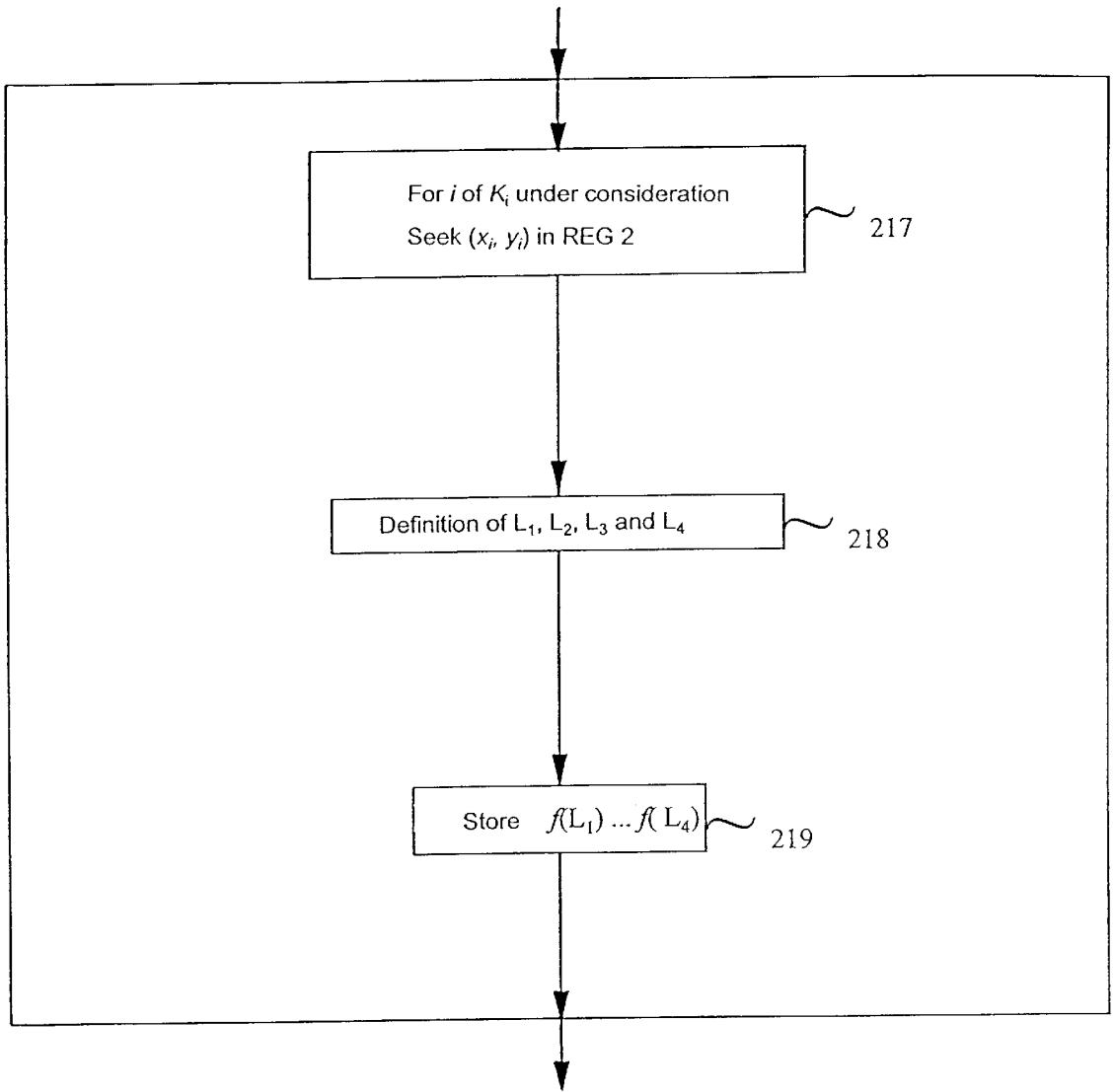

With reference to FIG. 12, for each elementary sub-set $K_i$ under consideration, controller 550 reads, in register 570 (REG 2), the coordinates $(x_i, y_1)$ of the bottom left-hand pixel of $K_i$, at step 217. Next, at step 218 arithmetic unit 550 reads the values of the component under consideration for each pixel of the four working sub-sets $L_1$ to $L_4$, defined according to the following table:

$L_1[x_i-16/2^A, x_i-1+16/2_A)]\times[y_i+16/2_A, y_i-1+(3\times16)/2^A]$ $L_2: [x_i+16/2^A, x_i-1+(3\times16)/2^A]\times[y_i+16/2^A, y_i-1+(3\times16)/2^A]$ $L_3: [x_i-16/2^A, x_i-1+16/2^A]\times[y_i-16/2^A, y_i-1+16/2^A]$ $L_4: [x_i+16/2^A, x_i-1+(3\times16)/2^A]\times[y_i-16/2^A, y_i-1+16/2^A]$ It is to be observed here that each of the working sub-sets here has the same number of pixels as the elementary sub-set under consideration, that is to say $(32/2^A)^2$.

Next, at step 219, arithmetic unit 550 will seek, for the component, Y, Cr or Cb, currently being processed, the value corresponding to each of the $(32/2^A)^2$ pixels of $L_1$ (respectively $L_2, L_3$ and $L_4$) and stores all the $(32/2^A)^2$ values in the register $f(L_1)$ 516 (respectively $f(L_2)$ 517, $f(L_3)$ 518 and $f(L_4)$ 519) of the cache 514).

Following operation 250 (FIG. 19), the program performs operation 251, during which, in general terms, the parameters $a_i$ (in this case $a_1, a_2, a_3, a_4$) and b are calculated by implementing the method of least squares with the constraints described above (see equations 12 and 13).

Figure 13:
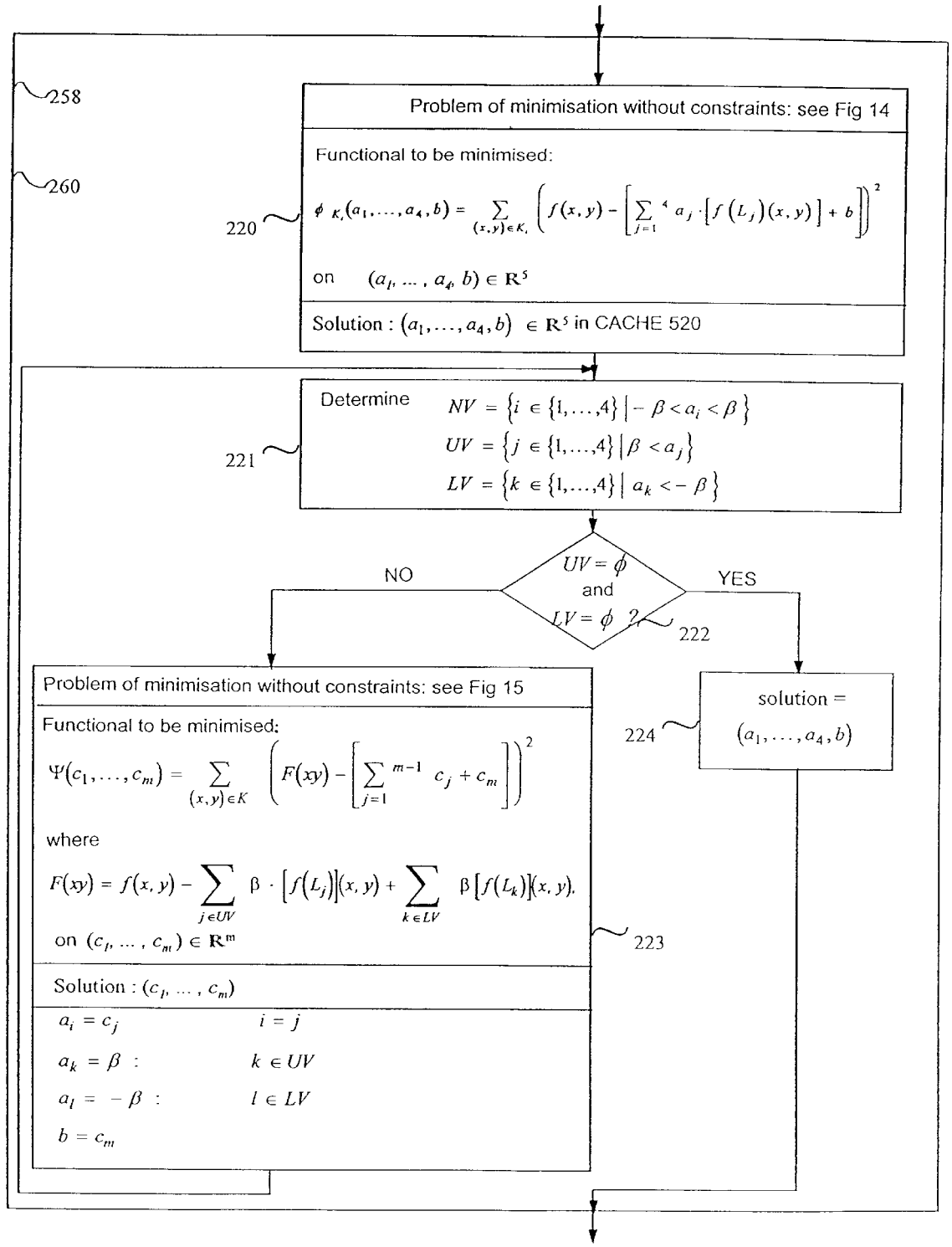

A simplified description of step 251 is given in the flow diagram depicted in FIG. 13. It should be stated that, in order to determine the coefficients $a_1, a_2, a_3, a_4$ and b it is necessary to resolve a problem of minimisation of a functional under constraints. It was seen above, in relation to equations 14 to 29, that this amounts to iteratively resolving two types of problems of minimisation without constraints. The explanations given above for a general case are put into practice for determining the four parameters $a_1$, $a_2$, $a_3$, $a_4$ and the parameter b.

At step 220, the first problem of minimisation without constraints is resolved. The functional:

$$\phi_{K_i}(a_1, \ldots, a_4, b) = \sum_{(x,y) \in K_i} \left( f(x, y) - \left[ \sum_{j=1}^{n=4} a_j \cdot [f(L_j)](x, y) + b \right] \right)^2$$

is minimised for values $(a_1, \ldots, a_4, b)$ running through the entire $R^5$. To do this, the method of least squares described is implemented by means of equations (16) to (19). The unique solution to this problem $(a_1, \ldots, a_4, b)$ in $R^5$ is the solution of the linear system (19).

As illustrated in FIG. 14, step 220 is sub-divided into four steps 230–233.

During step 230, coefficients $G_{ij}$ $i=1, \ldots, 5$, $j=1, \ldots, 5$ are calculated, using the following formulae:

$$G_{ji} = \sum_{(x,y) \in K} [f(L_j)](x, y) \cdot [f(L_i)](x, y) \quad i, j = 1, \ldots, 4$$

$$G_{5i} = G_{i5} = \sum_{(x,y) \in K} [f(L_i)](x, y) \quad i = 1, \ldots, 4$$

$$G_{55} = 32^2$$

The coefficients $[G_{ij}]$ constitute the matrix to be inverted in order to resolve the linear system of equations (19).

The above formulae for determining the coefficients $G_{ij}$, are, as can be seen, simple additions and multiplications using pixel values corresponding to the levels of the component under consideration, for each of the pixels of the elementary sub-set under consideration.

Likewise at step 231 the coefficients $S_1, \ldots, S_5$ constituting the second member of the linear system are calculated. The formulae used are:

$$S_i = \sum_{(x,y) \in K} [f(L_j)](x, y) \cdot f(x, y) \quad i = 1, \ldots, 4$$

$$S_5 = \sum_{(x,y) \in K} f(x, y)$$

Step 232 has recourse to a conventional routine of inverting a system of linear equations, in this case with five unknowns. The linear system to be inverted is as follows:

$$\begin{bmatrix} G_{11} & G_{21} & G_{31} & G_{41} & G_{51} \\ G_{12} & G_{22} & G_{32} & G_{42} & G_{52} \\ G_{13} & G_{23} & G_{33} & G_{43} & G_{53} \\ G_{14} & G_{24} & G_{34} & G_{44} & G_{54} \\ G_{15} & G_{25} & G_{35} & G_{45} & G_{55} \end{bmatrix} \begin{bmatrix} a_1 \\ a_2 \\ a_3 \\ a_4 \\ b \end{bmatrix} = \begin{bmatrix} S_1 \\ S_2 \\ S_3 \\ S_4 \\ S_5 \end{bmatrix}$$

The solution $a_1, \ldots, a_4$, b will be stored at step 233 in the register 520 of the part 514 (CACHE) of the random access memory 510.

The program next passes to step 221 (FIG. 13) where, in accordance with equations (20) to (23), a separate partitioning is determined of all the integers $\{1,2,3,4\}$ in NV, UV and LV defined as $$NV = \{i \in \{1, \ldots, 4\} | -\beta < a_i < \beta\},$$

$$UV = \{j \in \{1, \ldots, 4\} | \beta \leq a_j\},$$

$$LV = \{k \in \{1, \ldots, 4\} | a_k \leq -\beta\}.$$

The program next switches to test 222, during which it is verified whether the sets UV and LV are empty. If this test is positive the values currently present in the register 520 constitute (step 224) the solution of the problem with constraints.

In the negative, certain constraints are active for the solution of the problem with constraints. In this case (step 223; see FIG. 15), it is necessary to resolve a restricted problem.

It is a question in this case of minimising under constraints the modified functional:

$$\psi(c_1, \ldots, c_m) = \sum_{(x,y) \in K} \left( F(xy) - \left[ \sum_{j=1}^{m-1} c_j \cdot [f(L_j)](x, y) + c_m \right] \right)^2,$$

where $$F(x, y) = f(x, y) - \sum_{j \in UV} \beta \cdot [f(L_j)](x, y) + \sum_{k \in LV} \beta \cdot [f(L_k)](x, y),$$

and m<4 since fewer constraints are active.

The solution to this problem is $(c_1, \ldots, C_m)$ and is obtained by considering equations (16) to (18) and by solving the linear system (19).

The solution of the initial problem with constraints is:

$$a_i = c_j : j = 1, \ldots, m-1 \text{ or } 1 \in NV,$$

$$a_k = \beta : k \in UV,$$

$$a_l = -\beta : l \in LV,$$

$$b = c_m.$$

Step 223 will be described in relation to the flow diagram of FIG. 15, assuming m=3. It is necessary to consider the problem of minimisation without constraints, described in step 223 which is subdivided into four steps 240 to 243. During step 240, coefficients $H_{ij}$ $i=1, \ldots, 4$, $j=1, \ldots, 4$ are calculated using the following formulae:

$$H_{ji} = \sum_{(x,y) \in K} [f(L_j)](x, y) \cdot [f(L_i)](x, y) \quad i, j = 1, \ldots, 3$$

$$H_{4i} = H_{i4} = \sum_{(x,y) \in K} [f(L_i)](x, y) \quad i = 1, \ldots, 3$$

$$H_{44} = 32^2$$

The coefficients $[H_{ij}]$, constitute the matrix to be inverted in order to solve the linear system of equations (19).

The above formulae for determining the coefficients $H_{ij}$, are, as can be seen, simple additions and multiplications using pixel values corresponding to the levels of the component under consideration, and this for each of the pixels of the elementary sub-set under consideration.

Likewise, at step 241 the coefficients $T_1, \ldots T_4$ constituting the second member of the linear system are calculated. The formulae used are:

$$T_i = \sum_{(x,y) \in K} [f(L_j)](x, y) \cdot F(x, y) \quad i = 1, \ldots, 3$$

$$T_4 = \sum_{(x,y) \in K} F(x, y)$$

Step 242 has recourse to a conventional routine of inverting a system of linear equations, in this case with 4 unknowns. The linear system to be inverted is as follows:

$$\begin{bmatrix} H_{11} & H_{21} & H_{31} & H_{41} \\ H_{12} & H_{22} & H_{32} & H_{42} \\ H_{13} & H_{23} & H_{33} & H_{43} \\ H_{14} & H_{24} & H_{34} & H_{44} \end{bmatrix} \begin{bmatrix} c_1 \\ c_2 \\ c_3 \\ b \end{bmatrix} = \begin{bmatrix} T_1 \\ T_2 \\ T_3 \\ T_4 \end{bmatrix}$$

At the end of step 223, it is necessary to review whether the solution thus obtained still satisfies the constraints. To do this, step 221 and test 222 are executed once again. This process is reiterated until test 222 is positive.

During operation 251, the coefficients $a_1$, $a_2$, $a_3$, $a_4$, b are recorded in the register 560 (REG 1). Then test 205 is reiterated. It is to be observed here that, in so far as the elementary sub-set has minimum dimensions, no partitioning information is necessary, since no post-partitioning can be carried out.

When the result of test 255 is negative, operation 252 consists in measuring the variance of the levels of the component under consideration, in the elementary sub-set under consideration. Next, operation 253 consists in determining a quality criterion applicable to the elementary sub-set under consideration. Preferentially, the definition of the quality criterion consists in the definition of a threshold beyond which the quality criterion is considered to be complied with. Preferentially also, the value of the threshold takes into account the dimensions of the elementary sub-set under consideration. In the embodiment described and depicted, this threshold is the function corresponding to the following table:

| dimensions of the sub-set in pixels | threshold |
|---|---|
| 2 × 2 | 200 |
| 4 × 4 | 160 |
| 8 × 8 | 100 |
| 16 × 16 | 60 |
| 32 × 32 | 20 |

It is to be observed here that it is preferable to use a table corresponding to a decreasing function of the dimensions of the elementary sub-set.

According to fifth and sixth variants, not shown:
the value of the threshold is constant whatever the dimensions of the elementary sub-sets, or
the value of the threshold is an inverse function of a dimension of the elementary sub-set under consideration.

Test 254 determines whether or not the quality criterion is complied with. In the embodiment described and depicted, it is complied with when the measurement of the variance of the levels of the component under consideration is less than the value of the threshold which corresponds, in the above table, to the dimensions of the elementary sub-set under consideration.

When the result of one of the tests 254 or 255 is positive, operation 250 consists in determining the four working sub-images as disclosed above. Next, operation 258 is identical to operation 251, except that there are stored, in register 560 (REG 1), successively the item of partitioning information equal to "0" since no post-partitioning has been carried out and the coefficients $a_1$, $a_2$, $a_3$, $a_4$, b. Next, test 205 is reiterated.

When the result of test 254 is negative, operation 256 consists in effecting a post-partitioning of the elementary sub-set under consideration. In the embodiment described and depicted, this post-partitioning consists in dividing each elementary sub-set into four equal square elementary sub-sets. To this end, during operation 256, there are added into the list list_sub_image, in register (REG 2) 570, the coordinates of the four points which define the bottom left-hand corners of the four elementary sub-sets resulting from the post-partitioning. With these coordinates there is associated a division factor A which is equal to the division factor of the elementary sub-set which is partitioned, incremented by the value 1. In addition an item of partitioning information equal to "1", since a post-partitioning has been effected, is stored in register 560 (REG 1).

Following operation 256, test 205 is reiterated.

FIGS. 21A, 21B and 21C illustrate the effect of the post-partitionings which are performed on the elementary sub-sets resulting from the initial partitioning or previous post-partitionings.

For the purpose of explanation, and by exception to the general rules of the description, it is assumed that, in the embodiment disclosed in FIGS. 21A to 21C, the minimum dimensions of the elementary sub-sets are four times smaller than their maximum dimensions.

FIG. 21A depicts part of an image, corresponding to twelve elementary sub-sets referenced $B_0$ to $B_{11}$ resulting from the initial partitioning (operation 204, FIG. 11), in which:

the elementary sub-set $B_1$ has undergone a post-partitioning into four elementary sub-sets $B_{1,0}$ to $B_{1,3}$, the elementary sub-set $B_{1,3}$ has undergone a post-partitioning into four elementary sub-sets $B_{1,3,0}$ to $B_{1,3,3}$, the elementary sub-set $B_6$ has undergone a post-partitioning into four elementary sub-sets $B_{6,0}$ to $B_{6,3}$, the elementary sub-set $B_{6,1}$ has undergone a post-partitioning into four elementary sub-sets $B_{6,1,0}$ to $B_{6,1,3}$, and the elementary sub-set $B_{11}$ has undergone a post-partitioning into four elementary sub-sets $B_{11,0}$ to $B_{11,3}$.

FIG. 21B illustrates, for the elementary sub-sets thus partitioned, the partitioning information items which are associated with the elementary sub-sets resulting from the initial partitioning (sub-sets for which the value of the division factor A is nil) or with the elementary sub-sets resulting from post-partitionings.

Thus the elementary sub-sets $B_0$, $B_2$, $B_3$, $B_4$, $B_5$, $B_7$, $B_8$, $B_9$ and $B_{10}$ are associated with a zero partitioning information item, the elementary sub-sets $B_1$, $B_6$ and $B_{11}$ are associated with an item of partitioning information equal to 1, their elementary sub-sets $B_{1,0}$, $B_{1,1}$, $B_{1,2}$, $B_{6,0}$, $B_{6,2}$, $B_{6,3}$, $B_{11,0}$, $B_{11,1}$, $B_{11,2}$ and $B_{11,3}$ are associated with a zero partitioning information item, the elementary sub-sets $B_{1,3}$ and $B_{6,1}$, are associated with an item of partitioning information equal to "1" and the elementary sub-sets resulting from their post-partitioning are not associated with any partitioning information since the dimensions of these elementary sub-sets are the minimum dimensions.

The dimensions of all these elementary sub-sets can thus be defined without ambiguity by the series of partitioning information items:

0100010000101000000010000

FIG. 21C offers a representation of the parameters $a_1$, $a_2$, $a_3$, $a_4$ and b, relating to a single image and which, conjointly, are here designated by reference D, and partitioning information associated with them, using the series disclosed above.

It can be seen there that the sequence of the compressed data corresponding to the image part depicted in FIG. 21A includes:
- a header, representing in particular the dimensions of the image (here equal to 512×512 pixels), the initial dimensions of the elementary sub-sets (here corresponding to 32×32 pixels), the ideal height and the definition of the minimum dimensions of the elementary sub-sets (here corresponding to 2×2 pixels) and a post-processing information item and if applicable the ratio of dimensions between the resolution of the luminance component and that of the chrominance components;
- the series of partitioning information presented above:

0100010000101000000010000 associated with any data which correspond to them, during the storage to memory effected during steps 251 and 263 (without partitioning information), 258 and 261 (with partitioning information equal to "0") and 256 (with partitioning information equal to "1"), knowing that the partitioning information items equal to 1 are not associated with any data item.

FIG. 21D illustrates a second variant, concerning the organisation of the parameters and partitioning information resulting from the primary processing of a single image.

It can be seen there that the sequence of compressed data corresponding to the image part depicted in FIG. 21A includes:
- a header, representing in particular the dimensions of the image (here equal to 512×512 pixels), the initial dimensions of the elementary sub-sets (here corresponding to 32×32 pixels), the ideal height and the definition of the minimum dimensions of the elementary sub-sets (here corresponding to 2×2 pixels) and a post-processing information item and if applicable the ratio of dimensions between the resolution of the luminance component and that of the chrominance components;
- the series of partitioning information items presented above:

0100010000101000000010000 each being associated with the parameters which corresponds to it, during the storage to memory effected during steps 251 and 263 (without partitioning information), 258 and 261 (with partitioning information equal to "0") and 256 (with partitioning information equal to "1"), knowing that, according to this second variant, even the partitioning information items equal to 1 are associated with data items and are recorded with them in register (REG 1) 560.

Owing to this arrangement, as illustrated in FIG. 21E, knowing the scale factor z (obtained during operation 420 described below, it is possible to select the data D and the partitioning information to be used during the secondary processing.

In this case, for a scale factor equal to 1/v, v being an integer number, there are kept, for the secondary processing, only the data D corresponding to elementary sub-sets of dimensions greater than or equal to 2v×2v pixels in the primary image, that is to say those which will give sub-sets of dimensions greater than or equal to 2×2 pixels in the tertiary image.

In the example in FIG. 21E, when the minimum dimensions of the elementary sub-sets of the primary image, that is to say of the image which is processed during the primary processing, are 8×8 pixels and when the scale factor is strictly less than ¼, the elementary sub-sets of minimum dimensions are not to be taken into account, because they would correspond, otherwise, to elementary sub-sets of dimensions strictly less than 2×2 pixels.

In the example illustrated in FIG. 21E, it is accepted that the scale factor is equal to one eighth, which amounts to dividing by sixty four the number of points of the image resulting from the secondary processing. It can be seen, in FIG. 21E, that none of the information items concerning the elementary sub-sets of smaller dimensions which resulted from two successive post-partitionings during the primary processing, is taken into account during the secondary processing.

The implementation of this second variant makes it possible to reduce the duration of the secondary processing, since here is it not essential to process all the parameters resulting from the primary image processing in order to reconstitute an image of smaller dimensions.

In FIG. 22 there is a representation of the organisation of the parameters and partitioning information resulting from primary processings of several images. The parameters and post-partitioning data concerning different images are organised as follows:
- a file 900 has a common header 901 in which are recorded various general data common to all the images represented in this file 900,
- an index table 909, in which the addresses of the sets of data concerning the images represented in the said file 900 are recorded. In the embodiment described and depicted here, the addresses of the start of description of the images are represented in the global header in the form of translation data, that is to say data indicating by how many successive addresses it is necessary to move in the file in order to reach the description of the said image, this commencing with a specific header,
- the specific headers 902, 904 and 906, representing, in particular:
  - the number of colour components (here 3),
  - the dimensions of the image (equal to 512×512 pixels for a complete image or less for sub-images),
  - the ideal height of the bands,
  - the initial dimensions of the elementary sub-sets (here corresponding to 32×32 pixels),
  - the definition of the minimum dimensions of the elementary sub-sets (here corresponding to 2×2 pixels),
  - a post-processing information item, and
  - any ratio of dimensions between the resolution of the luminance component and that of the chrominance components;
    - It is to be noted here that, preferably, where some of these information items are common to all the images of the file, then these information items are contained in the common header 901 and not in the specific headers 902, 904 and 906.
- the blocks of information 903, 905 and 907 include the series of partitioning information items, each of them being associated with the parameters which correspond to it, during the storage to memory effected during the steps 251 (without partitioning information) and 258 (with partitioning information), knowing that the partitioning information items equal to 1 are not associated with any data item (except, of course, if the second variant illustrated in FIGS. 21D and 21E is implemented).

Owing to the arrangements for organising files relating to a plurality of images, the number of files used is limited as are the operations of opening and closing the files, operations which have a particularly long duration. It should be recalled here that a file is a set of data which have conjointly the same address in memory. The secondary processing is thus accelerated.

In particular, when the display of several images of reduced size is designed to have an overall view of the these images, the use of a single file for representing several images considerably increases the speed of display of each reduced image.

The set of operations 205–258 or 205–256 is reiterated as long as memory (REG 2) is not empty.

When operation 207 is completed, test 205 is reiterated. When the result of test 205 is positive, operation 200E is reiterated. When the result of test 201 is positive, test 200B is reiterated. When the result of test 200B is positive, the post-processing determination operation 209A is performed. During this operation 209A:

on the one hand, the usefulness or otherwise of effecting a smoothing post-processing on the image resulting from a secondary processing of the parameters and partitioning information is determined, and on the other hand, the description of this image is stored, namely its specific header (including notably the dimensions of the image, the maximum and minimum dimensions of the elementary sub-sets, any ratio of dimensions between the resolution of the luminance component and that of the chrominance components and the ideal height), its partitioning parameters and information and the post-processing information representing the usefulness of the said post-processing.

In order to determine this usefulness, several criteria can be used. The first consists in comparing the minimum dimension of the elementary sub-sets with a dimension which serves as a threshold. When the minimum dimension is greater than the threshold dimension, this means that relatively large (for example 8×8 pixels) elementary sub-sets will be used even if the quality criterion defined at step 253 is not complied with and that it will therefore be profitable to reduce the edge sensation affecting such elementary sub-sets. The second (introduced above in relation to operation 254) consists in comparing the thresholds used in the table defining the quality criterion with critical values, with predetermined thresholds. When the thresholds actually used are greater than these critical values, this means that the quality criterion is easily complied with on elementary sub-sets of large dimensions, a sub-set whose edges may be visible. It is then, once again, advantageous to provide a post-processing.

Next, operation 209B includes the updating, in a common file (FIG. 22), of a header common to several sets of data resulting from the primary processing of several images (reference number 901, FIG. 22), the updating of an index table (reference number 909, FIG. 22) which contains addresses of sets of data concerning images, in the file under consideration.

Next the end step 210 is performed.

The following performance was observed on a 512×512 pixel colour image with 256 levels per component:

Number of data items at the start:
3×512×512×8 bits=6,291,456

Number of data items on arrival:
3×256×(4×64+10)=204,288 consequently:
compression ratio:30
number of bits per pixel:0.78

Processing time:
3×256×80 msec.≡61 sec.
(80 msec.=unit calculation time for $a_1, \ldots, a_4, b$)

Naturally, the invention applies both to the primary processing of grey-level images (having a single component) and to the processing of colour images (having several components).

Description of Two Embodiments of a
Decompression Flow Diagram

A description will be given, in relation to FIGS. 16 and 17, of the program flow diagram for reconstructing the data of the original colour image, or at least an approximate representation.

During operation 400, FIG. 16, an initialisation is carried out of the registers (IM), (RE) and (IT) of the random access memory 610, of the two memories (REG 1) 560 and (REG 2) 570, and of the intermediate variable Nb_lines_read, to the nil uniform value. During this same operation 400, the minimum dimension and the initial dimension, the total height of the image and the ideal height of the bands are read in the specific header concerning the secondary data to be processed.

During operation 420, the scale factor z is read at the input, by means of a keyboard, using technical arrangements which are not shown but which are well known to persons skilled in the art. During operation 420, the minimum dimension of the elementary sub-sets of the decompressed image is determined, taking the maximum value of the following two values:

the product of the minimum dimension read in the specific header (operation 400) and the scale factor z,
2×2 pixels.

During test 421, it is determined whether or not the variable Nb_lines_read is equal to the total height of the image. When the result of test 421 is negative, operation 422 consists in initialising the variable CNT, which indicates the component number, to the value 1, in register 513 (CNT). Next, operation 423 consists, in an identical fashion to operation 200D (FIG. 10), in determining the band height and updating the variable Nb_lines_read.

The program then performs operation 403, during which the compressed data of the input memory for the current band are loaded into memory (REG 1) 560. It is to be recalled that the compressed data are formed by a series of five or six numbers, namely the selected parameters $a_1, \ldots, a_4$ and the calculated value b and, if applicable, of an item of partitioning information, these relating to each elementary sub-set $K_i$.

Operation 403 consists, first of all, in opening the file 900, in which a plurality of images (FIG. 22) are represented, and then, in the common header 901 of the file 900, of reading the data concerning all the files and, in the index table 909, the address of the data concerning the image which it is wished to process in order to load these data into register 560.

The program then performs the operation 404, during which the list of the references of each elementary sub-set is created. It is a question in this case of a list of the coordinates ($x_i$, $y_i$) of the bottom left-hand pixel of each elementary sub-set $K_i$, as well as the division factor A associated with this elementary sub-set, this division factor A being recalculated according to the partitioning information as disclosed with the primary processing as well as the scale factor z which is associated with the entire image resulting from the secondary processing. This list is stored in the register (REG 2).

During operation 404, the elementary sub-sets constituting a partitioning of a second set of data are determined, a step taking into account on the one hand the minimum dimension determined during operation 420 and on the other hand the presence of partitioning information corresponding to the said sub-sets.

To this end, a partitioning operation is carried out exclusively on each elementary sub-set of dimension greater than the minimum dimension and to which there corresponds an item of partitioning information in the compressed data loaded into (REG 1).

Finally, during operation 404, data contained in REG 1 are withdrawn, the parameters which are not associated with the elementary sub-sets thus determined so that the only parameters processed in the subsequent operations are the parameters related to elementary sub-sets of dimension greater than the minimum dimension determined during step 420.

Thus, as described above, for a scale factor equal to 1/v, v being an integer number, there are kept, for the secondary processing, only the data D corresponding to elementary sub-sets of dimensions greater than or equal to 2v×2v pixels in the primary image, that is to say those which will give sub-sets of dimensions greater than or equal to 2×2 pixels in the tertiary image.

It will be noted here that the scale factor z is a multiplying factor which is applied to the dimensions of the image reconstructed during the secondary processing from data D from an image processed during a primary compression processing. This multiplying factor is also applied to the dimensions of each elementary sub-set, whether it comes from the initial partitioning or from post-partitionings, and to each dimension of a working sub-set associated with one of these elementary sub-sets.

When a ratio between the resolutions of the chrominance components and the luminance component has been transmitted in the header, the scale factor z is applied to the luminance and the product of the scale factor z and the said ratio is applied to the chrominance components, so that all the sets of data on which a component is reconstructed have the same resolution.

In accordance with the invention, no scale factor z causes a duplication of a pixel forming the appearance, in the reconstructed image, of uniform tiles.

The program next switches to step 406, during which:

in accordance with the embodiment of the invention described here, an initial arbitrary image having a number of lines equal to the band height multiplied by the scale factor z, each line having a number of pixels equal to 512 multiplied by the scale factor z, is stored in the register (IM) 511 of the random access memory 610. In the present case of decompression of a colour image where each component has 256 levels having respectively the values 0 to 255, the register (IM) is initialised to the numerical value 128 (corresponding substantially to the mean value between 0 and 255) for each pixel for the first component processed. For the following components, the result obtained for the previous component is used as the initialisation.

register (IT) 612 is initialised with a value p read in register 623 of RAM 610. The number of iterations is recorded in register 623 (p), having regard to the required RMSE (see above Table 1 of the general description of the method). The inventors in fact found, during tests with the prototype, that, in order to obtain a given RMSE from a compression ratio, a limited number of successive iterations during the approximation calculation was necessary. Typically: $2 \leq p \leq 10$; however, for very complex images, p may have a greater value.

The program next executes a number p of iterations of the loop with reference number 450 (operations 407, 408, 409 and 410), in order to enable a band of the component of the image to be restored.

The program switches first of all to test 407 during which it is verified whether the content of register (IT) 612 is positive and non-zero.

If test 407 is positive, the program switches to test 408, during which it is verified whether or not the list recorded in (REG 2) 570 is empty. If test 408 is negative, the program switches to step 410, which itself comprises steps 411 to 415 (FIG. 17).

At step 411, the coordinates ($x_i$, $y_i$) corresponding to the elementary sub-set $K_i$ under consideration, and its size, are withdrawn, and are copied into registers 525 and 526 of the random access memory RAM 510. In parallel, the selected parameters ($a_1, \ldots, a_4$) and the calculated value b, relating to the elementary sub-set under consideration, are copied from register (REG 1) to register 520 of the part 614 (CACHE) of the random access memory 610.

The purpose of operation 412 is to determine the working sub-sets related geometrically and in a predetermined fashion to the elementary sub-set $K_i$ under consideration, taking into account the fact that each working sub-set has dimensions twice those of the elementary sub-set under consideration (thus taking account of the scale factor z) and has a centre which is shifted, with respect to this elementary sub-set, by the dimension of the elementary sub-set under consideration, in each direction.

This operation 412 includes the same operations as the operation 250 described above. The values $f(L_1), \ldots, f(L_4)$ of the averages, for each pixel of the elementary sub-set, of the four pixels which correspond to it in each of the working sub-sets $L_1, \ldots, L_4$, are respectively copied into registers 516, 517, 518 and 519 of the part 614 (CACHE) of the random access memory 610.

The program next switches to steps 413 and 414, during which, for each pixel (x,y) of the elementary sub-set $K_i$, the value $$\sum_{i=1}^{4} a_i \cdot [f(L_i)](x, y) + b$$

is calculated using the parameters $a_1, \ldots, a_4$ and the value b stored in register 520 and the data $f(L_1), \ldots, f(L_4)$ stored in the registers 516 to 519 (step 413), and this value is stored (step 414) in register (RE) 621 of the RAM 610.

If test 408 is positive, the content of register (RE) 621 is copied into register (IM) 511, and the content of register (IT) 612 is decreased by one unit.

Test 407 is once again carried out. As long as this test is positive this means that the number of iterations provided for by the number recorded in register 623 (p) have not ended and the operations 408 to 410 are reiterated. When the result of test 407 is negative or zero, the number of iterations provided for have ended, for the component currently being processed, and the program leaves loop 450. This component is therefore decompressed.

Step 405 is then carried out, which consists, in order to effect an assembly of the bands of images, in copying the content of register (IM) 511 into the output buffer (OBFR) 690. Operation 424 next consists in incrementing the value of the variable CNT by 1, in register (CNT) 513. Next, test 401 determines whether or not the content of the counter 513 (CNT) is strictly greater than 3. As long as the result of test 401 is negative, this means that there remains at least one component to be decompressed.

When the result of test 401 is negative, operation 403 is reiterated.

In FIG. 16A, during test 430, counter 513 (CNT) is tested. If its content is equal to zero, this means that it is a case of the first component, the luminance component, and the register (IM) 511 is initialised to 128 for each pixel (step 431). The register (IT) is initialised to the value p (step 432).

If the content of the counter 513 (CNT) is greater than zero, this means that at least one component has been decompressed and, at step 433, register (IM) 511 is loaded with the content of register (RE) 621, that is to say with the values corresponding to the previously decompressed component. This makes it possible to reduce the number of iterations p by two units (step 434 at which initialisation (IT) is carried out to the value p-2) since the initial image is very close to the final image. The calculation time is reduced owing to this characteristic. Counter 513 (CNT) is next incremented by one unit (step 435).

However, according to a seventh variant, not shown, the processings of the three components, Y, Cr and Cb, of the image are carried out in parallel, taking a set of arbitrary data as the set of initial data.

When the three components have been decompressed, test 401 (FIG. 16) is positive, and the decompression program is then terminated for the three components of the band of the image under consideration. The program then effects test 421 described above. When the result of test 421 is positive, decompression of the entire image is ended and test 416 then consists in determining whether or not:

either the post-processing information present in the header of the data D and partitioning information represents the usefulness of effecting a post-processing, or the scale factor z has a value which makes a post-processing useful (z being for example, greater than or equal to 4).

When the result of test 416 is negative, the end step 402 is effected directly. When the result of test 416 is positive, the post-processing operation 417 is effected. This operation 417 consists in an operation known to persons skilled in the art as "post-processing", which refers to a processing carried out after the image decompression illustrated in FIG. 16. This processing includes, in a known fashion, a spatial filtering, designed to reduce any edge boundary in the elementary sub-sets.

Operation 417 also effects the assembly of the decompressed image bands, in particular, by reducing the appearance of the sensation of a separation between these bands. According to a variant presented below, operation 417 also effects a determination of values of pixels common to several decompressed image bands.

Preferably, the parameters of this filtering are a function of the dimensions of the sub-set processed. For example, the dimensions of the filter used are proportional to those of the sub-set under consideration, on the one hand, and the number of pixels to which this filter is applied is proportional to each dimension of the elementary sub-set under consideration, on the other hand. According to each of these examples, the scale factor z acts in the parameterisation of the post-processing. During operation 417, the data relating to each of the three components are, in turn, copied into the output buffer (OBFR) 690, in replacement for the data stored during operation 405, from where they are transferred to the means using decompressed data.

According to a variant which is not shown, each file resulting from the primary processing of an image is disposed in an individual specific file.

It is to be observed that, according to general characteristics of the invention, the primary processing includes a step, operation 251 or 258, of "constructing" a global contractive mapping of the first type, for the said first set of data, the fixed point of which constitutes an approximation of all or part of this set, using, to do this, at least one mapping belonging to the group of mappings consisting of multidimensional mappings and non-linear mappings. The parameters $a_i$ and b of the global contractive mapping make it possible to use, on a second set of data including a number of data which depends on the scale factor z, and which is generally different from the number of data in the first set, a method of successive approximations converging towards the fixed point of a global contractive mapping.

It is to be observed here that, in order to obtain a grey-level reconstructed image, without colour, it suffices to perform a primary processing only on the data resulting from the primary processing of the luminance of the colour image, this limitation also being referred to as program 632.

Description of the Flow Diagram of the Configuration Program

A description will now be given, in relation to FIG. 18, of the flow diagram of the configuration program used in the device 800 of FIGS. 9 and 9A.

The configuration program bears the reference 831 in FIGS. 9A and 18.

The device 800 illustrated in FIG. 9A has four operating modes, which will be detailed below.

The operating mode of the apparatus is first of all selected (step 832). The mode is selected by entering in the register MOD 822 a value equal to 0, 1 or 2 and in the register (CHTY) a value equal to 0 or 1. This recording can be made by any means within the capability of persons skilled in the art. In particular, it could be made by means of a switch arranged on the casing of the device 800 with four positions each corresponding to the required operating mode. This switch would make it possible to send the appropriate signals to the memory RAM 810, so as to load the indicated values into the registers MOD or (CHTY). This initialisation can also be carried out in similar fashion by means of a keyboard, not shown in FIG. 9A.

At step 833, a first test is carried out on the register MOD in order to determine whether or not its content is equal to zero. If test 833 is positive, this means that the operating mode chosen is the first of those mentioned above and program 531 is used from data fed from the data source 810, the compressed data being delivered as an output 881 to the means using compressed data 860 (FIG. 9).

If test 833 is negative, a test is carried out at step 834 in order to determine whether or not the content of register MOD is equal to 1.

If test 834 is positive, a test 840 is then carried out on the content of the register (CHTY) for the purpose of determining whether or not it is equal to 1.

If test 840 is negative, this means that the device of FIGS. 9 and 9A is in the second operating mode, that is to say in the one where it is used for restoring the original data of a colour image from parameters (compressed data) and partitioning information, supplied at input 881, from a source 861 (FIG. 9). The decompressed data delivered at the output 892 of the device 800 are destined for means using decompressed data 820.

If test 840 is positive, this means that device 800 is in the third operating mode, that is to say the one in which it is used for carrying out a secondary processing of compressed data and delivering data of a type other than that of the original data, in this case data relating to a grey-level image corresponding to an original colour image. In this case, program 632 is used from parameters and partitioning information delivered by a source of compressed data 861. The decompressed data are delivered at output 892 and fed to user means 820.

If test 834 is negative, this means that the content of the register MOD is equal to 2. Device 800, which is then in its fourth operating mode, is used for transforming a colour image into a grey-level image. This a case here of an example of complex processing coming under the present invention, including a primary processing phase and a secondary processing phase.

Thus, in the embodiment described here, in accordance with this aspect of the invention, the primary processing and secondary processing programs are used sequentially.

Program 531 makes it possible, using data delivered by a source of uncompressed data 810 at the input 891 of the device 800, to compress these data, in order to obtain parameters $a_i$, b, A relating to each of the elementary sub-sets $K_i$ of the original image. These parameters and partitioning information are, in accordance with which was described above in relation to FIG. 10, all present in the register (REG 1) 560 at the end of the program 531. The main program of FIG. 18 then demands a direct switching at the end of step 404 of the program 631 described above.

The transformed data are then presented at the buffer register (OBFR) 893 of the device 800 and transferred to the means 820 using decompressed data. These data are those relating to a grey-level image corresponding to the colour image whose data were transferred into the device 800 from the source 810.

It is to be noted that the sub-program including all the steps 404, 452, 406, 450, 405 and 402 of the program 632 here constitutes a particular mode of implementing a secondary processing method coming under the invention. It is this particular sub-program which is here implemented following the program 631 in order to constitute an example of a "complex" processing within the meaning of the present invention.

3. Description of an Eighth, Preferred, Variant, Using Working Sub-sets Having a Size Different From that of the Corresponding Elementary Sub-set When the working sub-sets have the same dimension as the elementary sub-sets with which they are associated, and when the contractive mapping is linear on each working sub-set, the reconstructed image cannot have, in the elementary sub-set under consideration, a greater complexity than those which it has in each working sub-set.

In addition, the convergence of the method of successive approximations can be relatively slow.

For these two reasons, and at least in the case of the use of multilinear contractive mappings, it is preferable to use working sub-sets having dimensions greater than those of the elementary sub-sets.

Thus a description will now be given, in relation to FIGS. 3A, 10, 11, 12A, 13 to 16 and 17A, of an eighth preferred variant embodiment of the method and device described above, in which at least one working sub-set has a size different from that of the corresponding elementary sub-set. In the particular embodiment of this eighth variant, four working sub-sets are associated with each elementary sub-set, these four working sub-sets having dimensions greater than those of the corresponding elementary sub-set.

The image to be processed is here an image of 512×512 pixels initially partitioned into square sub-sets of 32×32 pixels, in accordance with that which was described above in relation to FIG. 1.

The initial division of the image into working sub-sets will now be described, knowing that each post-partitioning of an elementary sub-set gives rise to the definition of working sub-sets of dimensions proportional to that of this elementary sub-set. The working sub-sets here have a size twice that of the elementary sub-sets, so that the image of 512×512 pixels is divided into square sub-sets of 64×64 pixels. However, if four working sub-sets are to correspond to a given elementary sub-set (see FIG. 3A), the shift used for the division of the image is 32 pixels, the division of the image then resulting in a tiling.

In FIG. 3A the elementary sub-set $K_i$ having the coordinates $(x_i, y_i)$ is illustrated in bold lines, whilst the corresponding working sub-sets are illustrated in broken lines, the other sub-sets being illustrated by means of fine lines. It will be observed that, in this embodiment, four working sub-sets $L_j$ (numbered $L_1, \ldots, L_4$) shifted by 64 pixels in both directions and disposed symmetrically with respect to the sub-set $K_i$ under consideration are related to each of the sub-sets $K_i$. This is a case in reality of the four sub-sets, resulting from the division, which cover the elementary sub-set under consideration (resulting from the initial partitioning). The following expressions show the coordinates of a sub-set $K_i$ and of the working sub-sets $L_1, \ldots, L_4$, for all values of the division factor A:

TABLE 2

$K_i$:[$x_i$, $x_i - 1 + (32/2^A)$] × [$y_i$, $y_i - 1 + (32/2^A)$]
$L_1$:[$x_i - (48/2^A)$, $x_i - 1 + (16/2^A)$] × [$y_i + (16/2^A)$, $y_i - 1 + (80/2^A)$]
$L_2$:[$x_i + (16/2^A)$, $x_i - 1 + (80/2^A)$] × [$y_i + (16/2^A)$, $y_i - 1 + (80/2^A)$]
$L_3$:[$x_i - (48/2^A)$, $x_i - 1 + (16/2^A)$] × [$y_i - (48/2^A)$, $y_i - 1 + (16/2^A)$]
$L_4$:[$x_i + (16/2^A)$, $x_i - 1 + (80/2^A)$] × [$y_i - (48/2^A)$, $y_i - 1 + (16/2^A)$]

It should be stated here that the points of the working sub-sets defined above which do not belong to the image, that is to say those where at least one of the coordinates is negative, have a mean value notionally associated with them, for example 127, for each component.

The compression and decompression devices used for implementing this eighth variant embodiment are similar to those described in relation to FIGS. 4 and 6. However, programs 531 and 631 are modified as will be explained below.

With regard first of all to the compression program 531 described above in relation to FIG. 10, its structure is kept. Only operation 250 changes. This modified operation 250A will be described below in relation to FIG. 12A.

At step 250A, a search is made for the four adjacent working sub-sets $L_1$, $L_2$, $L_3$, $L_4$ (see FIG. 3A) from the address recorded in the register CSI. For this purpose, the rule stated above is applied.

The purpose of step 250A is to determine the values f(x,y) of the component under consideration, associated with each of the pixels of the working sub-sets $L_1$, $L_2$, $L_3$, $L_4$ related geometrically and in a predetermined fashion to the elementary sub-set under consideration $K_i$. The set of values f(x,y) related to the pixels of the sub-set $L_1$ (respectively $L_2$, $L_3$ and $L_4$) will be denoted below f($L_1$) (respectively f($L_2$), f($L_3$) and f($L_4$)) in accordance with the notations used above.

The essential element which differentiates step 250A (FIG. 12A) from step 250 (FIG. 12) lies in the fact that the set of values represented by f($L_i$), i=1, . . . , 4 concerns working sub-sets $L_i$, i=1, . . . , 4 which have a size different from that of the elementary sub-set $K_i$. In order to be able to perform the operations of comparison with the sub-set $K_i$, it is necessary to return the sets j($L_i$) to the same size. Several methods are available to persons skilled in the art. In this embodiment, where the size of the working sub-sets is 64×64 pixels and that of the elementary sub-sets 32×32 pixels, a mean value is adopted per square of 4 pixels. The set of these means values will be denoted, for a working sub-set $L_i$ under consideration: f($L_{i/2}$). The detailed flow diagram of this step is depicted in FIG. 12A.

Figure 12A:
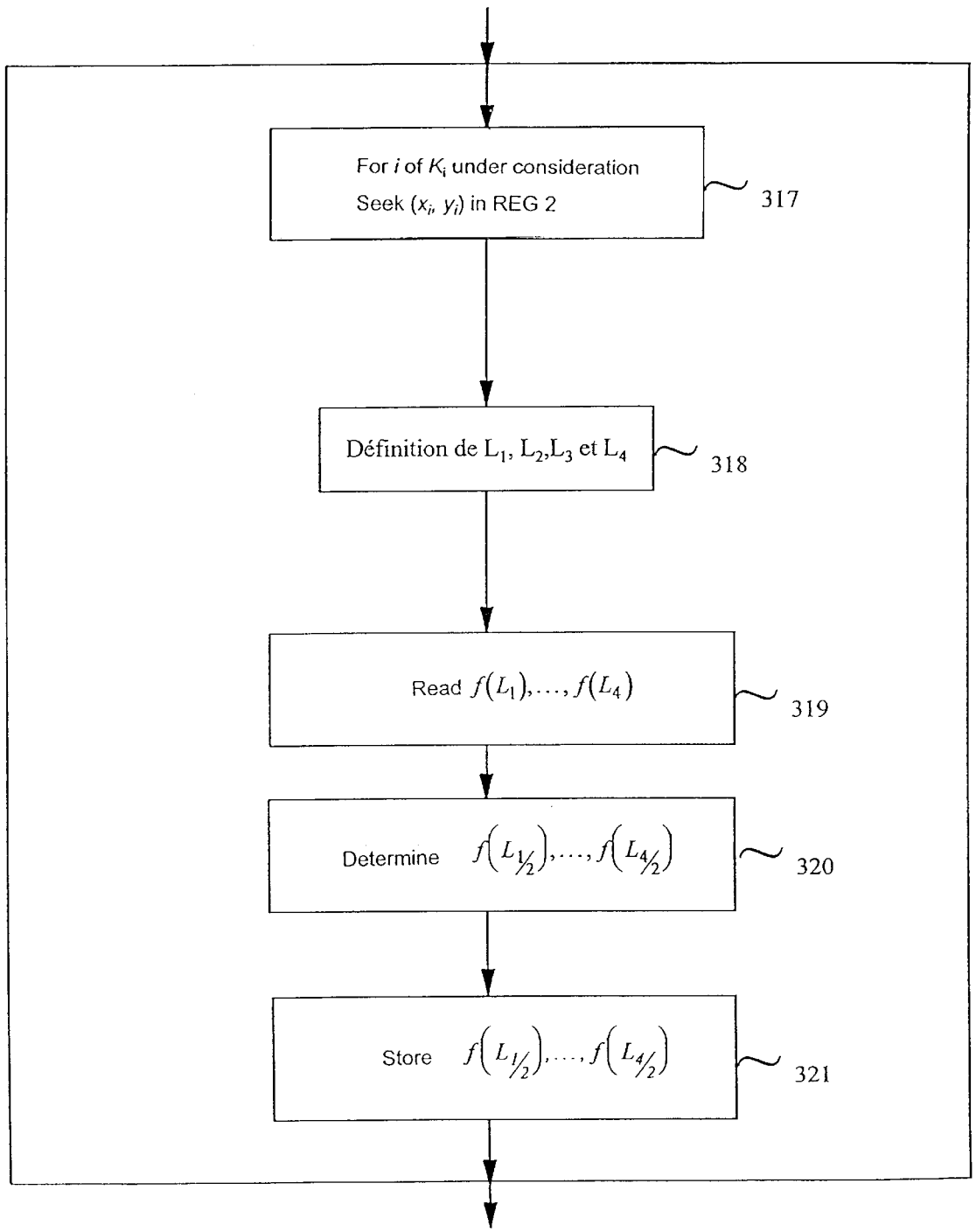

With reference to FIG. 12A at step 317, the coordinates ($x_i,y_i$) of the bottom left-hand pixel of the elementary sub-set $K_i$ under consideration and the division factor A are copied into arithmetic unit 550, and are stored in register (REG 2) 570. Next, arithmetic unit 550 determines the coordinates of each pixel of each working sub-set according to Table 2, as indicated at step 318.

At step 319, arithmetic unit 550 seeks, for the component currently being processed, the value corresponding to each of the $(64/2^A)^2$ pixels of $L_1$ (respectively $L_2$, $L_3$ and $L_4$) and stores the set of $(64/2^A)^2$ values in register f($L_1$) 516 (respectively f($L_2$) 517, f($L_3$) 518 and f($L_4$) 519) of the cache 514.

At step 320, the arithmetic unit 550 processes each square of 2×2 values of f($L_1$) and substitutes therefor a corresponding value of f($L_{1/2}$) in the register 516. In this embodiment, the corresponding value of f($L_{1/2}$) will be obtained by calculating the mean of the values of the said square of 2×2 values of f($L_1$). The other sets f($L_2$), . . . , f($L_4$) are next processed in the same way.

At step 321, the values of f($L_{1/2}$), . . . , f($L_{4/2}$) are stored in the part 514 (CACHE) of the random access memory 510, in the registers f($L_1$) 516 to f($L_4$) 519.

The program next switches to step 208 (FIG. 13) during which, as indicated above, the parameters $a_i$ (in this case $a_1$, $a_2$, $a_3$, $a_4$) and b are calculated by implementing the method of least squares with the constraints described above (see equations 12 and 13). However, in this embodiment, the value of β will be less than $$\frac{\sqrt{2}}{n}.$$

It is to be observed that the latter value is higher than that used in the first embodiment. This is because, since, during step 320, substitute working sub-sets where the value of each pixel is calculated as the mean of the values of four pixels of the initial image were placed in registers 516 to 519, a contractive mapping has already been effected. The constraints applied to the contractiveness of the global mapping which follows this substitution can consequently be reduced.

The operation of the compression program is, apart from that, identical to the operation of the compression program 531 described above in relation to FIG. 10. The only difference being that, in registers 516 to 519, the values $$f(L_{1/2}), \ldots , f(L_{4/2})$$

are stored.

In this eighth variant embodiment, the decompression program functions in a similar fashion to the program 631 described above in relation to FIGS. 16 and 17. However, operation 410 must be modified as disclosed below and will designated by reference number 410A, illustrated in FIG. 17A.

The detail of step 410A is described in relation to FIG. 17A.

Step 410A itself comprises steps 459 to 465:
Steps 459 and 460 are identical to steps 411 and 412 described above (FIG. 17), but they take into account, for defining the elementary sub-sets and working sub-sets, the multiplying factor referred to as the "scale" factor z, which multiplies each of their dimensions in a set of data which itself has dimensions which are multiplied by this scale factor.

The program next switches to steps 461, 462 and 463 during which the values f($L_1$), . . . , f($L_4$) are determined. Next, at step 462, the values $$f(L_{1/2}), \ldots , f(L_{4/2})$$

are determined. To do so, the arithmetic unit 550 processes each square of 4 values of f($L_1$) and replaces it by a corresponding value of $$f(L_{1/2})$$

in the register 516. In this embodiment, the corresponding value of $$f(L_{1/2})$$

is obtained by calculating the mean of the values of the said square or any other low-pass filtering well known to persons skilled in the art. The other sets f($L_2$), . . . , f($L_4$) are next processed in the same way. At step 463, for each pixel (x,y) of $K_i$, the value $$\sum_{i=1}^{4} a_i \cdot [f(L_{i/2})](x, y) + b$$

is calculated using the coefficients of 520 and the data $$f(L_{1/2}), \ldots , f(L_{4/2})$$

from 516 to 519 (step 462), and this value is stored (step 463) at the corresponding pixel in the register (RE) 620 of the RAM 610.

Finally, step 464 is identical to step 414 (FIG. 17).

The operation of the decompression program modified as disclosed above in relation to FIG. 17A is for the rest identical to the operation of the decompression program 631 described above in relation to FIG. 16.

In this eighth variant embodiment, a complex processing for transforming data can also be carried out, as described above in relation to FIG. 18, implementing the compression 531 and decompression 631 programs modified as disclosed above in relation to FIGS. 10, 11, 12A, 13, 14 and 17A.

4. Description of the Third Variant Embodiment Using a Global Contractive Mapping Composed of Non-linear Mappings In this third variant embodiment of the methods and devices according to the invention, a global contractive mapping composed of non-linear mappings is used.

In this third variant embodiment, which also concerns the compression and decompression of images, the image to be processed is also a 512×512 pixel image. This image is initially partitioned into elementary sub-sets and divided into working sub-sets in the same way as described above in relation to FIGS. 1 to 3.

The global mapping used in a particular mode of this third variant embodiment will now be defined.

In accordance with this aspect of the invention, each "piece" of the global contractive mapping is a non-linear elementary Lipschitz mapping of the type:

$$T(f)|_{Ki} : (x, y) \in Ki \rightarrow [T(f)](x, y) = \sum_{j=1}^{n} a_j \cdot g_j[f] \bigg|_{Lj} (x, y) + b \quad (10c)$$

where:

$T(f)| Ki$ the restriction of $T(f)$ to the elementary sub-set $K_i$ $g_1[f], \ldots, g_n[f]$ are non-linear transformations of $f(g_i \in F (E, E))$, such as
  fractional or integer powers of
    $f$ (for example $g[f]=\sqrt{f}$), $n>1$ the number of working sub-sets ($n=4$ in this embodiment)

$a_1, \ldots a_n$ the multiplying coefficients $b$ the translation factor $L_1, \ldots L_n$ the working sub-sets, with a position predetermined with respect to $K_i$ and related to this sub-set.

It can be seen that equation (10c) above is non-linear in nature essentially because of the non-linear transformations $g_1, \ldots, g_n$, the coefficients $a_j$, $j=1, \ldots, n$ and $b$ being respectively the multiplying coefficients and the translation factor. The coefficients $(a_1, \ldots, a_n, b)$, are here the "parameters" within the meaning of the invention of the elementary mapping relating to the sub-set $K_i$. The set of coefficients $(a_1, \ldots, a_n, b)_{Ki}$ relating to the m elementary sub-sets $(K_1, \ldots, K_m)$ here also constitutes the "set of parameters" of the global contractive mapping coming under the invention.

It should be stated that, in this embodiment, $n=4$, which means that only four working sub-sets $L_j$, $j=1, \ldots, n$ such as those defined in relation to FIG. 3 are related to each elementary sub-set $K_i$.

Thus, a value calculated from the non-linear equation (10c) is associated with each pair of values (x,y) of a determined elementary sub-set $K_i$ This is done for all the m elementary sub-sets $(K_1, \ldots, K_m)$ resulting both from the initial partitioning and from post-partitioning, as described above.

In order to solve the simplified optimisation problem (see above, notably equation (7)) which makes it possible to determine the coefficients of the non-linear mapping $a_j$, $j=1, \ldots, n$ and $b$ for each of the elementary working sub-sets $K_i$, it is necessary, in general terms, for each elementary sub-set $K_i$, to minimise the distance between the restriction to the elementary sub-set $K_i$ and its transform by the global contractive mapping. In other words, it is necessary to minimise the distances:

$$d(f|_{Ki}, T(f)|_{Ki}), i=1, \ldots m \quad (11)$$

In this regard, the theory disclosed in relation to equations (12) to (29) in the part relating to the general theory is applied.

In addition, it will be observed that, in general terms in this third variant embodiment, the method of secondary representation of the parameters resulting from the primary processing, of initial data, uses the general principles described above in relation to equations (30) to (32).

The compression and decompression devices used to implement this third variant embodiment are similar to those described above in relation to FIGS. 4 and 6. However, the programs 531 and 631 are modified as will be explained below.

With regard first of all to the compression program 531 described above in relation to FIG. 10, its structure is kept. Only step 251 relating to the calculations of the coefficients changes. This third variant, which concerns notably step 251 (reference number 251B), will now be described notably in relation to FIG. 12B.

Step 251B includes steps 322 and 323 respectively identical to steps 217 and 218 described above in relation to FIG. 12. At step 324, the values $f(L_1), \ldots, f(L_4)$ are read in the register (IM) 511.

At step 325, the values $g_1[f(L_i)], \ldots, g_4[f(L_4)]$, are determined, calculating by applying the formula $$g_i[f(L_i)]] = \sqrt{f(Li)}.$$

Finally, at step 326, the values $g_1[f(L_i)], \ldots, g_4[f(L_4)]]$ are stored in the registers 516 to 519 of the part 514 (CACHE) of the random access memory 510.

The operation of the compression program with the operation 250 modified as just described is, for the rest, identical to the operation of the program 531 described above in relation to FIG. 10.

Likewise, in this third variant embodiment, the decompression program functions in a similar fashion to the program 631 described above in relation to FIGS. 16 and 17. However, the operation 410 must be modified as disclosed below. This new operation, which reference number is 410B, is illustrated in FIG. 17B.

The details of step 410B will now be described in relation to FIG. 17B. Step 410B itself comprises steps 471 to 475:

At step 471, the coordinates $(x_i, y_i)$ of the elementary sub-set $K_i$ under consideration are withdrawn and copied into the register CS1 515. The coefficients $(a_1, \ldots, a_4, b)$, relating to the sub-sets $K_i$ under consideration, are copied from the register (REG 1) to the register 520 of the part 614 (CACHE) of the random access memory 610.

The purpose of step 472 is to determine the working sub-sets related geometrically and in a predetermined fashion to the elementary sub-set $K_i$ under consideration. This step includes the same operations as at step 250 described above in relation to FIG. 12. The values $g_1[f]|_{L_1}$, $g_2[f]|_{L_2}$, $g_3[f]|_{L_3}$ and $g_4[f]|_{L_4}$ of the pixels relating respectively to $L_1$, $L_2$, $L_3$ and $L_4$ are respectively copied into the registers 516, 517, 518 and 519 of the (CACHE) 614.

The program next switches to steps 473 and 474, during which, for each pixel (x,y) of $K_i$ the value $$\sum_{i=1}^{4} a_i \cdot [g_i[f]|_{L_i}](x, y) + b$$

is calculated using the coefficients stored in register 520, and the data $f(L_1), \ldots, f(L_4)$ stored in the register from 516 to 519 (step 474), and this value is stored at the corresponding pixel in register (RE) 621 of the random access memory RAM 610.

Figure 12B:
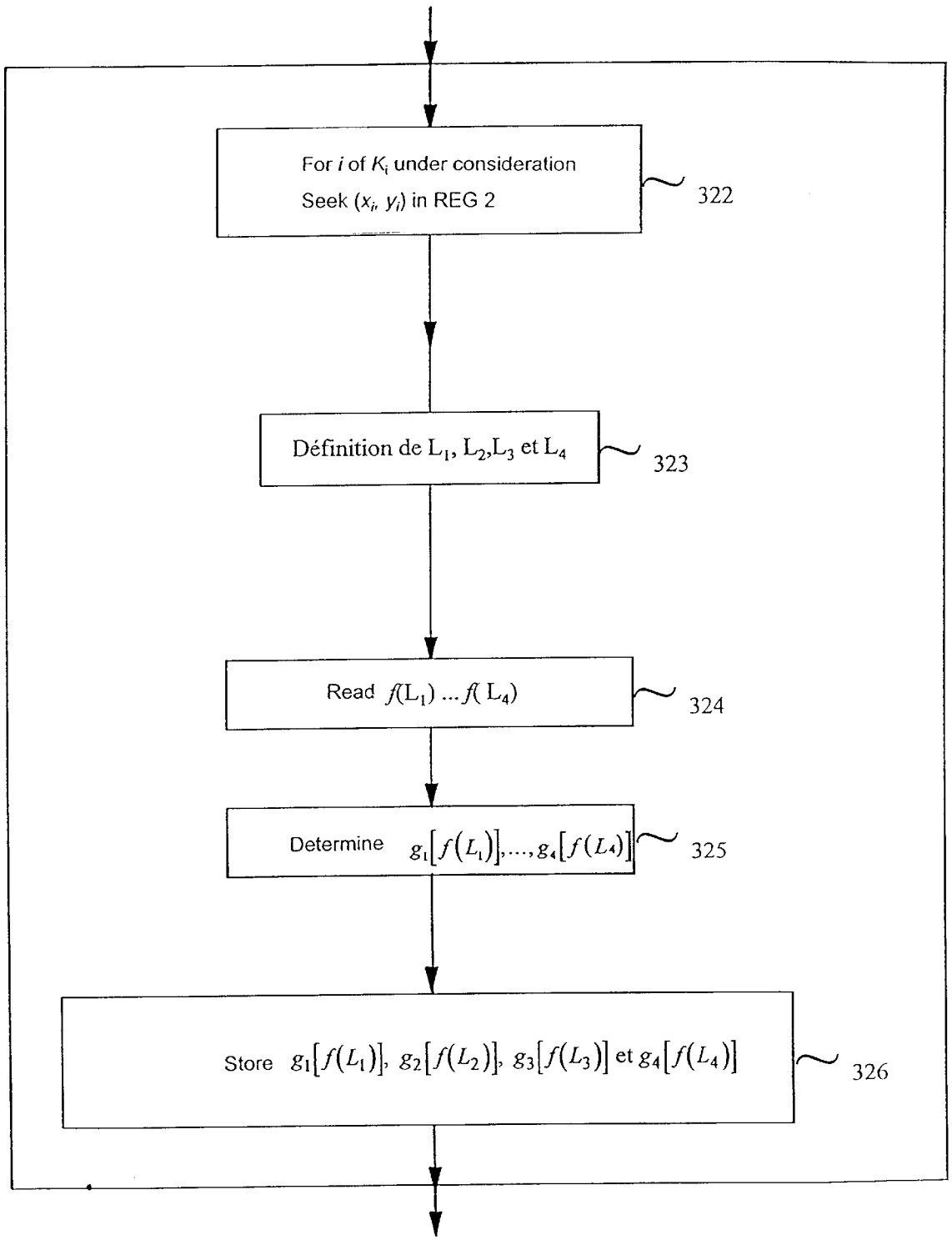

In this third variant embodiment, it is also possible to carry out a complex processing for transforming data as described above in relation to FIG. 18, using compression 531 and decompression 631 programs modified as disclosed above in relation to FIGS. 12B and 17B.

5. Description of the First Variant Embodiment Using a Quality Criterion Measured by Means of the Global Contractive Mapping According to the first variant, the quality criterion used for determining the need to effect a post-partitioning is not, as presented in relation to FIG. 19, the comparison, on the one hand, of a statistical measurement effected on the levels of the component under consideration in an elementary sub-set with, on the other hand, a threshold, but the comparison of a measurement of differences between, on the one hand, the image obtained after having applied to it a global contractive mapping, and, on the other hand, this initial image.

This first variant is illustrated in FIG. 20, in which the tests and operations common with FIG. 19 bear the same references. In this first variant, following operation 206, operation 250 is performed, taking into account the updated value of the division factor A. Operation 250 determines, it will be recalled, the working sub-sets associated with the elementary sub-set under consideration.

Next, operation 260 is identical to operation 251 (FIG. 19) with the exception of the storage in the memory register 560 (REG 1). It therefore supplies parameters of the global contractive mapping, in the elementary sub-set under consideration. Test 255 follows operation 260 and determines, as disclosed above, whether or not the elementary sub-set has minimum dimensions.

When the result of test 255 is positive, operation 263 consists in storing in register 560 (REG 1) the five parameters determined during operation 260, without associating with them any partitioning information since no new post-partitioning can take place. Next, test 205 is reiterated.

When the result of test 255 is negative, the operation consists in determining a quality criterion applicable to the elementary sub-set under consideration. Preferentially, the definition of the quality criterion consists in the definition of a threshold beyond which the quality criterion is considered to be complied with. Preferentially also, the value of the threshold takes into account the dimensions of the elementary sub-set under consideration. In the embodiment described and depicted, this threshold is the function corresponding to the following table:

| dimensions of the sub-set in pixels | threshold |
|---|---|
| 2 × 2 | 800 |
| 4 × 4 | 640 |
| 8 × 8 | 400 |
| 16 × 16 | 240 |
| 32 × 32 | 80 |

It is to be observed here that it is preferable to use a table corresponding to a decreasing function of the dimensions of the elementary sub-set.

Test 254 next determines whether or not the quality criterion is complied with. In the embodiment described and depicted, this quality criterion is complied with when the measurement of the mean square deviation between the component under consideration and its image by the global contractive mapping, a measurement restricted to the elementary sub-set under consideration, is less than the value of the threshold which corresponds, in the above table, to the dimensions of the elementary sub-set under consideration.

When the result of test 254 is negative, operation 256 consists in effecting a post-partitioning of the elementary sub-set under consideration. In the embodiment described and depicted, this post-partitioning consists in dividing each elementary sub-set into four equal square elementary sub-sets. For this purpose, during operation 256, there are added at the head of the list sub_image_list, in register (REG 2) 570, the coordinates of the four points which define the bottom left hand corners of the four elementary sub-sets resulting from the post-partitioning. With these coordinates there is associated a division factor A which is equal to the division factor of the elementary sub-set which is partitioned, incremented by the value 1. Finally, an item of partitioning information equal to "1" is stored in register 560 (REG 1) since a post-partitioning has been effected.

When the result of test 254 is positive, during operation 261, the five parameters determined during operation 260 are stored in register 560 (REG 1) with an item of partitioning information equal to "0" since no post-partitioning has taken place.

In the first variant disclosed in FIG. 20, it is advantageous to measure the mean of the values of the mean square deviation of all the elementary sub-sets processed for which this deviation is measured during operation 254, in order to determine the usefulness of a post-processing during the secondary processing: when this mean is greater than a predetermined global critical value, it is useful to provide a post-processing (operations 416 and 417, FIG. 16).

It is to be observed here that the flow diagrams presented in relation to FIGS. 19 and 20 combine particularly well, making the operation 262 of FIG. 20 follow on at the end of operations 258 in FIG. 19.

According to a tenth variant, not shown, the post-partitionings are effected by performing a non-homothetic division of the elementary sub-sets, such as for example a division into triangles, into two equal rectangles, successively by forming two rectangles side by side horizontally or vertically, etc.

According to an eleventh variant, the scale factor is not uniform. It may thus, for example, have a horizontal value, which serves as a multiplying coefficient for the horizontal dimensions of the elementary sub-sets and a vertical value which serves as a multiplying coefficient for the vertical dimensions of the elementary sub-sets. The scale factor can thus have a value which varies according to the distance at the centre of the image . . . .

According to a twelfth, preferential, variant, the scale factor is different for the different components of the processed image. For example, the scale factor is, for each chrominance component, double that which it is for the luminance component. In this case, a filtering preliminary to the primary processing (that is to say here to the compression) is effected, a filtering which divides the resolution of the chrominance components by a factor of two in each direction, giving to each component of each pixel of the image of lowest resolution the mean value of the corresponding component of four pixels of the initial image. This factor is transmitted in the header in the form of the abovementioned ratio.

Conjointly, the number of initial data used for the reconstruction of the luminance component is, in each direction, twice the number used for each of the chrominance components. This is because it is normal for the complexity of the chrominance components to be less than that of the luminance component, on the one hand, and for this complexity to be less perceived by the human eye.

In combination with this twelfth variant, the primary processing device is adapted to effect, before the operations illustrated in FIG. 10, a filtering of the chrominance components in order to divide their resolution by two in each direction of the image.

According to a thirteenth variant, each file resulting from the primary processing contains only data relating to a single image, in which case the index table 909 is unnecessary.

According to a fourteenth variant, the image is not divided into bands and the band height information is unused.

According to a fifteenth variant, not shown, the successive bands of the image to be compressed have a non-empty intersection. These bands therefore partially overlap, which avoids edge effects which may impair the quality of the restored image. For implementing this variant, a person skilled in the art modifies the flow diagram of FIG. 10, and notably: operation 200D, where the band height is reduced by 32, lines compared with what which is described above,
  operation 202, during which, as from the second iteration of this operation 202, the program loads not only a band whose height is the height determined during operation 200D, and which does not have any common point with the previous band, but also the last 32 lines of the previously processed band,
  operation 209A, during which it is determined that a band assembly post-processing is necessary and an item of information requiring this post-processing is inserted in the header relating to the processed image.

The variant of the decompression method which corresponds to the fifteenth variant disclosed above has here a post-processing step 417 which itself includes a step of assembling the image bands resulting from the decompression of the parameters relating to each band. During this assembly step, intersections of the decompressed image bands are determined and, in these intersections, a combination of these bands is determined in order to constitute a complete decompressed image.

Preferably, for an intersection of the image bands, during the post-processing step, the mean of the values of the pixels of the points common to several bands is calculated and the said mean value is attributed to the corresponding pixel of the final image.

Naturally, the present invention is in no way limited to the embodiments chosen and depicted but, quite the contrary, encompasses all variants within the capability of persons skilled in the art.

What is claimed is:

1. Method for encoding at least one digital signal representing a set of data, the set of data representing at least one digital image, comprising:
  a set division step during which the set of data is divided into first sub-sets of data representing sub-images; and for each first sub-set of data:
    a step of constructing a global contractive mapping of a first type for the sub-set of data, a fixed point of which constitutes an approximation of all or part of this first sub-set,
    using, to do this, at least one mapping belonging to the group of mappings consisting of multidimensional mappings and non-linear mappings, and
    a step of determining parameters of the global contractive mapping so as to allow the use, on a second sub-set of data, of a method of successive approximations converging towards the fixed point of a second type of global contractive mapping,
    wherein the determined set of parameters constitutes a primary, encoded representation of the set of data represented by the at least one digital signal.

2. Primary processing method according to claim 1, wherein the set division step supplies first sub-sets which, between them, have no common point.

3. Primary processing method according to claim 1, wherein the set division step supplies first sub-sets which, between them, have common points.

4. Primary processing method according to claim 1, wherein, for each first sub-set of data, the method further comprises:
  an initial partitioning step during which the first set of data is partitioned into initial elementary sub-sets,
  wherein, during the construction step, for each of the elementary sub-sets, the parameters of the elementary mapping which constitutes a restriction of the global contractive mapping to the elementary sub-set are determined, and
  the method of successive approximations applied on the second set of data is enabled to take into account elementary sub-sets each corresponding to an elementary sub-set of the first set of data and including a number of data items which is different from that of the elementary sub-set of the corresponding first set of data.

5. Primary processing method according to claim 4, wherein:
  during the construction step, for each of the elementary sub-sets resulting from the initial partitioning, n working sub-sets are considered, n being non-zero, and an elementary mapping is constructed of the n working sub-sets in the elementary sub-set under consideration, determining the parameters of the elementary mapping, and
  the method of successive approximations implemented on the second set of data is enabled to take into account working sub-sets each corresponding to a working sub-set of the first set of data and including a number of data items which is different from that of the working sub-set of the corresponding first set of data.

6. Primary processing method according to claim 5, wherein at least one working sub-set amongst the n working sub-sets has a size different from that of the corresponding elementary sub-set.

7. Primary processing method according to claim 5, wherein the n working sub-sets are geometrically related in a predetermined fashion to the elementary sub-set under consideration.

8. Primary processing method according to claim 1, wherein, for the first set of data constituting a colour image with several components, the method also includes a filtering operation during which at least one of the components is filtered and the number of data items of the set of data related to at least one component is modified.

9. Primary processing method according to claim 8, wherein, during the filtering operation, the number of data items of the sets of data related to the chrominance components is reduced, compared with the number of data items of the set of data related to the luminance component.

10. Primary processing method according to claim 1, wherein the method further includes:

an initial partitioning step during which the set of data is partitioned into initial elementary sub-sets;

for each elementary sub-set which does not have a minimum dimension, performing at least one iteration of a sequence of steps, including:

a division suitability estimation step during which a suitability of division of the elementary sub-set is estimated, and when the suitability estimation does not meet predetermined quality criteria, performing a step of post-partitioning of the sub-set into intermediate elementary sub-sets, a construction step in which, for each of the elementary subsets, whether it results from the initial partitioning or from a post-partitioning and whether or not it has itself been the subject of a post-partitioning, an elementary mapping is constructed in the elementary sub-set under consideration by determining the parameters of the elementary mapping so as to constitute the restriction of the global contractive mapping in the elementary sub-set under consideration, the set of parameters thus determined, together with, when at least one post-partitioning step has taken place, an item of partitioning information, representing each said post-partitioning, constituting conjointly a primary representation of the set of data.

11. Method of processing at least two sets of data representing physical quantities, referred to as first sets of data, wherein the method applies, for each first set of data, a primary processing method according to any one of claims 1 to 10 and in that the method includes a step of organising a computer file including data representing each set of parameters resulting from a construction step applied to each first set of data, the parameters thus organised in a file thus constituting a primary representation of the first sets of data.

12. Method according to claim 1, further comprising an initial partitioning step during which each sub-set of data is partitioned into initial elementary sub-sets, wherein the method further comprises:

a) for each elementary sub-set which does not have a minimum dimension, performing at least one iteration of a sequence of steps including:

a step of estimating suitability of division, during which a suitability of division of the elementary sub-set is estimated; and when the suitability estimation does not meet predetermined quality criteria, a step of post-partitioning of said sub-set into intermediate elementary sub-sets.

13. Primary processing method according to claim 12, wherein, for at least one iteration of the sequence of steps, the suitability estimation determined during the suitability estimation step consists of a measurement of a predetermined statistical quantity applied to the data of the elementary sub-set under consideration.

14. Method of processing at least two sets of data representing physical quantities, referred to as first sets of data, wherein the method implements, for each first set of data, a primary processing method according to any one of claims 1 to 10, 12, or 13, and in that the method includes:

a step of organising a computer file containing data representing each set of parameters resulting from a construction step applied to each first set of data, the parameters thus organised in a file thus constituting a primary representation of the first sets of data.

15. Primary processing method according to claim 14, wherein the organisation step includes an operation of constituting a header common to all the parameters, and a step of constituting a list of data representing positions of parameters in the file.

16. Device for encoding at least one digital signal representing a set of data, the set of data representing at least one digital image, the device comprising:

means of inputting primary data;

set division means adapted to divide the set of data into first sub-sets of data representing sub-images;

construction means adapted, for each first sub-set of data, to construct a global contractive mapping of a first type for the sub-set of data, a fixed point of which constitutes an approximation of all or part of this first subset, using, to do this, at least one mapping belonging to the group of mappings consisting of multidimensional mappings and non-linear mappings, and determining parameters of the global contractive mapping so as to allow the use, on a second sub-set of data, of a method of successive approximations converging towards the fixed point of a second type of global contractive mapping; and means for outputting the set of parameters thus determined, wherein the determined set of parameters constitutes a primary, encoded representation of the set of data represented by the at least one digital signal.

17. Primary processing device according to claim 16, wherein the set division means is adapted to supply first sub-sets which, between them, have no common point.

18. Primary processing device according to claim 16, wherein the set division means is adapted to supply first sub-sets which, between them, have common points.

19. Primary processing device according to claim 16, wherein the device includes partitioning means adapted, for each first sub-set of data, to partition the first set of data into initial elementary sub-sets, the construction means being adapted, for each of the elementary sub-sets, to determine the parameters of the elementary mapping which constitutes a restriction of the global contractive mapping to the elementary sub-set.

20. Primary processing device according to claim 19, wherein the construction means is adapted, for each of the elementary sub-sets resulting from the initial partitioning, to consider n working sub-sets, n being non-zero, and to construct an elementary mapping of the n working sub-sets in the elementary sub-set under consideration by determining the parameters of the elementary mapping.

21. Primary processing device according to claim 20, wherein the construction means is adapted so that at least one working sub-set amongst said n working sub-sets has a size different from that of the corresponding elementary sub-set.

22. Primary processing device according to claim 20, wherein the construction means is adapted so that the n working sub-sets are geometrically linked in a predetermined fashion to the elementary sub-set under consideration.

23. Primary processing device according claim 16, wherein for the first set of data constituting a colour image with several components, the device also comprises filtering means adapted to filter at least one of the components and to modify the number of data items in the set of data related to at least one component.

24. Primary processing device according to claim 23, wherein the filtering means is adapted to reduce the number of data items in the sets of data related to the chrominance components, compared with the number of data items in the set of data related to the luminance component.

25. Primary processing device according to claim 16, further comprising partitioning means adapted to partition the set of data into initial elementary sub-sets and, for each elementary sub-set which does not have a minimum dimension, to carry out at least one iteration of a sequence including:

a division suitability estimation step during which a suitability of division of the elementary sub-set is estimated; and when the suitability estimation does not meet predetermined quality criteria, a step of post-partitioning the sub-set into intermediate elementary sub-sets, the construction means being adapted, for each of the elementary sub-sets, whether it results from the initial partitioning or from a post-partitioning and whether or not it has itself been the subject of a post-partitioning, to construct an elementary mapping in the elementary sub-set under consideration by determining the parameters of the elementary mapping so as to constitute the restriction of the global contractive mapping in the elementary sub-set under consideration, the output means being adapted to transmit the set of parameters thus determined, together with, when at least one post-partitioning step has taken place, a partitioning information item, representing each said post-partitioning, constituting conjointly a primary representation of the set of data.

26. Device according to claim 16, further comprising:

initial partitioning means adapted to partition the set of data into initial elementary sub-sets;

calculation means adapted, for each elementary sub-set which does not have a minimum dimension, to effect at least one iteration of a sequence of steps including:

a step of estimating suitability of division during which a suitability of division of the elementary sub-set is estimated, and when the suitability estimation does not meet predetermined quality criteria, a step of post-partitioning of the sub-set into intermediate elementary sub-sets.

27. Device according to claim 26, wherein the calculation means is adapted, for at least one iteration of the sequences of steps, to effect the estimation of suitability determined during the suitability estimation step by effecting a measurement of a predetermined statistical quantity applied to the data of the elementary sub-set under consideration.

28. Device according to claim 16, further comprising organisation means adapted to organise a computer file including data representing each set of parameters resulting from a construction step applied to each first set of data, the parameters thus organised in a file constituting a primary representation of the first sets of data.

29. Printer, wherein the printer includes a device according to claim 16.

30. Photocopier, wherein the photocopier includes a device according to claim 16.

31. Still camera, wherein the still camera includes a device according to claim 16.

32. Facsimile machine, wherein the facsimile machine includes a device according to claim 16.

* * * * *

UNITED STATES PATENT AND TRADEMARK OFFICE
CERTIFICATE OF CORRECTION

PATENT NO.      : 6,498,866 B2
DATED           : December 24, 2003
INVENTOR(S)     : Maryline Charrier et al.

It is certified that error appears in the above-identified patent and that said Letters Patent is hereby corrected as shown below:

Title page,
Item [*], Notice, insert:
-- [*] Notice:  This patent issued on a continued prosecution application filed under 37 CFR 1.53(d), and is subject to the twenty year patent term provisions of 35 U.S.C. 154(a)(2). --.
Item [56], References Cited, OTHER PUBLICATIONS, under "A.E. Jaquin," "Rview," should read -- Review, --.

Drawings,
Sheet 15, Figure 12A, "Définition de" should read -- Definition of --.
Sheet 16, Figure 12B, "Définition de" should read -- Definition of --.

Column 4,
Line 5, "are" should read -- is --;
Line 26, "fist" should read -- first --.

Column 5,
Line 64, "obtain performance" should read -- obtain improved performance --.

Column 6,
Line 48, "an other" should read -- another --;
Line 49, "problem" should read -- problem: --.

Column 9,
Line 12, "an other" should read -- another --.

Column 13,
Lines 64, 65 and 67, "$R_q$" should read -- $R^q$ --.

Column 14,
Line 1, "$R_q$" should read -- $R^q$ --.

Column 20,
Line 45, "$|\!-\!\beta > \alpha_i < \beta; i=1$," should read -- $|\!-\!\beta < \alpha_i < \beta; i=1$, --.

Column 28,
Line 27, "et" should read -- and --.

UNITED STATES PATENT AND TRADEMARK OFFICE
CERTIFICATE OF CORRECTION

PATENT NO.     : 6,498,866 B2
DATED          : December 24, 2003
INVENTOR(S)    : Maryline Charrier et al.

It is certified that error appears in the above-identified patent and that said Letters Patent is hereby corrected as shown below:

Column 30,
Line 44, "$16/2_A)]\times[y_i+16/2_A$," should read -- $16/2^A)]\times[y_i+16/2^A$, --.

Column 35,
Line 54, "sponds" should read -- spond --.

Column 52,
Line 56, "colour" should read -- color --.

Column 54,
Line 58, "colour" should read -- color --.

Signed and Sealed this

Fourth Day of November, 2003

JAMES E. ROGAN
*Director of the United States Patent and Trademark Office*